(12) United States Patent
Yu et al.

(10) Patent No.: US 11,780,113 B2
(45) Date of Patent: Oct. 10, 2023

(54) LIGHTWEIGHT, REDUCED DENSITY FIRE RATED GYPSUM PANELS

(71) Applicant: United States Gypsum Company, Chicago, IL (US)

(72) Inventors: Qiang Yu, Grayslake, IL (US); Srinivas Veeramasuneni, Round Lake, IL (US); Weixin D. Song, Chicago, IL (US); Wenqi Luan, Hawthorn Woods, IL (US)

(73) Assignee: United States Gypsum Company, Chicago, IL (US)

(*) Notice: Subject to any disclaimer, the term of this patent is extended or adjusted under 35 U.S.C. 154(b) by 505 days.

(21) Appl. No.: 17/096,551

(22) Filed: Nov. 12, 2020

(65) Prior Publication Data

US 2021/0060816 A1    Mar. 4, 2021

Related U.S. Application Data

(63) Continuation of application No. 16/274,550, filed on Feb. 13, 2019, now Pat. No. 10,850,425, which is a
(Continued)

(51) Int. Cl.
*B28B 1/50* (2006.01)
*C04B 20/06* (2006.01)
(Continued)

(52) U.S. Cl.
CPC .............. *B28B 1/50* (2013.01); *B28B 11/12* (2013.01); *B28B 11/243* (2013.01); *B32B 5/16* (2013.01); *B32B 9/005* (2013.01); *B32B 38/164* (2013.01); *C04B 20/06* (2013.01); *C04B 28/14* (2013.01); *C04B 28/145* (2013.01); *E04B 1/942* (2013.01); *E04C 2/04* (2013.01); *B32B 2307/3065* (2013.01); *B32B 2607/00* (2013.01); *C04B 2111/0062* (2013.01); *C04B 2111/28* (2013.01);
(Continued)

(58) Field of Classification Search
CPC ....................................................... B28B 1/50
See application file for complete search history.

(56) References Cited

U.S. PATENT DOCUMENTS

| 1,971,900 A | 8/1934 | Cerveny et al. |
| 2,078,199 A | 4/1937 | King |

(Continued)

FOREIGN PATENT DOCUMENTS

| AT | 406048 | 1/2000 |
| AU | 638696 | 9/1990 |

(Continued)

OTHER PUBLICATIONS

Akrochem Corporation, Bulletin "Fire Retardants Alumina Trihydrate" Akron, Ohio, Apr. 2011.
(Continued)

*Primary Examiner* — Timothy Kennedy
(74) *Attorney, Agent, or Firm* — Leydig, Voit & Mayer, Ltd.

(57) ABSTRACT

A reduced weight, reduced density gypsum panel that includes high expansion vermiculite with fire resistance capabilities that are at least comparable to (if not better than) commercial fire rated gypsum panels with a much greater gypsum content, weight and density.

13 Claims, 54 Drawing Sheets
(16 of 54 Drawing Sheet(s) Filed in Color)

Related U.S. Application Data continuation of application No. 15/457,466, filed on Mar. 13, 2017, now Pat. No. 10,245,755, which is a continuation of application No. 14/181,590, filed on Feb. 14, 2014, now Pat. No. 9,623,586, which is a continuation of application No. 13/669,283, filed on Nov. 5, 2012, now Pat. No. 8,702,881, which is a continuation of application No. 13/400,010, filed on Feb. 17, 2012, now Pat. No. 8,323,785.

(60) Provisional application No. 61/446,941, filed on Feb. 25, 2011.

(51) Int. Cl.
```
C04B 28/14      (2006.01)
B32B 38/00      (2006.01)
B28B 11/12      (2006.01)
B28B 11/24      (2006.01)
B32B 5/16       (2006.01)
B32B 9/00       (2006.01)
E04B 1/94       (2006.01)
E04C 2/04       (2006.01)
C04B 111/00     (2006.01)
C04B 111/28     (2006.01)
```

(52) U.S. Cl.
CPC . *C04B 2201/30* (2013.01); *Y10T 428/249968* (2015.04); *Y10T 428/249979* (2015.04); *Y10T 428/26* (2015.01); *Y10T 428/31971* (2015.04)

(56) References Cited

U.S. PATENT DOCUMENTS

| | | |
|---|---|---|
| 2,083,961 A | 6/1937 | New |
| 2,213,603 A | 9/1940 | Young et al. |
| 2,322,194 A | 6/1943 | King |
| 2,340,535 A | 2/1944 | Jenkins |
| 2,342,574 A | 2/1944 | Denning |
| 2,526,066 A | 10/1950 | Croce |
| 2,744,022 A | 5/1956 | Croce |
| 3,454,456 A | 7/1969 | Willey |
| 3,513,009 A | 5/1970 | Sauer et al. |
| 3,573,947 A | 4/1971 | Kinkade |
| 3,616,173 A | 10/1971 | Green et al. |
| 3,719,513 A | 3/1973 | Bragg et al. |
| 3,741,929 A | 6/1973 | Burton |
| 3,830,687 A | 8/1974 | Re et al. |
| 3,839,059 A | 10/1974 | Rothfelder et al. |
| 3,853,689 A | 12/1974 | Morrone |
| 3,908,062 A | 9/1975 | Roberts |
| 3,920,465 A | 11/1975 | Burkard et al. |
| 3,944,698 A | 3/1976 | Dierks et al. |
| 4,019,920 A | 4/1977 | Burkard et al. |
| 4,063,976 A | 12/1977 | Wain et al. |
| 4,130,458 A | 12/1978 | Moore et al. |
| 4,159,302 A | 6/1979 | Greve et al. |
| 4,190,547 A | 2/1980 | Mahnke et al. |
| 4,278,468 A | 7/1981 | Selbe et al. |
| 4,287,103 A | 9/1981 | Green et al. |
| 4,311,554 A | 1/1982 | Herr |
| 4,328,178 A | 5/1982 | Kossatz |
| 4,343,127 A | 8/1982 | Greve et al. |
| 4,352,719 A | 10/1982 | Herr |
| 4,392,896 A | 7/1983 | Sakakibara |
| 4,394,411 A | 7/1983 | Krüll et al. |
| 4,564,544 A | 1/1986 | Burkard et al. |
| 4,647,486 A | 3/1987 | Ali |
| 4,664,707 A | 5/1987 | Wilson et al. |
| 4,729,853 A | 3/1988 | von Bonin |
| 4,748,771 A | 6/1988 | Lehnert et al. |
| 4,939,192 A | 7/1990 | T'sas |
| 5,116,671 A | 5/1992 | Bruce et al. |
| 5,148,645 A | 9/1992 | Lehnert et al. |
| 5,154,874 A | 10/1992 | Koslowski |
| 5,155,959 A | 10/1992 | Richards et al. |
| 5,171,366 A | 12/1992 | Richards et al. |
| 5,264,057 A | 11/1993 | Schlatter et al. |
| 5,320,677 A | 6/1994 | Baig |
| 5,389,716 A | 2/1995 | Graves |
| 5,401,588 A | 3/1995 | Garvey et al. |
| 5,643,510 A | 7/1997 | Sucech |
| 5,683,635 A | 11/1997 | Sucech et al. |
| 5,704,179 A | 1/1998 | Lehnert et al. |
| 5,798,425 A | 8/1998 | Albrecht et al. |
| 5,817,262 A | 10/1998 | Englert |
| 5,871,857 A | 2/1999 | Alhamad |
| 5,911,818 A | 6/1999 | Baig |
| 5,922,447 A | 7/1999 | Baig |
| 5,962,119 A | 10/1999 | Chan |
| 6,102,995 A | 8/2000 | Hutchings et al. |
| 6,162,288 A | 12/2000 | Kindt et al. |
| 6,221,521 B1 | 4/2001 | Lynn et al. |
| 6,228,497 B1 | 5/2001 | Dombeck |
| 6,228,914 B1 | 5/2001 | Ford et al. |
| 6,290,769 B1 | 9/2001 | Carkner |
| 6,309,740 B1 | 10/2001 | Shu et al. |
| 6,340,389 B1 | 1/2002 | Klus |
| 6,342,284 B1 | 1/2002 | Yu et al. |
| 6,387,171 B1 | 5/2002 | Taylor et al. |
| 6,387,172 B1 | 5/2002 | Yu et al. |
| 6,398,864 B1 | 6/2002 | Przybysz et al. |
| 6,406,535 B1 | 6/2002 | Shintome |
| 6,406,537 B1 | 6/2002 | Immordino |
| 6,409,819 B1 | 6/2002 | Ko |
| 6,409,824 B1 | 6/2002 | Veeramasuneni et al. |
| 6,409,825 B1 | 6/2002 | Yu et al. |
| 6,481,171 B2 | 11/2002 | Yu et al. |
| 6,572,698 B1 | 6/2003 | Ko |
| 6,632,550 B1 | 10/2003 | Yu et al. |
| 6,641,658 B1 | 11/2003 | Dubey |
| 6,746,781 B2 | 6/2004 | Francis et al. |
| 6,773,639 B2 | 8/2004 | Moyes et al. |
| 6,774,146 B2 | 8/2004 | Savoly et al. |
| 6,777,517 B1 | 8/2004 | Albrecht et al. |
| 6,815,049 B2 | 11/2004 | Veeramasuneni et al. |
| 6,831,118 B2 | 12/2004 | Munzenberger |
| 6,832,652 B1 | 12/2004 | Dillenbeck et al. |
| 6,869,474 B2 | 3/2005 | Perez-Pena et al. |
| 6,881,247 B2 | 4/2005 | Batdorf |
| 6,893,752 B2 | 5/2005 | Veeramasuneni et al. |
| 6,941,720 B2 | 9/2005 | DeFord et al. |
| 7,364,015 B2 | 4/2008 | Englert et al. |
| 7,381,261 B1 | 6/2008 | Nelson |
| 7,413,603 B2 | 8/2008 | Miller et al. |
| 7,455,728 B2 | 11/2008 | Losch et al. |
| 7,644,548 B2 | 1/2010 | Guevara et al. |
| 7,731,794 B2 | 6/2010 | Yu et al. |
| 7,736,720 B2 | 6/2010 | Yu et al. |
| 7,754,006 B2 | 7/2010 | Liu et al. |
| 7,767,019 B2 | 8/2010 | Liu et al. |
| 7,776,170 B2 | 8/2010 | Yu et al. |
| 7,803,226 B2 | 9/2010 | Wang et al. |
| 7,803,296 B2 | 9/2010 | Miller et al. |
| 7,811,685 B2 | 10/2010 | Wang et al. |
| 7,815,730 B2 | 10/2010 | Wang et al. |
| 7,819,993 B2 | 10/2010 | Seki et al. |
| 7,841,148 B2 | 11/2010 | Tonyon et al. |
| 7,849,648 B2 | 12/2010 | Tonyon et al. |
| 7,849,649 B2 | 12/2010 | Tonyon et al. |
| 7,849,650 B2 | 12/2010 | Tonyon et al. |
| 7,851,057 B2 | 12/2010 | Englert et al. |
| 7,870,698 B2 | 1/2011 | Tonyon et al. |
| 7,875,114 B2 | 1/2011 | Wittbold et al. |
| 7,892,472 B2 | 2/2011 | Veeramasuneni et al. |
| 7,935,223 B2 | 5/2011 | Cao et al. |
| 8,057,915 B2 | 11/2011 | Song et al. |
| 8,062,565 B2 | 11/2011 | Mueller et al. |
| 8,070,878 B2 | 12/2011 | Dubey |
| 8,070,895 B2 | 12/2011 | Engbrecht et al. |
| 8,088,218 B2 | 1/2012 | Blackburn et al. |
| 8,133,357 B2 | 3/2012 | Cao et al. |
| 8,133,600 B2 | 3/2012 | Wang et al. |

(56) References Cited

U.S. PATENT DOCUMENTS

| | | |
|---|---|---|
| 8,303,159 B2 | 11/2012 | Yu et al. |
| 2002/0096278 A1 | 7/2002 | Foster et al. |
| 2003/0010258 A1 | 1/2003 | Fukuda et al. |
| 2003/0084980 A1 | 5/2003 | Seufert et al. |
| 2003/0138614 A1 | 7/2003 | Leclercq |
| 2003/0175478 A1 | 9/2003 | Leclercq |
| 2004/0026002 A1 | 2/2004 | Weldon et al. |
| 2004/0121152 A1 | 6/2004 | Toas |
| 2005/0219938 A1 | 10/2005 | Rigaudon et al. |
| 2005/0241541 A1 | 11/2005 | Honn et al. |
| 2005/0263925 A1 | 12/2005 | Heseltine et al. |
| 2005/0281999 A1 | 12/2005 | Hoffmann et al. |
| 2006/0068186 A1 | 3/2006 | Leclercq et al. |
| 2006/0090674 A1 | 5/2006 | Fukuda et al. |
| 2006/0278132 A1 | 12/2006 | Yu et al. |
| 2007/0048490 A1 | 3/2007 | Yu et al. |
| 2007/0059513 A1 | 3/2007 | Yu et al. |
| 2007/0255032 A1 | 11/2007 | Bichler et al. |
| 2008/0060316 A1 | 3/2008 | Fukuda et al. |
| 2008/0066651 A1 | 3/2008 | Park |
| 2008/0070026 A1 | 3/2008 | Yu et al. |
| 2008/0087366 A1 | 4/2008 | Yu et al. |
| 2008/0090068 A1 | 4/2008 | Yu |
| 2008/0152945 A1 | 6/2008 | Miller et al. |
| 2008/0202415 A1 | 8/2008 | Miller et al. |
| 2008/0227891 A1 | 9/2008 | Jarvie et al. |
| 2009/0126300 A1 | 5/2009 | Fujiwara et al. |
| 2009/0151602 A1 | 6/2009 | Francis |
| 2009/0162602 A1 | 6/2009 | Cottier et al. |
| 2009/0252941 A1 | 10/2009 | Mueller et al. |
| 2009/0253323 A1 | 10/2009 | Mueller et al. |
| 2010/0031853 A1 | 2/2010 | Visocekas et al. |
| 2010/0061180 A1 | 3/2010 | Yu et al. |
| 2010/0088984 A1 | 4/2010 | Guevara et al. |
| 2010/0136269 A1 | 6/2010 | Andersen et al. |
| 2010/0143682 A1 | 6/2010 | Shake et al. |
| 2010/0197182 A1 | 8/2010 | Barzilai |
| 2010/0239886 A1 | 9/2010 | Yu et al. |
| 2010/0247937 A1 | 9/2010 | Liu et al. |
| 2010/0291305 A1 | 11/2010 | Wittbold et al. |
| 2011/0054053 A1 | 3/2011 | Lee et al. |
| 2011/0195241 A1 | 8/2011 | Yu et al. |

FOREIGN PATENT DOCUMENTS

| | | |
|---|---|---|
| AU | 199924233 A | 8/1999 |
| AU | 2012/222102 B2 | 12/2013 |
| AU | 2014/201626 B2 | 4/2015 |
| CA | 2060106 A1 | 8/1992 |
| CN | 1238312 | 12/1999 |
| CN | 1396138 | 2/2003 |
| CN | 101012119 | 8/2007 |
| DE | 4316518 | 11/1994 |
| EP | 258064 A2 | 3/1988 |
| EP | 335405 | 10/1989 |
| EP | 1008568 | 6/2000 |
| FR | 2673620 | 9/1992 |
| GB | 1242697 A | 8/1971 |
| JP | S52-87405 A | 7/1977 |
| JP | 56017963 A | 2/1981 |
| JP | H2-137781 A | 5/1990 |
| JP | H05-008344 A | 1/1993 |
| JP | H05-500942 | 2/1993 |
| JP | 07-330410 A | 12/1995 |
| JP | 07-330411 A | 12/1995 |
| JP | 08-042098 A | 2/1996 |
| JP | 09-142915 | 6/1997 |
| JP | 2002-154864 | 5/2002 |
| JP | 2002154812 A | 5/2002 |
| JP | 2004-504252 A | 2/2004 |
| JP | 2011-502094 A | 1/2011 |
| NO | 126524 | 2/1973 |
| SU | 887506 | 12/1981 |
| UA | 88764 C2 | 11/2009 |
| WO | WO 90/09495 A1 | 8/1990 |
| WO | WO 1991/005744 | 5/1991 |
| WO | WO 1998/042632 A1 | 10/1998 |
| WO | WO 1999/016984 A1 | 4/1999 |
| WO | WO 2006/138002 A2 | 12/2006 |
| WO | WO 2009/058558 A1 | 5/2009 |
| WO | WO 2009/111844 A1 | 9/2009 |
| WO | WO 2010/027920 A2 | 3/2010 |
| WO | WO 2010/106444 A1 | 9/2010 |
| WO | WO 2012/116325 A1 | 8/2012 |

OTHER PUBLICATIONS

ASTM WK25392—Revision of C473—09 Standard Test Methods for Physical Testing of Gypsum Panel Products (hereinafter "ASTM Pub. WK25392") available at the web address www.astm.org/DATABASE.CART/WORKITEMS/WK25392.htm, Aug. 6, 2009.

Australian Standard, "Methods for fire tests on building materials, components and structures—Part 4: Fire-resistance test of elements of construction," Standards Australia, (2005) 162 pages.

Blaine, "Accelerating the hydration of calcium sulfate hemihydrate via high energy mixing," Materials and Structures, Jul. 1997, 30:362-365.

Burrows, "A Decade's Experience of Gypsum Board Weight Reduction in the U.S.," 14. Internationale Baustofftagung (Weimar, Sep. 20-23, 2000), 1.0197-1.0207.

Camp, T. F., "The Manufacture of Gypsum Board," Chapter III, Section II, The Manufacture and Technology of Gypsum Products, Dec. 22, 1950.

Chen et al., "Use of Aluminum Trihydrate filler to improve the strength properties of cellulosic paper exposed to high temperature treatment" BioResources 6(3), 2399-2410, 2011.

Derwent Abstract 78-64264A of JP 53 088031 A, WPI/Derwent Publications, Ltd. (London) (Aug. 3, 1978).

Drywall & Veneer Plaster Construction (Cladding-Curved Surfaces), Gypsum Construction Handbook—90th Anniversary Edition, United States Gypsum Company, 182-185 (1992).

Englert et al., "Properties of Gypsum Fiberboard Made by the USG Process," Proceedings of the 4th International Inorganic-Bonded Wood & Fiber Composite Materials Conference, Sep. 25-28, 1994, Spokane, WA, A.A. Moslemi ed., 1995, 4:52-58.

European Patent Office, International Search Report and Written Opinion from International PCT Application No. PCT/US2012/026613 (dated Jul. 19, 2012).

European Patent Office, Search Report from EP 14169525.4 (dated Feb. 19, 2015) 8 pages.

Fire and Materials 2011, 12th International Conference and Exhibition, Interscience Communications, (Jan. 31-Feb. 2, 2011).

Fire-resistance Ratings—ANSI/UL 263, Design No. U017, BXUV. U017 (2014) 7 pages.

Fire-resistance Ratings—ANSI/UL 263, Design No. U407, BXUV. U407 (2015) 6 pages.

Fire-resistance Ratings—ANSI/UL 263, Design No. W411, BXUV. W411 (2016) 6 pages.

Fire-resistance Ratings—ANSI/UL 263, Design No. W424, BXUV. W424 (2016) 6 pages.

Fire-resistance Ratings—ANSI/UL 263, Design No. W433, BXUV. W433 (2016) 6 pages.

"Global Gypsum News," Global Gypsum Magazine, 10 (2011).

Grace Specialty Vermiculite, "VCX Vermiculite Ore Concentrate," W.R. Grace & Co., Conn. USA (2008).

Grace Specialty Vermiculite, "Zonolite #3 Agricultural/Horticultural Vermiculite" W.R. Grace & Co., Conn. USA (1999).

Grodzka, P. et al.; On the Development of Heat Storage Building Materials; Conf-820814-23; DE82 020814; Library of Congress Newspaper RM (Aug. 1982).

Hannant, D.J. et al.; Polyolefin Fibrous Networks in Cement Matrices for Low Cost Sheeting; Phil. Trans. R. Soc. Land; 1980; pp. 591-597; A 294; Civil Engineering Department Univ. of Surrey, Guildford, Surrey GU2 5XH, U.K.

Harmathy et al., "Comparison of Severity of Exposure in ASTM E 119 and ISO 834 Fire Resistance Tests," Journal of Testing and Evaluation, 15(6): 371-375 (1987) 7 pages.

(56) References Cited

OTHER PUBLICATIONS

K.F.Mikhaylov—Manual for manufacturing prefabricated reinforced concrete articles, Moscow, Stroyizdat, 1982, pp. 42, 44.
Lin et al., "Characterization and Analysis of Porous, Brittle Solid Structures by Micro CT" Abstracts of 5th World Congress on Industrial Process Tomography, Bergen, Norway, Paper No. VIA07, p. 92 (Sep. 6, 2007).
Lin et al., "Characterization and Analysis of Porous, Brittle Solid Structures by X-Ray Micro CT" JOM, vol. 62, No. 12, p. 91-94, Mineral, Metals and Materials Society, Dec. 2010.
Merck Index for Alumina Trihydrate, p. 61, 1996.
Miller et al., "Commercial Scale-Up Experience with USG's Gypsum Fiberboard Process," Proceedings of the 7th International Inorganic-Bonded Wood & Fiber Composite Materials Conference, Sun Valley, ID, A.A. Moslemi ed., 2000, 7:337-355.
Miller et al., "Development and Scale-Up of USG's Gypsum Fiberboard Technology," Proceedings of the 6th International Inorganic-Bonded Wood & Fiber Composite Materials Conference, Sun Valley, ID, A.A. Moslemi, ed., 1998, 6:4-12.
Miller et al., "USG Process for Manufacturing Fiber Composite Panels," International Cement Review, Nov. 1995, pp. 41-42.
Miller et al., "USG Process for Manufacturing Gypsum Fiber Composite Panels" Proceedings of the 4th International Inorganic-Bonded Wood & Fiber Composite Materials Conference, Sep. 25-28, 1994, Spokane, WA, A. A. Moslemi ed., 1995, 4:47-51.
Morose, "An Overview of Alternatives to Tetrabromobisphenol A (TBBPA) and Hexabromocyclododecane (HBDC)," Mar. 2006, A Publication of the Lowell Center for Sustainable Production, University of Massachusetts Lowell, 32 total pages.
Online Certifications Directory, Design No. U305, BXUV. U305, (2014) 5 pages.
Online Certifications Directory, Design No. U317, BXUV. U317, (2015) 4 pages.
Online Certifications Directory, Design No. U419, BXUV. U419, (2014) 10 pages.
Online Certifications Directory, Design No. U423, BXUV. U423, (2014) 5 pages.
Peterson, Kurt, "Engineered Gypsum Panels, the Development and Application of Densified Zones at the Paper/Core Interface of Gypsum Panels," Proceedings of Gypsum 2000, 6th International Conference on Natural and Synthetic Gypsum, Toronto, Canada, May 2000, pp. 9-1-9-16.
Potter, Michael J., "Vermiculite" US Geological Survey Minerals Yearbook—2001 , 5 total pages (p. 82.1-82.3 and two pages of tables) (2001).
Salyer et al., "Utilization of Bagasse in New Composite Building Materials," Ind. Eng. Chem. Prod. Res. Dev. 1982; pp. 17-23; 21; Center for Basic and Applied Polymer Research, Univ. of Dayton, OH 45469.
Shipp et al., "Bench Tests for Characterizing the Thermophysical Properties of Type X Special Fire Resistant Gypsum Board Exposed to Fire," ASTM International, Journal of Testing and Evaluation, v. 39, n. 6, Nov. 2011, 1023-1029.
Shipp et al., "Thermophysical Characterization of Type X Special Fire Resistant Gypsum Board," Proceedings of the Fire and Materials 2011 Conference, San Francisco, Jan. 31-Feb. 2, 2011, Interscience Communications Ltr., London, UK, p. 417-426.
"Standard Specification for Gypsum Board," ASTM International—Designation: C1396/C1396M-14a, (2016) 8 pages.
"Standard Test Methods for High-Temperature Characterization of Gypsum Boards and Panels," ASTM International—Designation: C1795-15, (2016) 9 pages.
Standard Test Methods for Fire Tests of Building Construction and Materials, ASTM International—Designation: E119-15, (2016) 35 pages.
The Red Book—Fire and Acoustic Design Guide, GYPROCK, (2011) 252 pages.

The Vermiculite Association (no individual author name readily available) "About Vermiculite: 3. Exfoliation, 4. Thermal Exfoliation," The Vermiculite Association, 2010, Retrieved on May 14, 2012 from http://www.vermiculite.org/AboutVermiculite.php.
"Tough Rock," Georgia—Pacific Gypsum, www.gpgypsum.com, (2014) 2 pages.
U.S. Department of Labor, Material Safety Data Sheet, "Vermiculite Concentrate (Grades 2, 3, 4, 5, 55)," 2 pages, VA, USA (Jan. 3, 2008).
Van Wazer, Phosphorus and Its Compounds, vol. 1, Interscience Publishers, Inc., New York (1958), pp. 419-427, 679-691; and pp. 6799-6795.
Virginia Vermiculite LLC, "Grade No. 4 Vermiculite Concentrate," VA, USA (Jan. 2008).
Virginia Vermiculite LLC, "Grade No. 45 Vermiculite Concentrate," VA, USA (Jan. 2008).
Virginia Vermiculite LLC, "Grade No. 5 Vermiculite Concentrate," VA, USA (Sep. 2007).
Weber, Charles, G., "Fiber Building Boards Their Manufacture and Use," Industrial and Engineering Chemistry; Aug. 1935; 27 (8): 896-898; National Bureau of Standards, Washington, D.C.
Australian Patent Office, Decision of Opposition Fails on All Grounds in Australian Patent Application No. 2014201626, 48 pages (Dec. 15, 2017).
Griffith Hack, Notice of Opposition—in the matter of in the matter of Australian Patent Application No. 2014201626 and Opposition thereto by CSR Building Products Limited (Jul. 16, 2015) 2 pages.
CSR Statement of Grounds and Particulars—Cover Letter—in the matter of Australian Patent Application No. 2014201626 by United States Gypsum Company and Opposition thereto by CSR Building Products Limited (Oct. 16, 2015) 1 page.
CSR Statement of Grounds and Particulars—in the matter of Australian Patent Application No. 2014201626 by United States Gypsum Company and Opposition thereto by CSR Building Products Limited (Oct. 16, 2015) 15 pages.
Exhibits BB1-11 of Bob Bruce Declaration—in the matter of Australian Patent Application No. 2014-201626 by United States Gypsum Company and Opposition thereto by CSR Building Products Limited—dated Jan. 17, 2016 (1,797 pages).
Statutory Declaration of Bob Bruce—in the matter of Australian Patent Application No. 2014201626 by United States Gypsum Company and Opposition thereto by CSR Building Products Limited (Jan. 17, 2016) 30 pages.
Statutory Declaration of Peter Aird with Exhibits PA1-13—in the matter of Australian Patent Application No. 2014-201626 by United States Gypsum Company and Opposition thereto by CSR Building Products Limited—dated Apr. 18, 2016 (1246 pages).
Statutory Declaration of Daniel Engbrecht with Exhibits DE1-7—in the matter of Australian Patent Application No. 2014-201626 by United States Gypsum Company and Opposition thereto by CSR Building Products Limited—dated Apr. 18, 2016 (511 pages).
Statutory Declaration of Robert Berhinig with Exhibits RB1-13—in the matter of Australian Patent Application No. 2014-201626 by United States Gypsum Company and Opposition thereto by CSR Building Products Limited—dated Apr. 18, 2016 (623 pages).
Statutory Declaration of Keith Ball with Exhibits KB1-9—in the matter of Australian Patent Application No. 2014-201626 by United States Gypsum Company and Opposition thereto by CSR Building Products Limited—dated Apr. 18, 2016 (706 pages).
Statutory Declaration of Bob Bruce with Exhibits BB12 and BB13—in the matter of Australian Patent Application No. 2014-201626 by United States Gypsum Company and Opposition thereto by CSR Building Products Limited—dated Jun. 22, 2016 (52 pages).
U.S. Appl. No. 13/400,010, filed Feb. 17, 2012.
U.S. Appl. No. 13/669,283, filed Nov. 5, 2012.
U.S. Appl. No. 14/181,590, filed Feb. 14, 2014.
U.S. Appl. No. 15/457,466, filed Mar. 13, 2017.
U.S. Appl. No. 16/274,550.
U.S. Appl. No. 16/274,550, filed Feb. 13, 2019.

| TABLE I: Exemplary Formulations for Reduced Weight and Density, Fire Resistant Gypsum Panels Formed According to Principles of the Present Disclosure | | | |
|---|---|---|---|
| Component | Core Density of About 30.2 to About 40.3 pcf (About 483.8 to About 645.5 kg/m³) | Core Density of About 32.2 to About 38.3 pcf (About 512.8 to About 613.5 kg/m³) | Core Density of About 35.3 to About 37.3 pcf (About 565.5 to About 597.5 kg/m³) |
| Stucco (approx. 95% gypsum) | about 1162 to about 1565 lb/msf (about 5.7 to about 7.6 kg/m²) | about 1227 to about 1502 lb/msf (about 6.0 to about 7.3 kg/m²) | about 1354 to about 1459 lb/msf (about 6.6 to about 7.1 kg/m²) |
| Core /weight gypsum | about 1425 to about 1780 lb/msf (about 7.0 to about 8.7 kg/m²) | about 1500 to about 1700 lb/msf (about 7.3 to about 8.3 kg/m²) | about 1600 lb/msf (about 7.8 kg/m²) |
| High expansion vermiculite (% by weight of stucco) | about 5 to about 10 | about 5.5 to about 8.0 | about 6.0 |
| Starch (% by weight of stucco) | up to about 3 | up to about 2.5 | up to about 1.5 |
| Phosphate (% by weight of stucco) | up to about 0.40 | up to about 0.25 | up to about 0.15 |
| Dispersant (% by weight of stucco) | up to about 1 | up to about 0.8 | up to about 0.5 |
| High Efficiency Heat Sink Additive (% by weight of stucco) | up to about 10 | up to about 10 | up to about 10 |
| Mineral, Glass, or Carbon fiber (% by weight of stucco) | about 0.3 to about 0.9 | about 0.4 to about 0.7 | about 0.5 |
| Paper Cover Sheets | about 40 to about 65 lb/msf (about 195 to about 317 g/m²) | about 48 to about 60 lb/msf (about 234 to about 293 g/m²) | about 48 to about 54 lb/msf (about 234 to about 264 g/m²) |
| Board Density (core and cover sheets) | about 30 to about 39.5 pcf (about 480.6 to about 632.7 kg/m³) | about 32 to about 38.5 pcf (about 512.6 to about 616.7 kg/m³) | about 35.5 to about 37.5 pcf (about 568.7 to about 60.70 kg/m³) |
| Board Weight, 5/8 inch thick panel | about 1600 to about 2055 lb/msf (about 7.8 to about 10 kg/m²) | about 1700 to about 2000 lb/msf (about 8.3 to about 9.8 kg/m²) | about 1850 to about 1950 lb/msf (about 9.0 to about 9.5 kg/m²) |

FIG. 19

| TABLE II: Weight Loss and Density Changes with Temperature of Vermiculite Grade 5 | | | | | | | | |
|---|---|---|---|---|---|---|---|---|
| Temp. | Crucible Weight | Sample Weight | Weight After Heating | Weight Loss | Sample Weight | Volume | Density | Volume |
| °F (°C) | g | g | ml | % | g | ml | lb/cf (kg/m$^3$) | % of original volume |
| 72 (22) | | | | | 105.6 | 99.7 | 66.1 (1059.1) | 100 |
| 212 (100) | 63.31 | 50.00 | 112.39 | 1.85 | 48.82 | 46.00 | 66.3 (1062.3) | 99.7 |
| 390 (200) | 63.31 | 50.00 | 111.12 | 4.51 | 47.68 | 43.33 | 71.2 (1140.8) | 96.5 |
| 750 (400) | 70.29 | 50.00 | 117.53 | 5.53 | 47.21 | 54.00 | 53.9 (863.6) | 122.6 |
| 1,110 (600) | 70.29 | 50.00 | 116.84 | 6.91 | 46.54 | 101.50 | 28.1 (450.3) | 235.2 |
| 1,470 (800) | 70.29 | 50.00 | 115.94 | 8.70 | 17.94 | 50.00 | 22.8 (365.3) | 289.9 |

FIG. 20

| TABLE III: Weight Loss and Density Changes With Temperature of High Expansion Vermiculite ||||||||
|---|---|---|---|---|---|---|---|---|
| Temp. | Crucible Weight | Sample Weight | Weight After Heating | Weight Loss | Sample Weight | Volume | Density | Volume |
| °F (°C) | g | g | ml | % | g | ml | lb/cf (kg/m$^3$) | % of original volume |
| 72 (22) | | | | | 267.9 | 250.0 | 66.9 (1071.9) | 100 |
| 212° (100) | 105.21 | 25.00 | 129.65 | 2.22 | 24.12 | 22.25 | 67.7 (1084.8) | 98.8 |
| 390 (200) | 105.20 | 25.00 | 129.09 | 4.44 | 23.13 | 21.25 | 67.9 (1088.0) | 98.5 |
| 750 (400) | 105.20 | 25.00 | 128.83 | 5.46 | 15.36 | 24.75 | 38.7 (620.1) | 172.9 |
| 1,110 (600) | 105.20 | 25.00 | 128.51 | 6.74 | 16.17 | 50.00 | 20.2 (323.7) | 331.2 |
| 1470 (800) | 105.20 | 25.00 | 128.04 | 8.62 | 13.66 | 50.00 | 17.1 (274.0) | 391.2 |

FIG. 21

TABLE IV:
Statistical Information of Air Void Distributions of Specimens 1-4

| Equivalent Sphere Diameter (μm) | Specimen 1 (Sample 2) (total air bubbles = 675) | | | Specimen 2 (Sample 3) (total air bubbles = 6900) | | | Specimen 3 (total air bubbles = 1177) | | | Specimen 4 (total air bubbles = 1915) | | |
|---|---|---|---|---|---|---|---|---|---|---|---|---|
| | Counts | % | % (cum.) | Counts | % | % (cum.) | Counts | % | % (cum.) | Counts | % | % (cum.) |
| 50 | 0 | 0 | 0 | 1756 | 25.4% | 25.4% | 0 | 0 | 0 | 0 | 0 | 0 |
| 100 | 14 | 2.1% | 2.1% | 2054 | 29.8% | 55.2% | 204 | 17.3% | 17.3% | 404 | 21.1% | 21.1% |
| 150 | 127 | 18.8% | 20.9% | 686 | 9.9% | 65.2% | 255 | 21.7% | 39.0% | 480 | 25.1% | 46.2% |
| 200 | 112 | 16.6% | 37.5% | 517 | 7.5% | 72.7% | 171 | 14.5% | 53.5% | 258 | 13.5% | 59.6% |
| 250 | 59 | 8.7% | 46.2% | 591 | 8.6% | 81.2% | 145 | 12.3% | 65.8% | 196 | 10.2% | 69.9% |
| 300 | 37 | 5.5% | 51.7% | 569 | 8.2% | 89.5% | 110 | 9.3% | 75.2% | 187 | 9.8% | 79.6% |
| 350 | 48 | 7.1% | 58.8% | 386 | 5.6% | 95.1% | 99 | 8.4% | 83.6% | 161 | 8.4% | 88.0% |
| >400 | 278 | 41.2% | 100% | 341 | 4.9% | 100% | 193 | 16.4% | 100% | 229 | 12.0% | 100% |
| Total counts | 675 | | | 6900 | | | 1177 | | | 1915 | | |
| Mean (μm) | 325.49 | | | 133.57 | | | 221.50 | | | 198.06 | | |
| Standard Deviation | 186.45 | | | 111.80 | | | 132.40 | | | 109.73 | | |

FIG. 22

TABLE V
Statistical Information of Wall Thickness Distributions of Specimens 1-4

| Wall Thickness (μm) | Percent | | | |
|---|---|---|---|---|
| | Specimen 1 Sample 2 (total air bubbles = 675) | Specimen 2 Sample 3 (total air bubbles = 6900) | Specimen 3 (total air bubbles = 1177) | Specimen 4 (total air bubbles = 1915) |
| 30 | 28.57 | 35.57 | 68.51 | 81.37 |
| 50 | 36.56 | 37.89 | 27.13 | 16.70 |
| 70 | 23.14 | 18.85 | 3.53 | 1.36 |
| 120 | 10.98 | 7.12 | 0.74 | 0.52 |
| 200 | 0.70 | 0.52 | 0.09 | 0.06 |
| Total counts | 24,527,418 | 21,740,821 | 33,438,483 | 33,487,996 |
| Mean (μm) | 49.27 | 44.92 | 31.20 | 27.29 |
| STD | 22.89 | 21.40 | 13.34 | 11.66 |

FIG. 23

| TABLE VI: Shrink Resistance Test Results | | | | | | | | | |
|---|---|---|---|---|---|---|---|---|---|
| Sample Type | Approx. Core Density | Length Before | Width Before | Length After | Width After | Area Before | Area After | % Shrinkage | Shrink Resistance |
| Example of Panel of Present Disclosure (Run 1) | 36.8 pcf (588.8 kg/m³) | 9 in. (22.9 cm) | 3 in. (7.62 cm) | 8.5 in (21.6 cm) | 2.8 in. (7.11 cm) | 27 in.² (174.2 cm²) | 23.80 in.² (153.5 cm²) | 11.85 | 88.15 |
| Regular 5/8" Type X (Run 1) | 43 pcf (688 kg/m³) | 9 in. (22.9 cm) | 3 in. (7.62 cm) | 8.0625 in (20.5 cm) | 2.584 in. (6.56 cm) | 27 in.² (174.2 cm²) | 20.83 in.² (134.4 cm²) | 22.84 | 77.16 |
| Regular 5/8" Type X (Run 1) | 43 pcf (688 kg/m³) | 9 in. (22.9 cm) | 3 in. (7.62 cm) | 8.0625 (20.5 cm) | 2.56 in. (6.50 cm) | 27 in.² (174.2 cm²) | 20.64 in.² (133.2 cm²) | 23.56 | 76.44 |
| 5/8" Firecode "X" (Run 2) | 42 pcf (672.8 kg/m³) | 9 in. (22.9 cm) | 3.01 in. (7.65 cm) | 7.21 in. (18.31 cm) | 2.31 in (5.87 cm) | 27.1 in.² (174.8 cm²) | 16.7 in.² (107.7 cm²) | 38.47 | 61.53 |
| 1/2" Firecode "C" (Run 2) | 48.1 pcf (770.5 kg/m³) | 9 in. (22.9 cm) | 3.03 in. (7.70 cm) | 7.90 in. (20.07 cm) | 2.56 in. (6.50 cm) | 27.3 in.² (176.1 cm²) | 20.2 in.² (130.3 cm²) | 25.88 | 74.12 |
| 5/8" Firecode "C" (Run 2) | 46.9 pcf (751.3 kg/m³) | 9.04 in. (22.96 cm) | 3.05 in. (7.75 cm) | 8.02 in. (20.37 cm) | 2.57 in. (6.53 cm) | 27.5 in.² (177.4 cm²) | 20.6 in.² (132.9 cm²) | 25.15 | 74.85 |

FIG. 24

| | TABLE VII: Formulations for Sample Panels References in Example 4 Major Components (Average of Each Run, Unless Otherwise Noted) | | | | | | |
|---|---|---|---|---|---|---|---|
| Sample Run | Approx. Stucco | Approx. High Exp. Vermiculite | Approx. Starch | Approx. Phosphate | Approx. Dispersant | Approx. Mineral Wool/ Glass Fiber | Approx. Accelerator |
| | lb/msf (kg/m$^2$) | lb/msf of stucco (g/m$^2$ of stucco) | lb/msf (g/m$^2$) | lb/msf (g/m$^2$) | lb/msf (g/m$^2$) | lb/msf (g/m$^2$) | lb/msf (g/m$^2$) |
| 1 | 1281 (6.26) | 100 (488.2) | 10 (48.82) | 1 (4.88) | 8 (39.06) | 7.5 (36.62) | 20 (97.65) |
| 2 | 1280 (6.25) | 75 (366.2) | 20 (97.65) | 1.5 (7.32) | 2 (9.76) | 7.5 (36.62) | 32 (156.2) |
| 3 | 1280 (6.25) | 100 (488.2) | 20 (97.65) | 1.5 (7.32) | 2 (9.76) | 7.5 (36.62) | 32 (156.2) |
| 4 | 1280 (6.25) | 100 (488.2) | 20 (97.65) | 1.5 (7.32) | 2 (9.76) | 7.5 (36.62) | 32 (156.2) |
| 5 | 1280 (6.25) | 100 (488.2) | 20 (97.65) | 1.5 (7.32) | 2 (9.76) | 7.5 (36.62) | 32 (156.2) |
| 6 | 1245 (6.08) | 100 (488.2) | 20 (97.65) | 1.5 (7.32) | 2 (9.76) | 7.5 (36.62) | 32 (156.2) |
| 7 | 1295 (6.32) | 100 (488.2) | 30 (146.47) | 1.5 (7.32) | 2 (9.76) | 7.5 (36.62) | 30 (146.5) |
| 8 | 1295 (6.32) | 100 (488.2) | 30 (146.47) | 1.5 (7.32) | 2 (9.76) | 7.5 (36.62) | 30 (146.5) |
| 9 | 1295 (6.32) | 100 (488.2) | 30 (146.47) | 1.5 (7.32) | 2 (9.76) | 7.5 (36.62) | 30 (146.5) |
| 10 | 1280 (6.25) | 100 (488.2) | 30 (146.47) | 1.5 (7.32) | 2 (9.76) | 7.5 (36.62) | 32 (156.2) |
| 11 | 1294 (6.32) | 100 (488.2) | 30 (146.47) | 1.5 (7.32) | 4 (19.53) | 7.5 (36.62) | 28 (136.7) |
| 12 | 1336 (6.52) | 100 (488.2) | 30 (146.47) | 1.5 (7.32) | 4 (19.53) | 7.5 (36.62) | 28 (136.7) |
| 13 | 1311 (6.40) | 100 (488.2) | 30 (146.47) | 1.5 (7.32) | 2 (9.76) | 7.5 (36.62) | 25 (122.1) |
| 14 | 1345 (6.57) | 100 (488.2) | 30 (146.47) | 1.5 (7.32) | 2 (9.76) | 7.5 (36.62) | 25 (122.1) |
| 15 | 1306 (6.38) | 100 (488.2) | 30 (146.47) | 1.5 (7.32) | 2 (9.76) | 7.5 (36.62) | 28 (136.7) |
| 16 | 1328 (6.49) | 100 (488.2) | 30 (146.47) | 1.5 (7.32) | 2 (9.76) | 7.5 (36.62) | 28 (136.7) |
| 17 | 1308 (6.39) | 100 (488.2) | 30 (146.47) | 1.5 (7.32) | 2 (9.76) | 7.5 (36.62) | 27 (131.8) |
| 18 | 1308 (6.39) | 100 (488.2) | 30 (146.47) | 1.5 (7.32) | 2 (9.76) | 7.5 (36.62) | 27 (131.8) |
| 19 | 1308 (6.39) | 100 (488.2) | 30 (146.47) | 1.5 (7.32) | 2 (9.76) | 7.5 (36.62) | 27 (131.8) |
| 20 | 1280 (6.25) | 100 (488.2) | 20 (97.65) | 1.5 (7.32) | 2 (9.76) | 7.5 (36.62) | 32 (156.2) |

FIG. 25A

| \multicolumn{7}{c}{TABLE VII (CONTINUED): Formulations for Sample Panels References in Example 4 Major Components (Average of Each Run, Unless Otherwise Noted)} |
|---|---|---|---|---|---|---|

| Sample Run | Approx. Weight Manila Face Cover Sheet | Approx. Weight Back Cover Sheet | Approx. Ave. Board Weight | Approx. % High Exp. Vermiculite (% by weight of Stucco) | Approx. Ave. Board Thickness | Approx. Ave. Board Density |
|---|---|---|---|---|---|---|
| | lb/msf (g/m$^2$) | lb/msf (g/m$^2$) | lb/msf (kg/m$^2$) | % | inches (cm) | pcf (kg/m$^3$) |
| 1 | 51 (249.0) | 41 (200.2) | 1850 (9.035) | 7.8 | 0.63 (1.60) | 35.16 (563.21) |
| 2 | 61 (297.8) | 41 (200.2) | 1883 (9.196) | 5.8 | 0.62 (1.57) | 36.59 (586.12) |
| 3 | 61 (297.8) | 41 (200.2) | 1863 (9.099) | 7.8 | 0.61 (1.55) | 36.90 (591.08) |
| 4 | 61 (297.8) | 41 (200.2) | 1867 (9.118) | 7.8 | 0.61 (1.55) | 36.97 (592.20) |
| 5 | 61 (297.8) | 41 (200.2) | 1856 (9.064) | 7.8 | 0.60 (1.52) | 36.90 (591.08) |
| 6 | 61 (297.8) | 41 (200.2) | 1791 (8.747) | 7.8 | 0.61 (1.55) | 35.48 (568.33) |
| 7 | 61 (297.8) | 41 (200.2) | 1862 (9.094) | 7.8 | 0.61 (1.55) | 36.16 (579.23) |
| 8 | 61 (297.8) | 41 (200.2) | 1919 (9.372) | 7.8 | 0.62 (1.57) | 37.35 (598.29) |
| 9 | 61 (297.8) | 41 (200.2) | 1911 (9.333) | 7.8 | 0.62 (1.57) | 37.35 (598.29) |
| 10 | 61 (297.8) | 41 (200.2) | 1845 (9.011) | 7.8 | 0.63 (1.60) | 35.17 (563.37) |
| 11 | 61 (297.8) | 41 (200.2) | 1871 (9.138) | 7.8 | 0.62 (1.57) | 36.16 (579.23) |
| 12 | 61 (297.8) | 41 (200.2) | 1922 (9.387) | 7.8 | 0.62 (1.57) | 36.98 (592.36) |
| 13 | 61 (297.8) | 41 (200.2) | 1854 (9.055) | 7.8 | 0.60 (1.52) | 36.81 (589.64) |
| 14 | 61 (297.8) | 41 (200.2) | 1903 (9.294) | 7.8 | 0.60 (1.52) | 38.01 (608.86) |
| 15 | 61 (297.8) | 41 (200.2) | 1853 (9.050) | 7.8 | 0.60 (1.52) | 38.01 (608.86) |
| 16 | 61 (297.8) | 41 (200.2) | 1919 (9.372) | 7.8 | 0.60 (1.52) | 37.69 (603.74) |
| 17 | 61 (297.8) | 41 (200.2) | 1919 (9.372) | 7.8 | 0.60 (1.52) | 37.86 (606.46) |
| 18 | 61 (297.8) | 41 (200.2) | 1891 (9.235) | 7.8 | 0.60 (1.52) | 37.86 (606.46) |
| 19 | 61 (297.8) | 41 (200.2) | 1890 (9.230) | 7.8 | 0.60 (1.52) | 37.86 (606.46) |
| 20 | 61 (297.8) | 41 (200.2) | 1879 (9.177) | 7.8 | 0.61 (1.55) | 37.12 (594.61) |

Notes:
Sample 1 – It was noted during production that there may have been core stucco hydration problems.
Samples 7 to 10 – It was noted during production that the panels may have been subject to over drying.
Samples 8 and 15 – It was noted that the gypsum source contained greater levels of impurities that the gypsum source(s) for the other samples.

FIG. 25B

| Sample Run | Approx. Ave. Board Weight lb/msf (kg/m²) | Approx. Ave. Board Density pcf (kg/m³) | Approx. % High Exp. Vermiculite (% by weight of Stucco) % | Approx. Percent Ave. High Temp. Heat Shrinkage(S) % | Thickness Expansion (TE) (approx. % of original thickness) % | Ratio % Thickness Expansion to % Heat Shrinkage |
|---|---|---|---|---|---|---|
| 1 | 1850 (9.035) | 35.16 (563.21) | 7.8 | 4.5 | 25 | 5.56 |
| 2 | 1883 (9.196) | 36.59 (586.12) | 5.8 | 3.7 | 14 | 3.78 |
| 3 | 1863 (9.099) | 36.90 (591.08) | 7.8 | 3.3 | 26 | 7.88 |
| 4 | 1867 (9.118) | 36.97 (592.20) | 7.8 | 3.3 | 26 | 7.88 |
| 5 | 1856 (9.064) | 36.90 (591.08) | 7.8 | 3.3 | 26 | 7.88 |
| 6 | 1791 (8.747) | 35.48 (568.33) | 7.8 | 3.5 | 11 | 3.14 |
| 7 | 1862 (9.094) | 36.16 (579.23) | 7.8 | 3.1 | 23 | 7.42 |
| 8 | 1919 (9.372) | 37.35 (598.29) | 7.8 | 3.1 | 23 | 7.42 |
| 9 | 1911 (9.333) | 37.35 (598.29) | 7.8 | 2.4 | 26 | 10.83 |
| 10 | 1845 (9.011) | 35.17 (563.37) | 7.8 | 3.5 | 23 | 6.57 |
| 11 | 1871 (9.138) | 36.16 (579.23) | 7.8 | 4.0 | 28 | 7.00 |
| 12 | 1922 (9.387) | 36.98 (592.36) | 7.8 | 4.1 | 23 | 5.61 |
| 13 | 1854 (9.055) | 36.81 (589.64) | 7.8 | 2.3 | 28 | 12.17 |
| 14 | 1903 (9.294) | 38.01 (608.86) | 7.8 | 1.8 | 29 | 16.11 |
| 15 | 1853 (9.050) | 38.01 (608.86) | 7.8 | 2.5 | 22 | 8.80 |
| 16 | 1919 (9.372) | 37.69 (603.74) | 7.8 | 2.3 | 24 | 10.43 |
| 17 | 1919 (9.372) | 37.86 (606.46) | 7.8 | 2.4 | 29 | 12.08 |
| 18 | 1891 (9.235) | 37.86 (606.46) | 7.8 | 1.9 | 33 | 17.37 |
| 19 | 1890 (9.230) | 37.86 (606.46) | 7.8 | 1.9 | 33 | 17.37 |
| 20 | 1879 (9.177) | 37.12 (594.61) | 7.8 | 3.3 | 26 | 7.88 |

TABLE VIII: High Temperature Shrinkage and High Temperature Thickness Expansion Testing of Specimens from Sample Runs Referenced in Table VII and Example 4B

FIG. 26A

| Sample Run | Approx. Ave. Board Weight lb/msf (kg/m²) | Approx. Ave. Board Density pcf (kg/m³) | Approx. % High Exp. Vermiculite (% by weight of Stucco) % | Approx. Percent Ave. High Temp. Heat Shrinkage(S) % | Thickness Expansion (TE) (approx. % of original thickness) % | Ratio % Thickness Expansion to % Heat Shrinkage |
|---|---|---|---|---|---|---|
| Commercial Comparison | | | | | | |
| Type X 5/8" | 2250 (10.989) | 43.1 (690.4) | 0 | 5.4 | -9.0 | -1.67 |
| Type C 5/8" | 2500 (12.210) | 47.9 (767.3) | 6.5 (Grade 5) | 3.0 | 0.0 | 0.00 |
| Glass Faced 5/8" | 2634 (12.864 | 50.7 (812.1) | 0 | 2.0 | N/A | |

TABLE VIII (continued): High Temperature Shrinkage and Thickness Expansion Testing of Specimens from Sample Runs Referenced in Table VII and Example 4B

FIG. 26B

| | TABLE IX: Predicted Minimum High Temperature Thermal Insulation Index Values for Desired Fire Resistance at 50, 55 and 60 Minutes in Assemblies Using Panels Formed According to Principles of the Present Disclosure, Wood Studs and Weight Loading per ASTM E119 of Specimens from Sample Runs Referenced Table VII and Example 4B | | | |
|---|---|---|---|---|
| Sample Run | Approx. Percent Ave. High Temp. Heat Shrinkage (S) | At 50 min, TI ≥ | At 55 min, TI ≥ | At 60 min, TI ≥ |
| 1 | 4.5 | 15.87 | 18.99 | 22.11 |
| 2 | 3.7 | 15.25 | 18.37 | 21.49 |
| 3 | 3.3 | 14.93 | 18.05 | 21.17 |
| 4 | 3.3 | 14.93 | 18.05 | 21.17 |
| 5 | 3.3 | 14.93 | 18.05 | 21.17 |
| 6 | 3.5 | 15.09 | 18.21 | 21.33 |
| 7 | 3.1 | 14.78 | 17.90 | 21.02 |
| 8 | 3.1 | 14.78 | 17.90 | 21.02 |
| 9 | 2.4 | 14.23 | 17.35 | 20.47 |
| 10 | 3.5 | 15.09 | 18.21 | 21.33 |
| 11 | 4.0 | 15.48 | 18.60 | 21.72 |
| 12 | 4.1 | 15.56 | 18.68 | 21.80 |
| 13 | 2.3 | 14.15 | 17.27 | 20.39 |
| 14 | 1.8 | 13.76 | 16.88 | 20.00 |
| 15 | 2.5 | 14.31 | 17.43 | 20.55 |
| 16 | 2.3 | 14.15 | 17.27 | 20.39 |
| 17 | 2.4 | 14.23 | 17.35 | 20.47 |
| 18 | 1.9 | 13.84 | 16.96 | 20.08 |
| 19 | 1.9 | 13.84 | 16.96 | 20.08 |
| 20 | 3.3 | 14.93 | 18.05 | 21.17 |
| Commercial Comparison | | | | |
| Type X 5/8" | 5.4 | 16.57 | 19.69 | 22.81 |
| Type C 5/8" | 3.0 | 14.70 | 17.82 | 20.94 |
| Glass Faced 5/8" | 2.0 | 13.92 | 17.04 | 20.16 |

FIG. 27

| Sample Run | Approx. Ave. Board Weight lb/msf (kg/m²) | Approx. Ave. Board Density pcf (kg/m³) | Approx. % High Exp. Vermiculite % by weight of Stucco | Ave. Thermal Insulation Index (TI) Values mins. from 40°C to 200°C | Ratio of Ave. Thermal Insulation Index (TI) Values To Ave. Board Density (mins./pcf) mins./pcf (mins/(kg/m³)) |
|---|---|---|---|---|---|
| 1 | 1850 (9.035) | 35.16 (563.21) | 7.8 | 22.95 | 0.65 (0.041) |
| 2 | 1883 (9.196) | 36.59 (586.12) | 5.8 | 24 | 0.66 (0.041) |
| 3 | 1863 (9.099) | 36.90 (591.08) | 7.8 | 25.06 | 0.68 (0.042) |
| 4 | 1867 (9.118) | 36.97 (592.20) | 7.8 | 25.19 | 0.68 (0.043) |
| 5 | 1856 (9.064) | 36.90 (591.08) | 7.8 | 25.19 | 0.68 (0.043) |
| 6 | 1791 (8.747) | 35.48 (568.33) | 7.8 | 23 | 0.65 (0.040) |
| 7 | 1862 (9.094) | 36.16 (579.23) | 7.8 | 21.7 | 0.60 (0.037) |
| 8 | 1919 (9.372) | 37.35 (598.29) | 7.8) | 23.13 | 0.62 (0.039) |
| 9 | 1911 (9.333) | 37.35 (598.29) | 7.8 | 24 | 0.64 (0.040) |
| 10 | 1845 (9.011) | 35.17 (563.37) | 7.8 | 24 | 0.68 (0.043) |
| 11 | 1871 (9.138) | 36.16 (579.23) | 7.8 | 23.7 | 0.66 (0.041) |
| 12 | 1922 (9.387) | 36.98 (592.36) | 7.8 | 23.5 | 0.64 (0.040) |
| 13 | 1854 (9.055) | 36.81 (589.64) | 7.8 | 24.1 | 0.65 (0.041) |
| 14 | 1903 (9.294) | 38.01 (608.86) | 7.8 | 23.4 | 0.62 (0.038) |
| 15 | 1853 (9.050) | 38.01 (608.86) | 7.8 | 23.5 | 0.62 (0.039) |
| 16 | 1919 (9.372) | 37.69 (603.74) | 7.8 | 23.1 | 0.61 (0.038) |
| 17 | 1891 (9.235) | 37.86 (606.46) | 7.8 | 22.9 | 0.60 (0.038) |
| 18 | 1889 (9.226) | 37.86 (606.46) | 7.8 | 22.9 | 0.60 (0.038) |
| 19 | 1890 (9.230) | 37.86 (606.46) | 7.8 | 22.9 | 0.60 (0.038) |
| 20 | 1879 (9.177) | 37.12 (594.61) | 7.8 | 25.13 | 0.68 (0.042) |

TABLE X: High Temperature Thermal Insulation Testing of Specimens From Sample Runs Referenced in Table VII and Example 4D

FIG. 28A

| TABLE X (continued): High Temperature Thermal Insulation Testing of Specimens From Sample Runs Referenced in Table VII and Example 4D |||||||
|---|---|---|---|---|---|
| Sample Run | Approx. Ave. Board Weight | Approx. Ave. Board Density | Approx. % High Exp. Vermiculite | Ave. Thermal Insulation Index (*TI*) Values | Ratio of Ave. Thermal Insulation Index (*TI*) Values To Ave. Board Density (mins./pcf) |
| | lb/msf (kg/m²) | pcf (kg/m³) | % by weight of Stucco | mins. from 40°C to 200°C | mins./pcf (mins/(kg/m³)) |
| Commercial Comparison ||||||
| Type X 5/8" | 2250 (10.989) | 43.1 (690.4) | 0 | 25.5 | 0.59 (0.033) |
| Type C 5/8" | 2500 (12.210) | 47.9 (767.3) | 6.5 (Grade 5) | 28 | 0.58 (0.036) |
| Glass Faced 5/8" | 2634 (12.864) | 50.7 (812.1) | 0 | 28 | 0.55 (0.034) |

FIG. 28B

| Sample Run | Approx. Ave. Board Weight lb/msf (kg/m²) | Approx. Ave. Board Density pcf (kg/m³) | Approx. % High Exp. Vermiculite % by weight of Stucco | Test Type | Type of Assembly Construction |
|---|---|---|---|---|---|
| 1 | 1850 (9.035) | 35.16 (563.21) | 7.8 | U419 | NLB;HA;JA |
| 2 | 1883 (9.196) | 36.59 (586.12) | 5.8 | U419 | NLB;HA;JA |
| 3 | 1863 (9.099) | 36.90 (591.08) | 7.8 | U419 | NLB;HA;JA |
| 4 | 1867 (9.118) | 36.97 (592.20) | 7.8 | U419 | NLB;HA;JA |
| 5 | 1856 (9.064) | 36.90 (591.08) | 7.8 | U419 | NLB;HA;JA |
| 6 | 1791 (8.747) | 35.48 (568.33) | 7.8 | U419 | NLB;HA;JA |
| 7 | 1862 (9.094) | 35.91 (575.22) | 7.8 | U419 | NLB;HA;JA |
| 8 | 1919 (9.372) | 37.35 (598.29) | 7.8 | U419 | NLB;HA;JA |
| 9 | 1911 (9.333) | 36.91 (591.24) | 7.8 | U419 | NLB;HA;JA |
| 10 | 1845 (9.011) | 35.18 (563.53) | 7.8 | U419 | NLB;HA;JA |
| 11 | 1871 (9.138) | 36.16 (579.23) | 7.8 | U419 | NLB;HA;JA |
| 12 | 1922 (9.387) | 36.98 (592.36) | 7.8 | U419 | NLB;HA;JA |
| 13 | 1854 (9.055) | 36.81 (589.64) | 7.8 | U419 | NLB;HA;JA |
| 14 | 1903 (9.294) | 38.01 (608.86) | 7.8 | U419 | NLB;HA;JA |
| 15 | 1853 (9.050) | 36.92 (639.46) | 7.8 | U419 | NLB;HA;JA |
| 16 | 1919 (9.372) | 37.69 (603.74) | 7.8 | U419 | NLB;HA;JA |
| 17 | 1891 (9.235) | 37.86 (606.46) | 7.8 | U419 | NLB;HA;JA |
| 18 | 1889 (9.226) | 37.65 (603.10) | 7.8 | U423 | LB;HA;JA |
| 19 | 1890 (9.230) | 37.56 (601.65) | 7.8 | U305 | LB;HA;JA |
| 20 | 1879 (9.177) | 37.12 (594.61) | 7.8 | U305 | LB;HA;JA |
| 21 | 2250 (10.989) | 43 (688.79) | 0 | U419 | NLB;HA;JA |
| 22 | 2634 (12.864) | 50.68 (812.82) | 0 | U423 | LB;HA;JA |

Notes:

NLB – Non Load Bearing
LB – Load Bearing
HA – Horizontal Application of Panels
JA – Joints Aligned, Heated, Unheated Sides

FIG. 29A

| | | TABLE XI (CONTINUED): Data From Fire Testing of Specimens From Sample Runs Referenced in Table VII and Example 4E | | | |
|---|---|---|---|---|---|
| Sample Run | Stud Type | Max. Temp At 50 Min, Unexposed, Single Sensor, °F (°C) | Ave. Temp At 50 Min, Unexposed, Ave. Of Sensors, °F (°C) | Max. Temp At 55 Min, Unexposed, Single Sensor, °F (°C) | Ave. Temp At 55 Min, Unexposed, Ave. Of Sensors, °F (°C) |
| 1 | 0.018" LGS | 247 (119) | 234 (112) | 267 (131) | 256 (124) |
| 2 | 0.018" LGS | 249 (121) | 229 (109) | 270 (132) | 251 (122) |
| 3 | 0.018" LGS | 246 (119) | 237 (114) | 267 (132) | 255 (124) |
| 4 | 0.018" LGS | 251 (122) | 242 (117) | 261 (127) | 256 (124) |
| 5 | 0.015" LGS | 245 (118) | 236 (113) | 263 (128) | 250 (121) |
| 6 | 0.015" LGS | 251 (122) | 243 (117) | 314 (157) | 273 (134) |
| 7 | 0.015" LGS | 253 (123) | 241 (116) | 357 (181) | 277 (136) |
| 8 | 0.015" LGS | 248 (120) | 235 (113) | 283 (139) | 259 (126) |
| 9 | 0.015" LGS | 252 (122) | 243 (117) | 297 (147) | 266 (130) |
| 10 | 0.015" LGS | 244 (118) | 236 (113) | 263 (128) | 254 (123) |
| 11 | 0.015" LGS | 246 (119) | 237 (114) | 261 (127) | 253 (123) |
| 12 | 0.015" LGS | 246 (119) | 232 (111) | 264 (129) | 251 (122) |
| 13 | 0.015" LGS | 246 (119) | 237 (114) | 262 (128) | 252 (122) |
| 14 | 0.015" LGS | 243 (117) | 234 (112) | 259 (126) | 250 (121) |
| 15 | 0.015" LGS | 254 (123) | 243 (117) | 273 (134) | 260 (127) |
| 16 | 0.015" LGS | 252 (122) | 241 (116) | 267 (131) | 257 (125) |
| 17 | 0.015" LGS | 245 (118) | 238 (114) | 260 (127) | 252 (122) |
| 18 | 0.032" SS | 251 (122) | 230 (110) | 261 (127) | 242 (117) |
| 19 | #2 DGF | 235 (113) | 222 (106) | 257 (125) | 235 (113) |
| 20 | #2 DGF | 226 (108) | 212 (100) | 238 (114) | 224 (107) |
| 21 | 0.015" LGS | 248 (120) | 234 (112) | 258 (126) | 250 (121) |
| 22 | 0.032" SS | 230 (110) | 215 (102) | 253 (123) | 226 (108) |
| Notes: LGS – Light Gauge Steel WS – Wood Stud SS – Steel Stud DGF – Douglas Fir Wood Stud | | | | | |

FIG. 29B

| | TABLE XI (CONTINUED): Data From Fire Testing of Specimens From Sample Runs Referenced Table VII and Example 4E | | | | |
|---|---|---|---|---|---|
| Sample Run | Max. Temp At 60 Min, Unexposed, Single Sensor, °F (°C) | Ave. Temp At 60 Min, Unexposed, Ave. Of Sensors, °F (°C) | Time at Term., Single Sensor, Unexposed Side (min' sec") | Max. Temp At Term., Unexposed, Single Sensor, °F (°C) | Max. Temp At Term., Unexposed, Ave. Of Sensors, °F (°C) |
| 1 | 398 (203) | 322 (161) | 60'00" | 398 (203) | 322 (161) |
| 2 | 443 (228) | 308 (153) | 60'00" | 549 (287) | 364 (184) |
| 3 | 406 (208) | 305 (152) | 60'00" | 547 (286) | 388 (198) |
| 4 | 375 (191) | 298 (148) | 60'00" | 470 (243) | 347 (175) |
| 5 | 354 (179) | 285 (141) | 60'00" | 451 (233) | 337 (169) |
| 6 | 468 (58'00") (242) | 336 (58'00") (169) | 60'00" | 468 (242) | 336 (169) |
| 7 | 499 (58'00") (259) | 338 (58'00") (170) | 60'00" | 499 (259) | 338 (170) |
| 8 | 423 (59'00") (217) | 326 (59'00") (163) | 60'00" | 423 (217) | 326 (163) |
| 9 | 508 (264) | 373 (189) | 60'00" | 508 (264) | 373 (189) |
| 10 | 420 (216) | 330 (166) | 60'00" | 420 (216) | 330 (166) |
| 11 | 405 (207) | 318 (159) | 60'00" | 405 (207) | 318 (159) |
| 12 | 394 (201) | 307 (153) | 60'00" | 440 (227) | 333 (167) |
| 13 | 395 (202) | 306 (152) | 60'00" | 452 (233) | 344 (173) |
| 14 | 351 (177) | 292 (144) | 60'00" | 481 (249) | 363 (184) |
| 15 | 465 (241) | 358 (181) | 60'00" | 465 (241) | 360 (182) |
| 16 | 435 (224) | 336 (169) | 60'00" | 481 (249) | 363 (184) |
| 17 | 391 (199) | 327 (164) | 60'00" | 499 (259) | 403 (206) |
| 18 | 307 (153) | 274 (134) | 60'00" | 433 (223) | 338 (170) |
| 19 | 261 (127) | 243 (117) | 60'00" | 265 (129) | 248 (120) |
| 20 | 245 (118) | 235 (113) | 60'00" | 252 (122) | 245 (118) |
| 21 | 361 (183) | 292 (144) | 60'00" | 452 (233) | 346 (174) |
| 22 | 363 (184) | 259 (126) | 60'00" | 417 (214) | 278 (137) |

Notes:
Sample 1 – It was noted during production that there may have been core stucco hydration problems.
Samples 6, 7 and 9 – The test terminated before 60 minutes, and termination time indicated.
Samples 7 to 10 – It was noted during production that the panels may have been subject to over drying.
Samples 8 and 15 – It was noted that the gypsum source contained greater levels of impurities that the gypsum source(s) for the other samples.
Sample 21 – Commercial Sheetrock® brand Type X gypsum panels
Sample 22 – Commercial 5/8" thick Securock® brand glass faced gypsum panels

FIG. 29C

| TABLE XII: Data From Nail Pull Resistance Testing Of Specimens From Sample Runs Referenced in Table VII and Example 5 | | | |
|---|---|---|---|
| Sample Run | Approx. Ave. Board Weight | Approx. Ave. Board Density | Approx. Nail-Pull Strength |
| | lb/msf (kg/m$^2$) | pcf (kg/m$^3$) | lb-f (N) |
| 1 | 1850 (9.035) | 35.16 (563.21) | 73.6 (327.4) |
| 2 | 1883 (9.196) | 36.59 (586.12) | 92.1 (409.7) |
| 3 | 1863 (9.099) | 36.90 (591.08) | 96.3 (428.4) |
| 4 | 1867 (9.118) | 36.97 (592.20) | 96.3 (428.4) |
| 5 | 1856 (9.064) | 36.90 (591.08) | 96.3 (428.4) |
| 6 | 1791 (8.747) | 35.48 (568.33) | 87.2 (387.9) |
| 7 | 1862 (9.094) | 36.16 (579.23) | 106.6 (474.2) |
| 8 | 1919 (9.372) | 37.35 (598.29) | 106.6 (474.2) |
| 9 | 1911 (9.333) | 37.35 (598.29) | 106.6 (474.2) |
| 10 | 1845 (9.011) | 35.17 (563.37) | 86.2 (3383.4 |
| 11 | 1871 (9.138) | 36.16 (579.23) | 106.7 (474.6) |
| 12 | 1922 (9.387) | 36.98 (592.36) | 106.7 (474.6) |
| 13 | 1854 (9.055) | 36.81 (589.64) | 102.2 (454.6) |
| 14 | 1903 (9.294) | 38.01 (608.86) | 107.5 (478.2) |
| 15 | 1853 (9.050) | 38.01 (608.86) | 104.5 (464.8) |
| 16 | 1919 (9.372) | 37.69 (603.74) | 104.5 (464.8) |
| 17 | 1891 (9.235) | 37.86 (606.46) | 106.5 (473.7) |
| 18 | 1889 (9.226) | 37.86 (606.46) | 106.5 (473.7) |
| 19 | 1890 (9.230) | 37.86 (606.46) | 106.5 (473.7) |
| 20 | 1879 (9.177) | 37.12 (594.61) | 96.3 (428.4) |
| | | | |
| 23 | 1863 (9.099) | 36.2 (579.87) | 90.0 (400.3) |
| 24 | 1806 (8.820) | 35.0 (560.65) | 83.1 (369.6) |
| 25 | 1725 (8.425) | 33.2 (531.81 | 74.8 (332.7) |
| 26 | 2252 (10.998) | 43.1 (690.40) | 100.3 (446.2) |
| Notes: | | | |
| Sample 26 – Commercial 5/8" Sheetrock® brand Type X gypsum panels Same paper thickness used, nail pull proportional to density to third power with r (squared) +0.94 | | | |

FIG. 30

| TABLE XIII: Data From Flexural Strength Testing of Specimens From Sample Runs 17, 18, and 19 ||||||||
|---|---|---|---|---|---|---|---|
| Flexural Strength — Peak Load lb-f (N) ||||||||
| Specimen | XD FU | XD FD | Average | | MD FU | MD FD | Average |
| 1 | 208.4 (927.0) | 259.9 (1156.1) | 234.2 (1041.8) | | 81.0 (360.3) | 90.6 (403.0) | 85.8 (381.7) |
| 2 | 196.0 (871.9) | 250.6 (1114.7) | 223.3 (993.3) | | 77.9 (346.5) | 87.4 (388.8) | 82.7 (367.9) |
| 3 | 208.3 (926.6) | 251.8 (1120.1) | 230.1 (1023.5) | | 83.3 (370.5) | 87.7 (390.1) | 85.5 (380.3) |
| 4 | 199.7 (888.3) | 253.9 (1129.4) | 226.8 (1008.9) | | 79.0 (351.4) | 86.2 (383.4) | 82.6 (367.4) |
| 5 | 202.0 (898.5) | 258.2 (1148.5) | 230.1 (1023.5) | | 79.1 (351.9) | 82.8 (368.3) | 81.0 (360.3) |
| 6 | 203.4 (904.8) | 254.1 (1130.3) | 228.8 (1017.8) | | 75.5 (335.8) | 89.9 (399.9) | 82.7 (367.9) |
| 7 | 187.1 (832.3) | 245.1 (1090.3) | 216.1 (961.3) | | 73.3 (326.1) | 88.4 (393.2) | 80.9 (359.9) |
| 8 | 190.4 (846.9) | 243.1 (1081.4) | 216.8 (964.4) | | 64.1 (285.1) | 79.3 (352.7) | 71.7 (318.9) |
| 9 | 193.9 (862.5) | 258.4 (1149.4) | 226.2 (1006.2) | | 67.0 (298.0) | 76.0 (338.1) | 71.5 (318.0) |
| 10 | 193.3 (859.8) | 241.5 (1074.2) | 217.4 (967.0) | | 67.8 (301.6) | 79.7 (354.5) | 73.8 (328.3) |
| 11 | 189.4 (842.5) | 253.4 (1127.2) | 221.4 (984.8) | | 69.1 (307.4) | 82.2 (365.6) | 75.7 (336.7) |
| 12 | 182.3 (810.9) | 242.1 (1076.9) | 212.2 (943.9) | | 62.4 (277.6) | 77.6 (345.2) | 70.0 (311.4) |
| Overall Average | | | 223.6 (994.6) | | | | 78.6 (349.6) |

Notes:
XD: cross direction or perpendicular
MD: machine direction or parallel
FU: face up
FD: face down ASTM C 1396 / C 1396M-06 flexural strength specification for 5/8" thick gypsum panel – perpendicular (XD) 147 lb-f, parallel (MD) 46 lb-f.

FIG. 31

| TABLE XIV: Data From Core, End, and Edge Hardness Testing of Specimens From Sample Runs 17, 18, and 19 ||||||
|---|---|---|---|---|---|
| Core, End, and Edge Hardness lb-f (N) ||||||
| Specimen | Sample | Measurement ||| Average |
| | | 1 | 2 | 3 | |
| 1 | Code Edge | 38.3 (170.4) | 27.7 (123.2) | 59.5 (264.7) | 41.82 (186.0) |
| | NC Edge | 57.7 (256.7) | 54.4 (242.0) | 54.9 (244.2) | 55.67 (247.6) |
| | Core | 20.1 (89.4) | 18.7 (83.2) | 15.0 (66.7) | 21.38 (95.1) |
| | End | 23.7 (105.4) | 17.9 (79.6) | 22.6 (100.5) | 17.91 (79.7) |
| 2 | Code Edge | 68.3 (303.8) | 42.6 (189.5) | 65.6 (291.8) | 58.84 (261.7) |
| | NC Edge | 59.2 (263.3) | 58.2 (258.9) | 62.7 (278.9) | 60.03 (267.0) |
| | Core | 21.3 (94.8) | 19.5 (86.7) | 22.1 (98.3) | 21.74 (96.7) |
| | End | 21.3 (94.8) | 21.9 (97.4) | 22.0 (97.9) | 20.96 (93.2) |
| 3 | Code Edge | 28.1 (125.0) | 31.1 (138.3) | 28.5 (126.8) | 29.23 (130.0) |
| | NC Edge | 34.1 (151.7) | 41.9 (186.3) | 45.8 (203.7) | 40.57 (180.5) |
| | Core | 18.0 (80.1) | 19.8 (88.1) | 24.4 (108.5) | 20.87 (92.8) |
| | End | 21.6 (96.1) | 21.6 (96.1) | 19.4 (86.3) | 20.74 (92.3) |
| 4 | Code Edge | 39.2 (174.4) | 38.8 (172.6) | 25.3 (112.5) | 34.41 (153.1) |
| | NC Edge | 42.4 (188.6) | 45.5 (202.4) | 38.7 (172.2) | 42.22 (187.8) |
| | Core | 19.2 (85.4) | 24.2 (107.7) | 25.1 (111.7) | 23.03 (102.4) |
| | End | 26.5 (117.9) | 19.7 (87.6) | 22.9 (101.9) | 22.80 (101.4) |
| 5 | Code Edge | 52.4 (233.1) | 42.5 (189.1) | 45.2 (201.1) | 46.70 (207.7) |
| | NC Edge | 36.1 (160.6) | 43.6 (193.9) | 47.2 (210.0) | 42.30 (188.2) |
| | Core | 20.5 (91.2) | 22.9 (101.9) | 22.6 (100.5) | 26.34 (117.2) |
| | End | 31.7 (141.0) | 25.1 (111.7) | 22.3 (99.2) | 22.02 (98.0) |
| 6 | Code Edge | 53.9 (239.8) | 42.7 (189.9) | 52.2 (232.2) | 49.61 (220.7) |
| | NC Edge | 22.7 (101.0) | 25.2 (112.1) | 57.7 (256.7) | 35.19 (156.5) |
| | Core | 15.3 (68.1) | 18.0 (80.1) | 18.5 (82.3) | 17.30 (77.0) |
| | End | 21.1 (93.9) | 18.8 (83.6) | 20.2 (89.9) | 20.02 (89.1) |

FIG. 32A

| Specimen | Sample | Measurement 1 | Measurement 2 | Measurement 3 | Average |
|---|---|---|---|---|---|
| | \multicolumn{5}{c}{TABLE XIV (CONTINUED): Data From Core, End, and Edge Hardness Testing of Specimens From Sample Runs 17, 18, and 19} |
| | \multicolumn{5}{c}{Core, End, and Edge Hardness lb-f (N)} |
| 7 | Code Edge | 39.2 (174.4) | 43.7 (194.4) | 35.2 (156.6) | 39.34 (175.0) |
| 7 | NC Edge | 48.5 (215.7) | 53.2 (236.7) | 57.6 (256.2) | 53.08 (236.1) |
| 7 | Core | 16.8 (74.7) | 21.6 (96.1) | 17.4 (77.4) | 18.62 (82.8) |
| 7 | End | 19.4 (86.3) | 19.7 (87.6) | 20.8 (192.5) | 19.92 (88.6) |
| 8 | Code Edge | 41.8 (185.9) | 46.8 (208.2) | 44.7 (198.8) | 44.40 (197.5) |
| 8 | NC Edge | 44.4 (197.5) | 42.7 (189.9) | 44.3 (197.1) | 43.80 (194.8) |
| 8 | Core | 18.6 (82.7) | 21.0 (93.4) | 17.1 (76.1) | 18.88 (84.0) |
| 8 | End | 21.7 (96.5) | 20.1 (89.4) | 17.1 (76.1) | 19.64 (87.4) |
| 9 | Code Edge | 21.1 (93.9) | 39.6 (176.2) | 48.5 (215.7) | 36.39 (161.9) |
| 9 | NC Edge | 39.8 (177.0) | 48.5 (215.7) | 48.2 (214.4) | 45.48 (202.3) |
| 9 | Core | 19.9 (88.5) | 20.5 (91.2) | 21.1 (93.9) | 20.50 (91.2) |
| 9 | End | 19.7 (87.6) | 18.1 (80.5) | 22.5 (100.1) | 20.09 (89.4) |
| 10 | Code Edge | 47.2 (210.0) | 35.4 (157.5) | 39.1 (173.9) | 40.58 (180.5) |
| 10 | NC Edge | 42.4 (188.6) | 44.8 (199.3) | 50.5 (224.6) | 45.88 (204.1) |
| 10 | Core | 16.7 (74.3) | 18.3 (81.4) | 16.0 (71.2) | 17.01 (75.7) |
| 10 | End | 22.5 (100.1) | 20.7 (92.1) | 19.8 (88.1) | 20.99 (93.4) |
| 12 | Code Edge | 39.8 (177.0) | 43.7 (194.4) | 38.4 (170.8) | 40.61 (180.6) |
| 12 | NC Edge | 48.2 (214.4) | 37.1 (165.0) | 36.2 (161.0) | 40.48 (180.1) |
| 12 | Core | 21.0 (93.4) | 20.4 (90.7) | 25.4 (113.0) | 22.25 (99.0) |
| 12 | End | 22.1 (98.3) | 18.9 (84.1) | 22.7 (101.0) | 21.23 (94.4) |
| 13 | Code Edge | 22.9 (101.9) | 38.5 (171.3) | 40.8 (181.5) | 34.02 (151.3) |
| 13 | NC Edge | 53.6 (238.4) | 36.6 (162.8) | 24.1 (107.2) | 38.06 (169.3) |
| 13 | Core | 19.2 (85.4) | 18.0 (80.1) | 22.3 (99.2) | 19.83 (88.2) |
| 13 | End | 21.7 (96.5) | 21.2 (94.3) | 20.2 (89.9) | 20.99 (93.4) |

FIG. 32B

| TABLE XIV (CONTINUED): Data From Core, End, and Edge Hardness Testing of Specimens From Sample Runs 17, 18, and 19 ||||||
|---|---|---|---|---|---|
| Core, End, and Edge Hardness lb-f (N) ||||||
| Specimen | Sample | Measurement ||| Average |
| | | 1 | 2 | 3 | |
| Overall Average | Code Edge | | | | 41.33 (183.8) |
| | NC Edge | | | | 45.23 (201.2) |
| | Core | | | | 20.64 (91.8) |
| | End | | | | 20.61 (91.7) |
| Notes: |||||||
| Code Edge: edge of gypsum panel including printed code on back face (i.e., one edge) ||||||
| NC Edge: edge of gypsum panel without printed code on back face (i.e., the other edge) ||||||
| ASTM C 1396 / C 1396M-06 core, end, and edge hardness specification for gypsum panel – 11 lb-f (49 N) ||||||

FIG. 32C

| | TABLE XV: Data from Sound Transmission Loss Testing of Examples of Gypsum Panels Formed According to Principles of the Present Disclosure and Type X Commercial Fire Rated Gypsum Panels | | | | |
|---|---|---|---|---|---|
| Test # | UL Procedure D Framing | | Insulation | Panels | STC |
| 1 | U419 | SS | No | Inv. | 38 |
| 2 | U419 | SS | Yes | Inv. | 43 |
| 3 | U305 | WS | No | Inv. | 33 |
| 4 | U305 | WS | Yes | Inv. | 35 |

Notes:

WS – Wood Stud, 2 inches by 4 inches, 16" off center assembly construction
SS – Steel Stud, 3 inch by 5/8 inch galvanized, 25 gauge, 24" off center assembly construction
Insulation – 3.5 inch R-11 fiberglass
Inv. – Reduced weight, reduced density panels of the invention

FIG. 33

| TABLE XVI: Lab Evaluation of Siloxane/Starch Treated Panels ||||||
|---|---|---|---|---|---|
| Formulation Ingredients | Formulation lb/msf (g/m$^2$) | Cube formulation (based on stucco weight) ||||
| | | Siloxane Usage (12 lb/msf) (58.59 g/m$^2$) (%) | Siloxane Usage (10 lb/msf) (48.82 g/m$^2$) (%) | Siloxane Usage (8 lb/msf) (39.06 g/m$^2$) (%) | Siloxane Usage (6 lb/msf) (29.29 g/m$^2$) (%) |
| Cube Density at about 36.5 lb/cu. ft. (584.8 kg/m$^3$) ||||||
| Siloxane | 0 | 1.06 | 0.88 | 0.70 | 0.53 |
| MgO | 0 | 0.22 | 0.22 | 0.22 | 0.22 |
| Fly Ash | 0 | 0.86 | 0.72 | 0.57 | 0.43 |
| Stucco | 1395 (6811.0) | 100.00 | 100.00 | 100.00 | 100.00 |
| Water | 1527 (7455.4) | 110.00 | 110.00 | 110.00 | 110.00 |
| HRA | 25 (122.1) | 1.80 | 1.80 | 1.80 | 1.80 |
| Soap | 0.215 (1.1) | 0.02 | 0.02 | 0.02 | 0.02 |
| Pregelatinized Corn Starch | 30 (146.5) | 2.15 | 2.15 | 2.15 | 2.15 |
| Dispersant | 2.5 (12.2) | 0.18 | 0.18 | 0.18 | 0.18 |
| Sodium trimetaphosphate (10% solution) | 14 (68.4) | 1.00 | 1.00 | 1.00 | 1.00 |
| Glass Fiber | 7.5 (36.6) | 0.53 | 0.53 | 0.53 | 0.53 |
| Grade #4 Vermiculite | 100 (488.2) | 7.2 | 7.2 | 7.2 | 7.2 |
| Water Adsorption of Lab Cast Cube (%) | n/a | 2.85 | 2.64 | 3.37 | 6.80 |

FIG. 34A

| TABLE XVI (CONTINUED): Lab Evaluation of Siloxane/Starch Treated Panels | | | | | |
|---|---|---|---|---|---|
| Formulation Ingredients | Formulation lb/msf (g/m²) | Cube formulation (based on stucco weight) | | | |
| | | Siloxane Usage (12 lb/msf) (58.59 g/m²) (%) | Siloxane Usage (10 lb/msf) (48.82 g/m²) (%) | Siloxane Usage (8 lb/msf) (39.06 g/m²) (%) | Siloxane Usage (6 lb/msf) (29.29 g/m²) (%) |
| Cube Density at about 30 lb/cu. ft. (480.7 kg/m³) | | | | | |
| Siloxane | 0 | 1.06 | 0.88 | 0.70 | 0.53 |
| MgO | 0 | 0.22 | 0.22 | 0.22 | 0.22 |
| Fly ash | 0 | 0.86 | 0.72 | 0.57 | 0.43 |
| Stucco | 1395 (6811.0) | 100.00 | 100.00 | 100.00 | 100.00 |
| Water | 1927 (9408.4) | 138 | 138 | 138 | 138 |
| HRA | 25 (122.1) | 1.80 | 1.80 | 1.80 | 1.80 |
| Soap | 0.45 (2.2) | 0.03 | 0.03 | 0.03 | 0.03 |
| Pregelatinized Corn Starch | 30 (146.5) | 2.15 | 2.15 | 2.15 | 2.15 |
| Dispersant | 2.5 (12.2) | 0.18 | 0.18 | 0.18 | 0.18 |
| Sodium trimetaphosphate (10% solution) | 14 (68.4) | 1.00 | 1.00 | 1.00 | 1.00 |
| Glass Fiber | 7.5 (36.6) | 0.53 | 0.53 | 0.53 | 0.53 |
| Grade #4 Vermiculite | 100 (488.2) | 7.2 | 7.2 | 7.2 | 7.2 |
| Water Adsorption of Lab Cast Cube (%) | n/a | 3.40 | 3.77 | 3.72 | 7.26 |

FIG. 34B

| | | | TABLE XVII: High Temperature Shrinkage and Thermal Expansion Testing of Specimens from Laboratory Samples Referenced in Example 10 | | | |
|---|---|---|---|---|---|---|
| Sample Run | Approx. Ave. Board Density (pcf) (kg/m³) | Type of Vermiculite | High Exp. Vermiculite (% by weight of Stucco) | High Temp. Heat Shrinkage(S) (Avg. %) | Thickness Expansion (TE) (Avg. %) | TE to S Ratio |
| 1 | 33.9 (543.6) | Palabora micron | 4% | 3.9% | -3.3 | -0.85 |
| 2 | 34.5 (552.3) | Palabora micron | 6% | 3.8% | 2.6 | 0.67 |
| 3 | 34.6 (554.8) | Palabora micron | 8% | 2.4% | 9.1 | 3.85 |
| 4 | 35.2 (564.1) | Palabora micron | 10% | 2.4% | 13.0 | 5.33 |
| 5 | 34.0 (545.2) | Palabora superfine | 4% | 3.9% | 2.6 | 0.66 |
| 6 | 34.4 (552.0) | Palabora superfine | 6% | 2.4% | 15.5 | 6.49 |
| 7 | 34.6 (554.8) | Palabora superfine | 8% | 1.6% | 28.3 | 17.99 |
| 8 | 35.1 (562.9) | Palabora superfine | 10% | 1.5% | 23.4 | 15.73 |

FIG. 35

| Sample Run | Approx. Ave. Board Weight | Approx. Ave. Board Density | Type of Vermiculite | High Exp. Vermiculite (% by weight of Stucco) | Avg. Thermal Insulation Index (*TI*) (mins. from 100°F to 400°F) | Ratio of Avg. *TI* (mins.) To Avg. Board Density |
|---|---|---|---|---|---|---|
| | lb/msf (kg/m²) | pcf (kg/m³) | | | mins. | mins./pcf (mins/(kg/m³)) |
| 1 | 1753 (8.559) | 33.9 (543.6) | Palabora micron | 4% | 24.63 | 0.73 (0.05) |
| 2 | 1781 (8.696) | 34.5 (552.3) | Palabora micron | 6% | 24.75 | 0.72 (0.04) |
| 3 | 1789 (8.735) | 34.6 (554.8) | Palabora micron | 8% | 24.75 | 0.71 (0.04) |
| 4 | 1819 (8.881) | 35.2 (564.1) | Palabora micron | 10% | 24.38 | 0.69 (0.04) |
| 5 | 1758 (8.583) | 34.0 (545.2) | Palabora superfine | 4% | 24.75 | 0.73 (0.05) |
| 6 | 1780 (8.691) | 34.4 (552.0) | Palabora superfine | 6% | 24.88 | 0.72 (0.05) |
| 7 | 1789 (8.735) | 34.6 (554.8) | Palabora superfine | 8% | 25.25 | 0.73 (0.05) |
| 8 | 1815 (8.862) | 35.1 (562.9) | Palabora superfine | 10% | 25.75 | 0.73 (0.05) |

TABLE XVIII: High Temperature Thermal Insulation Testing of Specimens From Laboratory Samples Referenced in Example 10

FIG. 36

| Table XIX: Formulations for Laboratory Samples With varying Amounts of Vermiculite | | | | | | |
|---|---|---|---|---|---|---|
| Sample | Stucco (g) | Vermiculite (g) | HRA (g) | Starch (g) | Glass (g) | Water (mls) |
| 4% Vermiculite | 1000 | 40 | 11 | 15 | 6 | 2000 |
| 6% Vermiculite | 1000 | 60 | 11 | 15 | 6 | 2000 |
| 8% Vermiculite | 1000 | 80 | 11 | 15 | 6 | 2000 |
| 10% Vermiculite | 1000 | 100 | 11 | 15 | 6 | 2000 |
| Notes: The South African grades of vermiculite correspond to Grade 4 vermiculite using the U.S. grading system. | | | | | | |

FIG. 37

TABLE XXa:
High Temperature Thermal Insulation Index Testing of Specimens from Laboratory Samples Referenced in Example 11A

| Sample | Approx. Ave. Board Density (pcf) (kg/m³) | Approx. High Expan. Vermiculite (% by weight of Stucco) | Stucco (lbs/MSF) (kg/m²) | Approx. ATH (% by weight of Stucco) | ATH (lbs/MSF) (g/m²) | Avg. Thermal Insulation Index (TI) (mins. from 40°C to 200°C) | Stucco Diff. (lbs/MSF) (g/m²) | TI Change |
|---|---|---|---|---|---|---|---|---|
| 1 | 29.8 (477.5) | 0% | 1250 (6.11) | 0% | 0 | 22.6 | 0 | 0 |
| 2 | 30.5 (488.7) | 0% | 1230 (6.01) | 4% | 49 (239.3) | 23.5 | -20 (-97.7) | 0.9 |

FIG. 38A

TABLE XXb:
High Temperature Thermal Insulation Index Testing of Specimens from Laboratory Samples Referenced in Example 11A

| Sample | Approx. Ave. Board Density (pcf) (kg/m³) | Approx. High Expan. Vermiculite (% by weight of Stucco) | Stucco (lbs/MSF) (kg/m²) | Approx. ATH (% by weight of Stucco) | ATH (lbs/MSF) (g/m²) | Avg. Thermal Insulation Index (TI) (mins. from 40°C to 200°C) | Stucco Diff. (lbs/MSF) (g/m²) | TI Change |
|---|---|---|---|---|---|---|---|---|
| 3 | 30.8 (493.5) | 7% | 1225 (5.98) | 0% | 0 | 23 | 0 | 0 |
| 4 | 31.6 (506.3) | 7% | 1230 (6.01) | 2% | 25 (122.1) | 24.6 | 5 (24.4) | 1.6 |
| 5 | 31.4 (503.1) | 7% | 1200 (5.86) | 4% | 48 (234.4) | 24.3 | -25 (-122.1) | 1.3 |
| 6 | 31.6 (506.3) | 7% | 1200 (5.86) | 5% | 60 (293.0) | 24.9 | -25 (-122.1) | 1.9 |
| 7 | 31.9 (511.1) | 7% | 1210 (5.91) | 7% | 85 (415.1) | 25.5 | -15 (-73.3) | 2.5 |
| 8 | 32.9 (527.2) | 7% | 1210 (5.91) | 10% | 121 (590.9) | 26.3 | -15 (-73.3) | 3.3 |
| 9 | 30.5 (488.7) | 7% | 1150 (5.62) | 4% | 46 (224.7) | 23.9 | -75 (-366.3) | 0.9 |

FIG. 38B

| Sample | Approx. Ave. Board Density (pcf) (kg/m³) | Approx. High Expan. Vermiculite (% by weight of Stucco) | Approx. ATH (% by weight of Stucco) | High Temp. Shrinkage(S) (Avg. %) | High Temp. Thickness Expansion (TE) (Avg. %) |
|---|---|---|---|---|---|
| | | | | | |
| 1 | 29.8 (477.5) | 0% | 0% | 18.8 | -23.6 |
| 2 | 30.5 (488.7) | 0% | 4% | 9.2 | -11.5 |
| 3 | 30.8 (493.5) | 7% | 0% | 7.0 | 6.5 |
| 4 | 31.6 (506.3) | 7% | 2% | 7.3 | 12.6 |
| 5 | 31.4 (503.1) | 7% | 4% | 5.5 | 12.7 |
| 6 | 31.6 (506.3) | 7% | 5% | 6.0 | 11.0 |
| 7 | 31.9 (511.1) | 7% | 7% | 4.5 | 13.9 |
| 8 | 32.9 (527.2) | 7% | 10% | 5.0 | 17.9 |
| 9 | 30.5 (488.7) | 7% | 4% | 6.3 | 5.0 |

TABLE XXc: High Temperature Shrinkage and Thermal Expansion Testing of Specimens from Laboratory Samples Referenced in Example 11A

FIG. 38C

TABLE XXIa: High Temperature Thermal Insulation Index Testing of Specimens from Laboratory Samples Referenced in Example 11B

| Sample | Approx. Ave. Board Density (pcf) (kg/m³) | Approx. High Expan. Vermiculite (% by weight of Stucco) | Stucco (lbs/MSF) (kg/m²) | Approx. ATH (% by weight of Stucco) | ATH (lbs/MSF) (g/m²) | Avg. Thermal Insulation Index (TI) (mins. from 40°C to 200°C) | Stucco Diff. (lbs/MSF) (g/m²) | TI Change |
|---|---|---|---|---|---|---|---|---|
| 10 | 36.6 (586.4) | 7% | 1450 (7.08) | 0% | 0 | 26.3 | 0 | 0 |
| 11 | 36.7 (588.0) | 7% | 1450 (7.08) | 2% | 29.0 (141.6) | 26.4 | 0 | 0.1 |
| 12 | 37.5 (600.9) | 7% | 1450 (7.08) | 4% | 58.0 (283.3) | 27.6 | 0 | 1.3 |
| 13 | 38.3 (613.7) | 7% | 1450 (7.08) | 7% | 101.5 (495.7) | 27.5 | 0 | 1.2 |
| 14 | 38.9 (623.3) | 7% | 1450 (7.08) | 7% | 101.5 (495.7) | 27.8 | 0 | 1.5 |

FIG. 40A

TABLE XXIb: High Temperature Thermal Insulation Index Testing of Specimens from Laboratory Samples Referenced in Example 11B

| Sample | Approx. Ave. Board Density (pcf) (kg/m³) | Approx. High Expan. Vermiculite (% by weight of Stucco) | Stucco (lbs/MSF) (kg/m²) | Approx. ATH (% by weight of Stucco) | ATH (lbs/MSF) (g/m²) | Avg. Thermal Insulation Index (TI) (mins. from 40°C to 200°C) | Stucco Diff. (lbs/MSF) (g/m²) | TI Change |
|---|---|---|---|---|---|---|---|---|
| 15 | 33.0 (528.8) | 7% | 1350 (6.59) | 7% | 94.5 (461.5) | 25.9 | 0 | 0 |
| 16 | 35.2 (564.0) | 7% | 1250 (6.11) | 7% | 87.5 (427.3) | 24.6 | -100 (-488.4) | -1.3 |
| 17 | 32.4 (519.1) | 7% | 1250 (6.11) | 4% | 35.2 (171.9) | 22.9 | -100 (-488.4) | -3 |

FIG. 40B

| Sample | Approx. Ave. Board Density (pcf) (kg/m³) | Approx. High Expan. Vermiculite (% by weight of Stucco) | Approx. ATH (% by weight of Stucco) | High Temp. Shrinkage(S) (Avg. %) | High Temp. Thickness Expansion (TE) (Avg. %) |
|---|---|---|---|---|---|
| 10 | 36.6 (586.4) | 7% | 0% | 0.3 | 16.4 |
| 11 | 36.7 (588.0) | 7% | 2% | 1.0 | 14.5 |
| 12 | 37.5 (600.9) | 7% | 4% | 0.1 | 18.8 |
| 13 | 38.3 (613.7) | 7% | 7% | 0.75 | 13.9 |
| 14 | 38.9 (623.3) | 7% | 7% | 1.2 | 17.4 |
| 15 | 33.0 (528.8) | 7% | 7% | 2.0 | 14.0 |
| 16 | 35.2 (564.0) | 7% | 7% | 1.2 | 17.4 |
| 17 | 32.4 (519.1) | 7% | 4% | 1.49 | 16.27 |

TABLE XXIc: High Temperature Shrinkage and Thermal Expansion Testing of Specimens from Laboratory Samples Referenced in Example 11B

FIG. 40C

TABLE XXIIa:
High Temperature Thermal Insulation Index Testing of Specimens from Laboratory Samples Referenced in Example 11C

| Sample | Approx. Ave. Board Density (pcf) (kg/m³) | Approx. High Expan. Vermiculite (% by weight of Stucco) | Stucco (lbs/MSF) (kg/m²) | Approx. ATH (% by weight of Stucco) | ATH (lbs/MSF) (g/m²) | Avg. Thermal Insulation Index (TI) (mins. from 40°C to 200°C) | Stucco Diff. (lbs/MSF) (g/m²) | TI Change |
|---|---|---|---|---|---|---|---|---|
| 18 | 35.6 (570.4) | 10.0% | 1450 (7.08) | 0% | 0 | 22.5 | 0 | 0.0 |
| 19 | 36.2 (580.0) | 10.3% | 1450 (7.08) | 3% | 25 (122.1) | 23.5 | 0 | 1.0 |
| 20 | 37.0 (592.9) | 10.0% | 1480 (7.23) | 3% | 25 (122.1) | 23.4 | 30 (146.5) | 0.9 |

FIG. 41A

TABLE XXIIb:
High Temperature Shrinkage and Thermal Expansion Testing of Specimens
from Laboratory Samples Referenced in Example 11C

| Sample | Approx. Ave. Board Density (pcf) (kg/m$^3$) | Approx. High Expan. Vermiculite (% by weight of Stucco) | Approx. ATH (% by weight of Stucco) | High Temp. Shrinkage(S) (Avg. %) | Thickness Expansion (TE) (Avg. %) |
|---|---|---|---|---|---|
| 18 | 35.6 (570.4) | 10.0% | 0% | 0.8 | 51.2 |
| 19 | 36.2 (580.0) | 10.3% | 3% | +2.8* | 35.9 |
| 20 | 37.0 (592.9) | 10.0% | 3% | 1.6 | 71.3 |

* The positive sign (+) indicates that the sample expanded when measured for High Temperature Shrinkage (S).

FIG. 41B

LIGHTWEIGHT, REDUCED DENSITY FIRE RATED GYPSUM PANELS

CROSS-REFERENCE TO RELATED APPLICATIONS

This patent application is a continuation of co-pending U.S. patent application Ser. No. 16/274,550 filed Feb. 13, 2019, and entitled "Lightweight, Reduced Density Fire Rated Gypsum Panels," which is a continuation of U.S. patent application Ser. No. 15/457,466 filed Mar. 13, 2017, now U.S. Pat. No. 10,245,755, and entitled "Lightweight, Reduced Density Fire Rated Gypsum Panels," which is a continuation of U.S. patent application Ser. No. 14/181,590 filed Feb. 14, 2014, now U.S. Pat. No. 9,623,586 and entitled "Lightweight, Reduced Density Fire Rated Gypsum Panels," which is a continuation of U.S. patent application Ser. No. 13/669,283 filed Nov. 5, 2012, now U.S. Pat. No. 8,702,881 and entitled "Method of Making Lightweight, Reduced Density Fire Rated Gypsum Panels," which is a continuation of U.S. patent application Ser. No. 13/400,010, filed Feb. 17, 2012, now U.S. Pat. No. 8,323,785 and entitled "Lightweight, Reduced Density Fire Rated Gypsum Panels," which claims the benefit of priority to U.S. Provisional Patent Application No. 61/446,941, filed on Feb. 25, 2011, and entitled, "Lightweight, Reduced Density Fire Rated Gypsum Panels," each of which is incorporated in its entirety herein by this reference.

BACKGROUND

This disclosure generally pertains to reduced weight and density gypsum panels with improved thermal insulation properties, heat shrinkage resistance, and fire resistance.

Gypsum panels typically used in building and other construction applications (such as a gypsum wallboard or ceiling panels) typically comprise a gypsum core with cover sheets of paper, fiberglass or other suitable materials. Gypsum panels typically are manufactured by mixing calcined gypsum, or "stucco," with water and other ingredients to prepare a slurry that is used to form the core of the panels. As generally understood in the art, stucco comprises predominately one or more forms of calcined gypsum, i.e. gypsum subjected to dehydration (typically by heating) to form anhydrous gypsum or hemihydrate gypsum ($CaSO_4 \cdot \frac{1}{2}H_2O$). The calcined gypsum may comprise beta calcium sulfate hemihydrate, alpha calcium sulfate hemihydrate, water-soluble calcium sulfate anhydrite, or mixtures of any or all of these, from natural or synthetic sources. When introduced into the slurry, the calcined gypsum begins a hydration process which is completed during the formation of the gypsum panels. This hydration process, when properly completed, yields a generally continuous crystalline matrix of set gypsum dihydrate in various crystalline forms (i.e. forms of $CaSO_4 \cdot 2H_2O$).

During the formation of the panels, cover sheets typically are provided as continuous webs. The gypsum slurry is deposited as a flow or ribbon on a first of the cover sheets. The slurry is spread across the width of the first cover sheet at a predetermined approximate thickness to form the panel core. A second cover sheet is placed on top of the slurry, sandwiching the gypsum core between the cover sheets and forming a continuous panel.

The continuous panel typically is transported along a conveyer to allow the core to continue the hydration process. When the core is sufficiently hydrated and hardened, it is cut to one or more desired sizes to form individual gypsum panels. The panels are then transferred into and passed through a kiln at temperatures sufficient to dry the panels to a desired free moisture level (typically relatively low free moisture content).

Depending on the process employed and the expected use of the panels and other such considerations, additional slurry layers, strips or ribbons comprising gypsum and other additives may be applied to the first or second cover sheets to provided specific properties to the finished panels, such as hardened edges or a hardened panel face. Similarly, foam may be added to the gypsum core slurry and/or other slurry strips or ribbons at one or more locations in the process to provide a distribution of air voids within the gypsum core or portions of the core of the finished panels.

The resulting panels may be further cut and processed for use in a variety of applications depending on the desired panel size, cover layer composition, core compositions, etc. Gypsum panels typically vary in thickness from about ¼ inch to about one inch depending on their expected use and application. The panels may be applied to a variety of structural elements used to form walls, ceilings, and other similar systems using one or more fastening elements, such as screws, nails and/or adhesives.

Should the finished gypsum panels be exposed to relatively high temperatures, such as those produced by high temperature flames or gases, portions of the gypsum core may absorb sufficient heat to start the release of water from the gypsum dihydrate crystals of the core. The absorption of heat and release of water from the gypsum dihydrate may be sufficient to retard heat transmission through or within the panels for a time. The gypsum panel can act as a barrier to prevent high temperature flames from passing directly through the wall system. The heat absorbed by the gypsum core can be sufficient to essentially recalcine portions of the core, depending on the heat source temperatures and exposure time. At certain temperature levels, the heat applied to a panel also may cause phase changes in the anhydrite of the gypsum core and rearrangement of the crystalline structures. In some instances, the presence of salts and impurities may reduce the melting point of the gypsum core crystal structures.

Gypsum panels may experience shrinkage of the panel dimensions in one or more directions as one result of some or all of these high temperature heating effects, and such shrinkage may cause failures in the structural integrity of the panels. When the panels are attached to wall, ceiling or other framing assemblies, the panel shrinkage may lead to the separation of the panels from other panels mounted in the same assemblies, and from their supports, and, in some instances, collapse of the panels or the supports (or both). As a result, high temperature flames or gases may pass directly into or through a wall or ceiling structure.

Gypsum panels have been produced that resist the effects of relatively high temperatures for a period of time, which may inherently delay passage of high heat levels through or between the panels, and into (or through) systems using them. Gypsum panels referred to as fire resistant or "fire rated" typically are formulated to enhance the panels' ability to delay the passage of heat though wall or ceiling structures and play an important role in controlling the spread of fire within buildings. As a result, building code authorities and other concerned public and private entities typically set stringent standards for the fire resistance performance of fire rated gypsum panels.

The ability of gypsum panels to resist fire and the associated extreme heat may be evaluated by carrying out generally-accepted tests. Examples of such tests are routinely used in the construction industry, such as those published by Underwriters Laboratories ("UL"), such as the UL U305, U419 and U423 test procedures and protocols, as well as procedures described in the specifications E119 published by the American Society for Testing and Materials (ASTM). Such tests may comprise constructing test assemblies using gypsum panels, normally a single-layer application of the panels on each face of a wall frame formed by wood or steel studs. Depending on the test, the assembly may or may not be subjected to load forces. The face of one side of the assembly, such as an assembly constructed according to UL U305, U419 and U423, for example, is exposed to increasing temperatures for a period of time in accordance with a heating curve, such as those discussed in the ASTM E119 procedures.

The temperatures proximate the heated side and the temperatures at the surface of the unheated side of the assembly are monitored during the tests to evaluate the temperatures experienced by the exposed gypsum panels and the heat transmitted through the assembly to the unexposed panels. The tests are terminated upon one or more structural failures of the panels and/or when the temperatures on the unexposed side of the assembly exceed a predetermined threshold. Typically, these threshold temperatures are based on the maximum temperature at any one of such sensors and/or the average of the temperature sensors on the unheated side of the assembly.

Test procedures, such as those set forth in UL U305, U419 and U423 and ASTM E119, are directed to an assembly's resistance to the transmission of heat through the assembly as a whole. The tests also provide, in one aspect, a measure of the resistance of the gypsum panels used in the assembly to shrinkage in the x-y direction (width and length) as the assembly is subjected to high temperature heating. Such tests also provide a measure of the panels' resistance to losses in structural integrity that result in opening gaps or spaces between panels in a wall assembly, with the resulting passage of high temperatures into the interior cavity of the assembly. In another aspect, the tests provide a measure of the gypsum panels' ability to resist the transmission of heat through the panels and the assembly. It is believed that such tests reflect the specified system's capability for providing building occupants and firemen/fire control systems a window of opportunity to address or escape fire conditions.

In the past, various strategies were employed to improve the fire resistance of fire rated gypsum panels. For example, thicker, denser panel cores have been provided which use more gypsum relative to less dense gypsum panels, and therefore include an increased amount of water chemically bound within the gypsum (calcium sulfate dihydrate), to act as a heat sink, to reduce panel shrinkage, and to increase the structural stability and strength of the panels. Alternatively, various ingredients including glass fiber and other fibers have been incorporated into the gypsum core to enhance the gypsum panel's fire resistance by increasing the core's tensile strength and by distributing shrinkage stresses throughout the core matrix. Similarly, amounts of certain clays, such as those of less than about one micrometer size, and colloidal silica or alumina additives, such as those of less than one micrometer size, have been used in the past to provide increased fire resistance (and high temperature shrink resistance) in a gypsum panel core. It has been recognized, however, that reducing the weight and/or density of the core of gypsum panels by reducing the amount of gypsum in the core will adversely affect the structural integrity of the panels and their resistance to fire and high heat conditions.

Another approach has been to add unexpanded vermiculite (also referred to as vermiculite ore) and mineral or glass fibers into the core of gypsum panels. In such approaches, the vermiculite is expected to expand under heated conditions to compensate for the shrinkage of the gypsum components of the core. The mineral/glass fibers were believed to hold portions of the gypsum matrix together.

Such an approach is described in U.S. Pat. Nos. 2,526,066 and 2,744,022, which discuss the use of comminuted unexfoliated vermiculate and mineral and glass fibers in proportions sufficient to inhibit the shrinkage of gypsum panels under high temperature conditions. Both references, however, relied on a high density core to provide sufficient gypsum to act as a heat sink. They disclose the preparation of ½ inch thick gypsum panels with a weight of, 2 to 2.3 pounds per square foot (2,000 to 2,300 pounds per thousand square feet ("lb/msf")) and board densities of about 50 pounds per cubic foot ("pcf") or greater.

The '066 patent reported that sections cut from such panels (with 2 percent mineral fiber and 7.5% of minus 28 mesh vermiculite) evidenced up to 19.1% thickness expansion when heated at 1400° F. (760° C.) for 30 minutes, but did not provide any information on the x-y direction shrinkage of those samples. The '066 patent further cautioned that, depending on the panel formulation and vermiculite content, vermiculite expansion could cause panel failures due to bulging panels and/or cracks and openings in the panels.

The '022 patent was directed at increasing the gypsum content (and thus density and weight) of the panels disclosed in the '066 patent by reducing the mineral/glass fiber content of those panels to provide a greater gypsum-heat sink capacity. References such as the '022 patent further recognized that the expansive properties of vermiculite, unless restrained, would result in spalling (that is, fragmenting, peeling or flaking) of the core and destruction of a wall assembly in a relatively short time at high temperature conditions.

In another example, U.S. Pat. No. 3,454,456 describes the introduction of unexpanded vermiculite into the core of fire rated gypsum wallboard panels to resist the shrinkage of the panels. The '456 patent also relies on a relatively high gypsum content and density to provide a desired heat sink capacity. The '456 patent discloses board weights for finished ½ inch gypsum panels of with a minimum weight of about 1925 lb/msf, and a board density of about 46 pcf. This is a density comparable to thicker and much heavier ⅝ inch thick gypsum panels (about 2400 lb/msf) presently offered commercially for fire rated applications.

The '456 patent also discloses that using vermiculite in a gypsum panel core to raise the panel's fire rating is subject to significant limitations. For example, the '456 patent notes that the expansion of the vermiculite within the core may cause the core to disintegrate due to spalling and other destructive effects. The '456 patent also discloses that unexpanded vermiculite particles may so weaken the core structure that the core becomes weak, limp, and crumbly. The '456 patent purports to address such significant inherent limitations with the use of vermiculite in gypsum panels by employing a "unique" unexpanded vermiculite with a relatively small particle size distribution (more than 90% of the unexpanded particles smaller than a No. 50 mesh size (approximately 0.0117 inch (0.297 mm) openings), with less than 10% slightly larger than no. 50 mesh size). This approach purportedly inhibited the adverse effects of vermiculite expansion on the panel, as explained at col. 2, ll. 52-72 of the '456 patent.

The '456 patent, in addition, explains that the unexpanded vermiculite having the above described particle size distribution corresponds to a product known commercially as "Grade No. 5" unexpanded vermiculite. Grade No. 5 unexpanded vermiculite has been used in commercial fire resistant/fire rated panels with gypsum cores of conventional board densities (for example, from about 45 pcf to in excess of about 55 pcf) since at least the early 1970s. For the reasons discussed above, the use of unexpanded vermiculite comprising a significant distribution of particles with sizes larger than those typical of Grade No. 5 unexpanded vermiculite has been considered potentially destructive of fire resistance panels due to the above mentioned spalling and other effects caused by the expansion of the vermiculite within a gypsum core at high temperature conditions.

In another approach, U.S. Pat. No. 3,616,173 is directed to fire resistant gypsum panels with a gypsum core characterized by the '173 patent as a lighter weight or lower density. The '173 patent distinguished its panels from prior art ½ inch panels weighing about 2,000 lb/msf or more and having core densities in excess of about 48 pcf. Thus, the '173 patent discloses ½ inch thick panels with a density of at or above about 35 pcf, and preferably about 40 pcf to about 50 pcf. The '173 patent achieves its disclosed core densities by incorporating significant amounts of small particle size inorganic material of either clay, colloidal silica, or colloidal alumina in its gypsum core, as well as glass fibers in amounts required to prevent the shrinkage of its gypsum panels under high temperature conditions.

The '173 patent discloses the further, optional addition of unexpanded vermiculite to its gypsum core composition, along with the required amounts of its disclosed small particle size inorganic materials. Even with these additives, however, the disclosed testing of each of the '173 patent's panels showed that they experienced significant shrinkage. That shrinkage occurred notwithstanding the fact that each of the tested and disclosed panels had core densities of about 43 pcf or greater.

For ½ inch thick gypsum panels, the '173 patent's disclosed panels have a "shrink resistance" from about 60% to about 85%. "Shrink resistance" as used in the '173 patent is a measure of the proportion or percentage of the x-y (width-length) area of a segment of core that remains after the core is heated to a defined temperature over a defined period of time as described in the '173 patent. See, e.g., col. 12, ll. 41-49.

Other efforts also have been made to increase the strength and structural integrity of gypsum panels and reduce panel weight by various means. Examples of such light weight gypsum boards include, U.S. Pat. Nos. 7,731,794 and 7,736,720 and U.S. Patent Application Publication Nos. 2007/0048490 A1, 2008/0090068 A1, and 2010/0139528 A1.

Finally, it is noted that in the absence of water resistant additives, when immersed in water, set gypsum can absorb water up to 50% of its weight. And, when gypsum panels including fire resistant gypsum panels—absorb water, they can swell, become deformed and lose strength which may degrade their fire-resistance properties. Low weight fire-resistant panels have far more air and/or water voids than conventional, heavier fire-resistant panels. These voids would be expected to increase the rate and extent of water uptake, with the expectation that such low weight fire-resistant panels would be more water absorbent than conventional heavier fire-resistant panels.

Many attempts have been made in the past to improve the water resistance of gypsum panels generally. Various hydrocarbons, including wax, resins and asphalt have been added to the slurries used to make gypsum panels in order to impart water resistance to the panels. Siloxanes also have been used in gypsum slurries imparting water resistance to gypsum panels by forming silicone resins in situ. Siloxanes, however, would not be expected to sufficiently protect low weight panels. Thus there is a need in the art for a method of producing low weight and density fire-resistant gypsum panels with improved water-resistance at reasonable cost by enhancing the water resistance normally imparted by siloxanes.

SUMMARY

In some embodiments, the present disclosure describes a reduced-weight, reduced-density gypsum panel—and methods for making such panels—having fire resistance properties comparable to heavier, denser gypsum panels typically used for construction applications where a fire rating is required. In some embodiments, panels formed according to principles of the present disclosure comprise a set gypsum core with a core density of less than about 40 pounds per cubic foot ("pcf") disposed between two cover sheets. In embodiments of such panels that are ⅝-inch thick, the weight is approximately less than about 2100 lb/msf.

In some embodiments, high expansion particulates, such as high expansion vermiculite, for example, can be incorporated in the gypsum core in amounts effective to provide fire resistance in terms of shrinkage resistance comparable to commercial Type X gypsum panels and other much heavier and denser gypsum panels. The high expansion particles can have a first unexpanded phase and a second expanded phase when heated. Such panels can further provide fire resistance in terms of x-y direction (width-length) High Temperature Shrinkage and thermal insulation properties, as well as z-direction (thickness) High Temperature Thickness Expansion properties, that is comparable to or significantly greater than commercial Type X gypsum panels and other much heavier and denser commercial panels, including those commercial gypsum panels containing Grade No. 5 vermiculite. In yet other embodiments, panels formed according to principles of the present disclosure can provide fire performance in assemblies such as those subject to industry standard fire tests that is comparable to at least commercial Type X gypsum panels and other heavier and denser commercial panels. Such industry standard fire tests include, without limitation, those set forth in the procedures and specifications of UL U305, U419 and U423 full scale fire tests and fire tests that are equivalent to those.

In other embodiments, reduced weight and density gypsum panels formed according to principles of the present disclosure, and the methods for making same, can provide High Temperature Shrinkage (at temperatures of about 1560° F. (850° C.)) of less than about 10% in the x-y directions and expansion in the z-direction of greater than about 20%. In some embodiments, the ratio of z-direction High Temperature Thickness Expansion to High Temperature Shrinkage is greater than about 0.2 in some embodiments, greater than about 2 in other embodiments, in some embodiments greater than about 3, in other embodiments greater than about 7, in still other embodiments from over about 17, and yet other embodiments from about 2 to about 17. In other embodiments, reduced weight and density gypsum panels formed according to principles of the present disclosure, and the methods for making same, can provide a shrink resistance of greater than about 85% in the x-y directions at temperatures of in excess of about 1800° F. (980° C.).

In yet other embodiments, a fire resistant gypsum panel formed according to principles of the present disclosure, and the methods for making same, can include a gypsum core disposed between two cover sheets. The gypsum core can comprise a crystalline matrix of set gypsum and high expansion particles expandable to about 300% or more of their original volume after being heated for about one hour at about 1560° F. (about 850° C.). The gypsum core can have a density (D) of about 40 pounds per cubic foot or less and a core hardness of at least about 11 pounds (5 kg). The gypsum core can be effective to provide a Thermal Insulation Index (TI) of about 20 minutes or greater.

In other embodiments, assemblies made using reduced weight and density ⅝ inch thick gypsum panels formed according to principles of the present disclosure can provide fire resistance that is comparable to (or better than) assemblies using much heavier denser gypsum panels when tested in accordance with the UL U305, U419 and U423 fire test procedures. The fire resistance of panels formed according to principles of the present disclosure can be reflected by the maximum single sensor temperature or the average sensor temperature on the unexposed surface of such assemblies made pursuant to the UL U305, U419 and U423 fire test procedures (and equivalent fire test procedures). In some embodiments, assemblies made using panels formed according to principles of the present disclosure and tested pursuant to UL U419 provides a maximum single sensor temperature of less than about 500° F. (260° C.) and/or an average sensor temperature of less than about 380° F. (195° C.) at about 60 minutes elapsed time. In some embodiments, assemblies made using panels formed according to principles of the present disclosure and tested pursuant to UL U419 provides a maximum single sensor temperature of less than about 260° F. and/or an average sensor temperature of less than about 250° F. at about 50 minutes elapsed time. In other embodiments, assemblies using panels formed according to principles of the present disclosure in such UL U419 tests can provide a maximum single sensor temperature of less than about 410° F. and/or an average sensor temperature of less than about 320° F. at about 55 minutes. In yet other embodiments, assemblies using panels formed according to principles of the present disclosure in such tests can provide a maximum single sensor temperature of less than about 300° F. and/or an average sensor temperature of less than about 280° F. at about 55 minutes elapsed time.

In other embodiments, an assembly of gypsum panels formed according to principles of the present disclosure can exhibit fire resistance in testing under the UL U419 procedures reflected by a maximum single sensor temperature of less than about 500° F. and/or an average sensor temperature of less than about 380° F. at about 60 minutes elapsed time. In yet other embodiments, assemblies using panels formed according to principles of the present disclosure can in such tests experience a maximum single sensor temperature of less than about 415° F. and/or an average sensor temperature of less than about 320° F. at about 60 minutes elapsed time. In certain of such embodiments, gypsum panels formed according to principles of the present disclosure can have a core with a density of less than about 40 pcf that satisfies the requirements for a 60 minute fire rated gypsum panel under one or more of the fire test procedures of UL U305, U419 and U423 and other fire test procedures that are equivalent to any one of those.

In still other embodiments, the formulation for reduced weight and density of panels following principles of the present disclosure, and the methods for making them, can provide gypsum panels with the above-mentioned fire resistance properties, a density less than about 40 pcf and a nail pull resistance that can meet the standards of ASTM C 1396/C 1396/M-09. More particularly, such panels, when having a nominal ⅝-inch thickness, can have a nail-pull resistance of at least 87 lb. Moreover, in other embodiments, such panels provide sound transmission characteristics essentially the same as much heavier and denser panels. In some embodiments, ⅝ inch thick panels formed according to principles of the present disclosure can have sound transmission class ratings of at least about 35 when mounted on an assembly of steel studs pursuant to the testing and procedures of ASTM E90-99.

In yet other embodiments, a set gypsum core composition for a nominal ⅝-inch fire-rated panel is provided using gypsum-containing slurry comprising at least water, stucco, and high expansion vermiculite. In one such embodiment, the set gypsum core has a density of from about 30 pcf to about 40 pcf, and the core comprises stucco in an amount from about 1162 lbs/msf to about 1565 lbs/msf, high expansion vermiculite from about 5% to about 10% by weight of the stucco, and mineral or glass fiber from about 0.3% to about 0.9% by weight of the stucco. (Unless otherwise stated, the percentages of the component of the gypsum core are stated by weight based on the weight of the stucco used to prepare the core slurry). In another embodiment, the set gypsum core has a density of from about 30 pcf to about 40 pcf, and the core comprises stucco in an amount from about 1162 lbs/msf to about 1565 lbs/msf, high expansion vermiculite from about 5% to about 10% by weight of the stucco, starch from about 0.3% to about 3% by weight of the stucco, mineral or glass fiber from about 0.3% to about 0.9% by weight of the stucco, and phosphate from about 0.03% to about 0.4% by weight of the stucco.

In other embodiments, the gypsum core of ⅝ inch thick panels formed according to principles of the present disclosure can have a density of from about 32 to about 38 pounds per cubic foot, and a gypsum core weight from about 1500 to about 1700 lb/msf. In some embodiments, the gypsum core can include about 5.5% to about 8% high expansion vermiculite, about 0.4% to about 0.7% mineral or glass fiber, and about 0.07% to about 0.25% phosphate. In other embodiments, the gypsum core can include about 5.5% to about 8% high expansion vermiculate, about 0.5% to about 2.5% starch, about 0.4% to about 0.7% mineral or glass fiber, and about 0.07% to about 0.25% phosphate. In yet other embodiments, each of the components of the gypsum core, such as the starch, fiber and phosphate content, can be further adjusted to provide desired panel properties, and in view of the composition and weight of the cover sheets, other additives to the panel core, and the quality of the gypsum stucco.

Each of the gypsum core constituents described herein also may be varied appropriately for panels of different thicknesses, as will be appreciated by one skilled in the art. For example, ½ inch panels may have gypsum lb/msf values at about 80% of the stated values, and a ¾ inch panels may have lb/msf values at about 120% of the stated values. In some embodiments, these proportions can vary depending on the physical property specifications for different thickness panels. Other aspects and variations of panels and core formulations in keeping with principles of the present disclosure are discussed herein below.

Other conventional additives also can be employed in core slurries and gypsum core compositions disclosed herein, in customary amounts, to impart desirable properties to the core and to facilitate manufacturing processes. Examples of such additives are: set accelerators, set retarders, dehydration inhibitors, binders, adhesives, dispersing aids, leveling or non-leveling agents, thickeners, bactericides, fungicides, pH adjusters, colorants, water repellants, fillers, aqueous foams, and mixtures thereof.

In panels formed according to principles of the present disclosure, and the methods of making the same, aqueous foam can be added to the core slurry in an amount effective to provide the desired gypsum core densities, using methods further discussed below. In some embodiments, the addition of the foam component to the core slurry can result in a distribution of voids and void sizes in the presence of the vermiculite component of the core that contributes to one or more panel and/or core strength properties. Similarly, additional slurry layers, strips or ribbons comprising gypsum and other additives (which may have an increased density relative to other portions of the core) may be applied to the first or second cover sheets to provide specific properties to the finished panels, such as harder edges.

In other embodiments, the present disclosure describes a method of making fire rated gypsum panels where the set gypsum core component is formed from calcined gypsum-containing aqueous slurry. In some embodiments, the slurry can include high expansion vermiculite, starch, dispersants, phosphates, mineral/glass fibers, foam, other additives in the amounts described above, stucco and water at a water/stucco weight ratio of about 0.6 to about 1.2, preferably about 0.8 to about 1.0, and more preferably about 0.9. The core slurry can be deposited as a continuous ribbon on and distributed over a continuous web of first cover sheet. A continuous web of a second cover sheet can be placed over the slurry deposited on the web of first cover sheet to form a generally continuous gypsum panel of a desired approximate thickness. The generally continuous gypsum panel can be cut into individual panels of a desired length after the calcined gypsum-containing slurry has hardened (by hydration of the calcined gypsum to form a continuous matrix of set gypsum) sufficiently for cutting, and the resulting gypsum panels can be dried.

As will be appreciated, the principles related to gypsum panels disclosed herein are capable of being carried out in other and different embodiments, and capable of being modified in various respects. Further and alternative aspects and features of the disclosed principles will be appreciated from the following detailed description and the accompanying drawings. Accordingly, it is to be understood that both the foregoing general summary and the following detailed description are exemplary and explanatory only and do not restrict the scope of the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The Figures listed and further discussed below, unless otherwise expressly stated, are exemplary of, and not limiting to, the invention disclosed herein.

FIG. 19 is a table (Table I) of exemplary formulations for gypsum panels formed according to principles of the present disclosure.

FIG. 20 is a table (Table II) of weight loss and density changes with temperature of vermiculite Grade No. 5.

FIG. 21 is a table (Table III) of weight loss and density changes with temperature of high expansion vermiculite.

FIG. 22 is a table (Table IV) of statistical information of air void distributions of Specimens 1-4.

FIG. 23 is a table (Table V) of statistical information of wall thickness distributions of Specimens 1-4.

FIG. 24 is a table (Table VI) of shrink resistance test results.

FIGS. 25a-b are a table (Table VII) of major components of formulations (average values of each run, unless otherwise noted) for sample panels referenced in Example 4

FIGS. 26a-b are a table (Table VIII) of High Temperature Shrinkage and High Temperature Thickness Expansion testing of specimens from sample runs referenced in Table VII and Example 4B.

FIG. 27 is a table (Table IX) of predicted minimum Thermal Insulation Index values for desired fire resistance at 50, 55, and 60 minutes in assemblies using panels formed according to principles of the present disclosure.

FIGS. 28a-b are a table (Table X) of high temperature thermal insulation testing of specimens from sample runs referenced in Table VII and Example 4D.

FIGS. 29a-c are a table (Table XI) of data from fire testing of specimens from sample runs referenced in Table VII and Example 4E.

FIG. 30 is a table (Table XII) of data from nail pull resistance testing of specimens from samples runs referenced in Table VII and Example 5.

FIG. 31 is a table (Table XIII) of data from flexural strength testing of specimens from sample runs 17, 18, and 19.

FIGS. 32a-c are a table (Table XIV) of data from core, end, and edge hardness testing of specimens from sample runs 17, 18, and 19.

FIG. 33 is a table (Table XV) of data from sound transmission loss testing of examples of gypsum panels formed according to principles of the present disclosure and Type X commercial fire-rated gypsum panels.

FIGS. 34a-b are a table (Table XVI) of lab evaluation of siloxane/starch treated panels.

FIG. 35 is a table (Table XVII) of High Temperature Shrinkage and High Temperature Thickness Expansion testing of specimens from laboratory samples referenced in Example 10.

FIG. 36 is a table (Table XVII) of High Temperature Thermal Insulation Index testing of specimens from laboratory samples referenced in Example 10.

FIG. 37 is a table (Table XIX) of formulations for laboratory samples with varying amounts of vermiculite.

FIGS. 38a-c are tables (Table XXa-c) of High Temperature Insulation Index, High Temperature Shrinkage, and High Temperature Thermal Expansion testing of Exhibit 11 A, Samples 1-9, with varying amounts of aluminum trihydrate (ATH).

FIGS. 40a-c are tables (Table XXIa-c) of High Temperature Insulation Index, High Temperature Shrinkage, and High Temperature Thermal Expansion testing of Example 11B, Samples 10-17, with varying amounts of ATH.

FIGS. 41a-b are tables (Table XXIIa and XXIIb) of High Temperature Insulation Index, High Temperature Shrinkage, and High Temperature Thermal Expansion testing of Exhibit 11C, Samples 18-20 with ATH.

DETAILED DESCRIPTION

Figure 1:
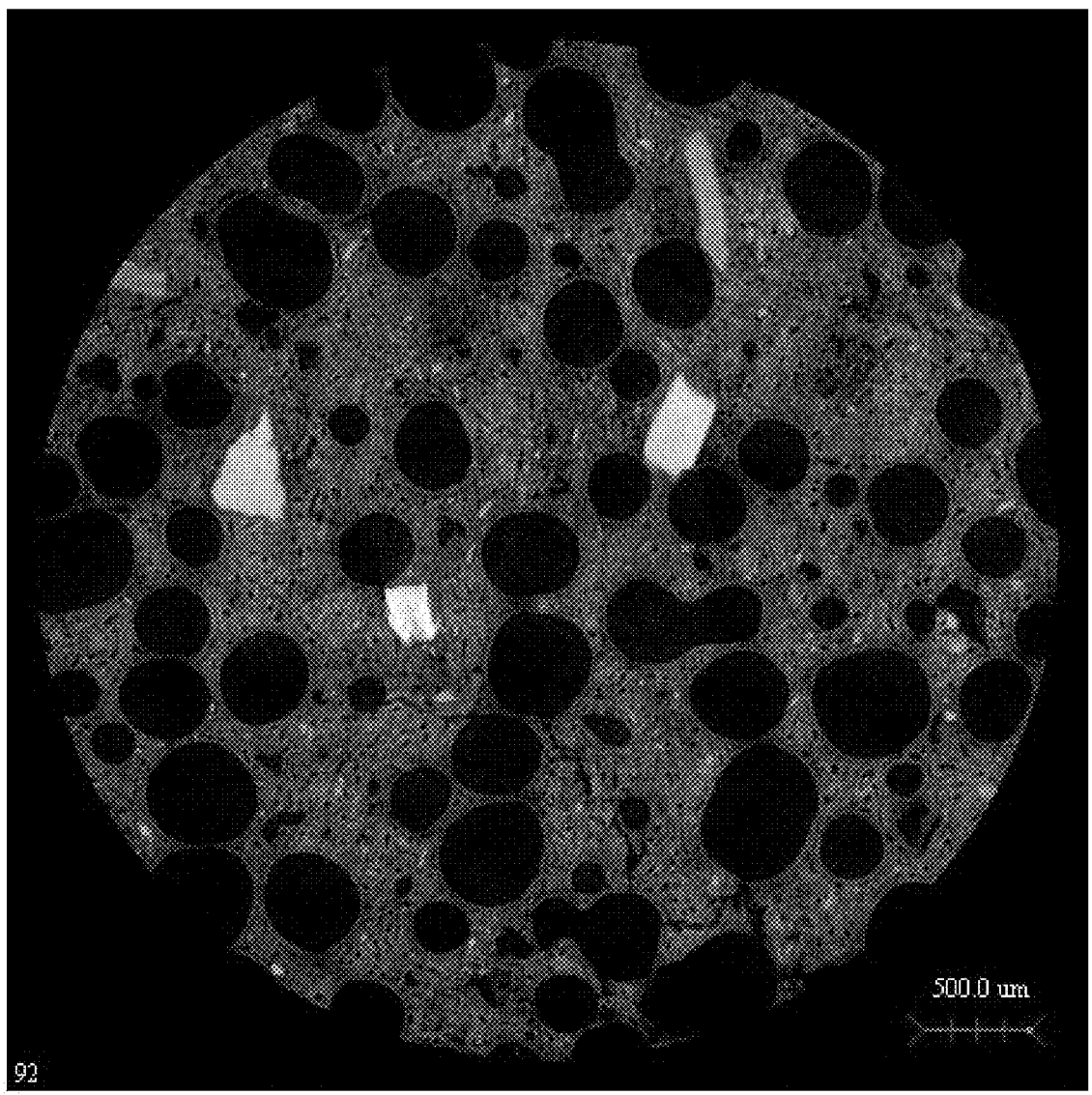
FIG. 1 is a two dimensional image developed from a micro CT-X-ray scan, as further discussed below, of a core section of a specimen from a nominal ⅝ inch thick, about 1880 lb/msf exemplary panel formed according to principles of the present disclosure.

The embodiments described below are not intended to be exhaustive or to limit the appended claims to the specific compositions, assemblies, methods and operations disclosed herein. Rather, the described aspects and embodiments have been chosen to explain principles of the present disclosure and its application, operation and use in order to best enable others skilled in the art to follow its teachings.

The present disclosure provides embodiments using combinations of stucco, high expansion particulates, such as high expansion vermiculite, in an unexpanded condition, and other noted ingredients, examples of which are mentioned in Table I in FIG. 19. These formulations provide fire resistant, reduced weight and density gypsum panels that provide desired fire resistance properties not previously believed feasible for gypsum panels of such reduced weights and densities. Panels formed according to principles of the present disclosure can also have nail-pull resistance and sound transmission characteristics suitable for a variety of construction purposes, and, in some embodiments, such properties are comparable to significantly heavier, denser commercial fire rated panels. The unique formulations of and methods of making panels formed according to principles of the present disclosure make it possible to produce such high performing, reduced weight and density, fire resistance gypsum panels with High Temperature Shrinkage of less than about 10% in the x-y directions (width-length) and High Temperature Thickness Expansion in the z-direction (thickness) of greater than about 20% when heated to about 1560° F. (850° C.). In yet other embodiments, when used in wall or other assemblies, such assemblies have fire testing performance comparable to assemblies made with heavier, denser commercial fire rated panels.

In yet other embodiments, a fire resistant gypsum panel formed according to principles of the present disclosure, and the methods for making same, can include a gypsum core disposed between two cover sheets. The gypsum core can comprise a crystalline matrix of set gypsum and high expansion particles expandable to about 300% or more of their original volume after being heated for about one hour at about 1560° F. (about 850° C.). The gypsum core can have a density (D) of about 40 pounds per cubic foot or less and a core hardness of at least about 11 pounds (5 kg). The gypsum core can be effective to provide a Thermal Insulation Index (TI) of about 20 minutes or greater. The gypsum core can be effective to provide the panel with a ratio of TI/D of about 0.6 minutes/pounds per cubic foot (0.038 minutes/(kg/m$^3$)) or more.

In some embodiments, a fire resistant gypsum panel formed according to principles of the present disclosure, and the methods for making same, can provide a panel that exhibits an average shrink resistance of about 85% or greater when heated at about 1800° F. (980° C.) for one hour. In other embodiments, the panel exhibits an average shrink resistance of about 75% or greater when heated at about 1800° F. (980° C.) for one hour.

In some embodiments, the present disclosure provides ⅝ inch thick gypsum panels with a gypsum core density of less than about 40 pcf. In other preferred embodiments, the panel gypsum core densities are from about 30 pcf to about 40 pcf; about 32 pcf to about 38 pcf; or about 35 to about 37 pcf. Such panels formed according to principles of the present disclosure provide fire resistance properties comparable to much heavier and denser gypsum panels, such as current, commercial ⅝" Type X (fire rated) fire rated, gypsum panels, which typically have a core density of at least about 42 pcf (and a ⅝ inch thick panel weight of at least about 2200 lb/msf), such as SHEETROCK® Brand FIRE CODE® Type X panels.

In other embodiments, methods are provided for making fire resistant gypsum panels by preparing a calcined gypsum containing aqueous slurry with the components discussed herein below, where the calcined gypsum (also referred to as stucco) and water are used to create an aqueous slurry at a preferred water/stucco weight ratio of about 0.6 to about 1.2 in some embodiments, about 0.8 to about 1.0 in other embodiments, and about 0.9 in yet other embodiments. The slurry is deposited as a continuous ribbon on a continuous cover sheet web of paper, unwoven fiberglass, or other fibrous materials or combination of fibrous materials. A second such continuous cover sheet web is then placed over the deposited slurry ribbon to form a continuous gypsum panel of the desired thickness and width. The continuous gypsum panel is cut to a desired length after the calcined gypsum-containing slurry has hardened (by hydration of the calcined gypsum to form a continuous matrix of set gypsum) sufficiently for cutting, and the resulting gypsum panels are dried. The dried panels, in addition, may be subject to further cutting, shaping and trimming steps.

In other embodiments, a higher density gypsum layer may be formed at or about the first cover sheet and/or along the peripheral edges of the cover sheet. The higher density layer typically provides beneficial properties to the board surfaces, such as increased hardness improved nail pull strength etc. The higher density along the peripheral edges of the cover sheet typically provides improved edge hardness and other beneficial properties. In yet other embodiments, a higher density layer is applied to either or both cover sheets, or to the equivalent portions of the core/cover sheet construction.

Typically, the higher density layers are applied by conventional techniques such as coating one or both of the cover layers upstream of or in close proximity to the deposition of the core layer on the first cover sheet or the application of the second cover sheet over the core slurry layer. Similarly, the peripheral higher density layer often is applied as a strip or narrow ribbon of gypsum slurry (with a density differing from the core slurry) to the peripheral edges of the first cover sheet upstream of or in proximity to the deposition of the core slurry on the first sheet. In some of such embodiments, the higher density layers comprise about 3% to about 4% of the board weight.

Accordingly, in some embodiments, a reduced weight and density, fire resistant gypsum panel suitable for use as wallboard, ceiling board or other construction applications (such as exterior sheathing, roofing material, etc.) is provided. In certain of such embodiments, the gypsum panels have a nominal thickness suitable for use in construction applications, such as about ⅝ inches, about ½ inches and/or about ¼ inches, which are typical thicknesses used for many interior and exterior building applications. The cover sheets also may be coated with water-resistant or abuse-resistant coatings or, in some applications, gypsum, cementations materials, acrylic materials or other coatings suitable for specific construction needs. The panels also may be formed in a variety of dimensions suitable for standard, non-standard, or custom applications. Examples of such panels are nominal four feet wide panels having a nominal length of eight feet, ten and twelve feet typical of those used for building construction purposes.

The core density of the reduced weight, fire resistant panels is a significant contributor to the overall weight of the panels relative to conventional panels with similar dimensions. Thus, in embodiments with the above-mentioned core densities, the panel densities with typical paper cover sheets can include from about 30 pcf to about 39.5 pcf; about 32.7 pcf to about 38.5 pcf; and about 35.6 pcf to about 37.5 pcf. For ⅝ inch thick, four foot by eight foot panels, with such panel densities, the panel weights can be about 1600 lb/msf to about 2055 lb/msf, about 1700 lb/msf to about 2000 lb/msf, and 1850 lb/msf to about 1950 lb/msf, respectively. For other panel thicknesses and dimensions, the weight of the panels may be varied proportionally. For example, in the case of panels having similar densities but with a nominal ½ inch thickness, the panel weight would be about 80% of the above-mentioned ⅝ inch thick panel weight. Similarly, for panels with comparable densities and dimensions but with a nominal ¾ inch thickness, the panel weights may be about 120% of the above mentioned ⅝ inch thick panels.

In embodiments where the set gypsum core has a density of from about 30 pcf to about 40 pcf, the core of ⅝ inch thick panels can be formed from slurry formulations comprising stucco in an amount from about 1162 lbs/msf to about 1565 lbs/msf; high expansion vermiculate from about 5% to about 10% by weight of the stucco, starch from about 0.3% to about 3% by weight of the stucco; mineral or glass fiber from about 0.3% to about 0.5% by weight of the stucco, and phosphate from about 0.03% to about 0.4% by weight of the stucco. As mentioned below, other conventional additives can be employed in the practice of principles of the present disclosure in customary amounts to impart desirable properties, to facilitate manufacturing and to obtain the desired core density. In other embodiments, gypsum core of ⅝ inch thick panels formed according to principles of the present disclosure can have a density of from about 32 to about 38 pounds per cubic foot and a gypsum core weight from about 1500 to about 1700 lb/msf. In some of such embodiments, the gypsum core also comprises about 5.5% to about 8% high expansion vermiculate; about 0.5% to about 2.5% starch; about 0.4%, to about 0.7% mineral or glass fiber; and about 0.07% to about 0.25% phosphate. As mentioned above, each component of the gypsum core, such as the starch, fiber, and phosphate, may be further adjusted to provide desired panel properties, and in view of the composition and weight of the cover sheets, the nature and amount of other additives to the panel core, and the quality of the gypsum stucco.

In the exemplary embodiments mentioned in Table I in FIG. 19, the combination of stucco, high expansion particulates in the form of high expansion vermiculite, and the other noted ingredients provide reduced weight gypsum panels with desired fire resistance, and also provides panels that satisfy desired nail-pull resistance, and sound transmission properties. This combination of ingredients (and others within the scope of the invention) makes it possible to produce such high performing, reduced weight, fire resistant gypsum panels with the x-y area shrink resistance and z-direction expansion properties comparable to, if not better than, much heavier, denser gypsum panels. In embodiments such as those set forth in Table I in FIG. 19, the High Temperature Shrinkage of the panels typically is less than about 10% in the x-y directions (width-length) and High Temperature Thickness Expansion of the panel thickness in the z-direction (thickness) is typically greater than about 20% at about 1560° F. (850° C.) as discussed in Example 4B below. In some embodiments, the ratio of z-direction High Temperature Thickness Expansion to x-y High Temperature Shrinkage is at least about 2 to over about 17 at 1570° F. (855° C.) as also discussed in Example 4B.

Another measure of heat resistance is discussed in Example 3 below. In that testing, shrink resistance at temperatures in excess of about 1800° F. (980° C.) was evaluated. Using panels formed according to principles of the present disclosure, such as those set forth in Table I in FIG. 19, the reduced weight and density gypsum panels demonstrated a shrink resistance of greater than about 85% in the x-y directions. Values expressed in Table I as lb/msf are for nominally ⅝ inch thick panels.

Other conventional additives can be employed in the practice of principles of the present disclosure in customary amounts to impart desirable properties and to facilitate manufacturing. Examples of such additives are aqueous foams, set accelerators, set retarders, dehydration inhibitors, binders, adhesives, dispersing aids, leveling or non-leveling agents, thickeners, bactericides, fungicides, pH adjusters, colorants, water repellants, fillers and mixtures thereof. In some embodiments, gypsum panels formed according to principles of the present disclosure may incorporate inorganic material such as clay, colloidal silica, or colloidal alumina in its gypsum core. In most of such embodiments, such inorganic materials are not in amounts which would substantially affect the shrink resistance of the gypsum panels under high temperature conditions.

In some embodiments utilizing one or more formulations within those disclosed in Table I in FIG. 19, panels, and methods for making the same, are provided which are configured as reduced weight and density, ⅝ inch thick gypsum panels that will meet or exceed a "one hour" fire rating pursuant to the fire containment and structural integrity requirements of the UL U305, U419, U423, and/or equivalent fire test procedures and standards. In yet other embodiments using the formulations of Table I, the present disclosure provides reduced weight and density, ½ inch thick gypsum panels, and methods for making the same, that are capable of satisfying at least a ¾ hour fire rating pursuant to the fire containment and structural integrity procedures and standards U419. Similar results may be achieved utilizing other formulations consistent with principles described herein.

The combination of reduced weight, fire resistance, and the above-referenced strength and structural characteristics is due, it is believed, to the unexpected results from various combinations of the above components. Components useful in calcined gypsum slurry formulations following principles of the present disclosure are discussed in greater detail below.

Stuccos—The stucco (or calcined gypsum) component used to form the crystalline matrix of the gypsum panel core typically comprises beta calcium sulfate hemihydrate, water-soluble calcium sulfate anhydrite, alpha calcium sulfate hemihydrate, or mixtures of any or all of these, from natural or synthetic sources. In some embodiments, the stucco may include non-gypsum minerals, such as minor amounts of clays or other components that are associated with the gypsum source or are added during the calcination, processing and/or delivery of the stucco to the mixer.

By way of example, the amounts of stucco referenced in Table I in FIG. 19 assume that the gypsum source has at least about a 95% purity. Accordingly, the components, and their relative amounts, such as those mentioned in Table I above, used to form the core slurry may be varied or modified depending on the stucco source, purity and content. For example, the composition of the gypsum core slurry and the amount of high expansion vermiculite used may be modified for different stucco compositions depending on the gypsum purity, the natural or synthetic source for the gypsum, the stucco water content, the stucco clay content, etc.

High Expansion Particulates—Reduced weight and density gypsum panels formed according to principles of the present disclosure can achieve unique and unexpected results in terms of resistance to fire and the associated extreme heat conditions, without relying on increased quantities of gypsum hemihydrates typical of conventional fire rated gypsum panels or relying predominantly on conventional, relatively low expansion vermiculite, such as that referred to as "Grade No. 5" unexpanded vermiculite (with a typical particle size of less than about 0.0157 inches (0.40 mm)). As mentioned above, panels formed according to principles of the present disclosure can utilize high expansion particulates in the form of vermiculite with a high volume of expansion relative to Grade No. 5 vermiculite (U.S. grading system) and other low expansion vermiculites which have been used in commercial fire rated gypsum panels.

The vermiculites referred to herein as "high expansion vermiculite" have a volume expansion after heating for one hour at about 1560° F. (about 850° C.) of about 300% or more of their original volume. In contrast, Grade No. 5 unexpanded vermiculite typically has a volume expansion at about 1560° F. (about 850° C.) of about 225%. Other particulates with properties comparable to high expansion vermiculite also may be utilized in embodiments of panels formed according to principles of the present disclosure, as well. In some embodiments, high expansion vermiculites can be used that have a volume expansion of about 300% to about 380% of their original volume after being placed for one hour in a chamber having a temperature of about 1560° F. (about 850° C.).

One such high expansion vermiculite is often referred to as Grade No. 4 unexpanded vermiculite (U.S. grading system) (such high expansion vermiculites were rejected as a useful ingredient in fire rated gypsum wallboard in U.S. Pat. No. 3,454,456 discussed above). In some embodiments, at least about 50% of the particles in the high expansion vermiculite used in panels formed according to principles of the present disclosure will be larger than about 50 mesh (i.e. greater than about 0.0117 inch (0.297 mm) openings). In other embodiments, at least about 70% of the particles will be larger than about 70 mesh (i.e. larger than about 0.0083 inch (0.210 mm) openings).

In other embodiments, high expansion vermiculites can be used that are classified under different and/or foreign grading systems. Such high expansion vermiculites should have substantially similar expansion and/or thermal resistance characteristics typical of those discussed herein. For example, in some embodiments, a vermiculite classified as European, South American, or South African Grade 0 (micron) or Grade 1 (superfine) can be used.

In some embodiments, a high expansion vermiculite can be used which includes particle distribution in which up to about 50% of the vermiculite particles are less than about 500 micrometers, up to about 60% of the vermiculite particles are between about 500 micrometers and about 1000 micrometers, up to about 40% of the vermiculite particles are between about 1000 micrometers and about 1500 micrometers, and up to about 20% of the vermiculite particles are between about 1500 micrometers and about 3000 micrometers. In some embodiments, a high expansion vermiculite can include vermiculite particles according to the following distribution: between about 25% and about 45% of the particles are less than about 500 micrometers, between about 40% and 60% of the particles are between about 500 micrometers and about 1000 micrometers, up to about 20% of the particles are between about 1000 micrometers and about 1500 micrometers, and up to about 10% of the particles are between about 1500 micrometers and about 3000 micrometers. In yet other embodiments, a high expansion vermiculite can include vermiculite particles according to the following distribution: between about 5% and about 20% of the particles are less than about 500 micrometers, between about 35% and 60% of the particles are between about 500 micrometers and about 1000 micrometers, between about 20% and about 40% of the particles are between about 1000 micrometers and about 1500 micrometers, and up to about 20% of the particles are between about 1500 micrometers and about 3000 micrometers.

In yet other embodiments, vermiculites that have been chemically treated or otherwise modified such that they exhibit volume expansion behavior under heating similar to the high expansion vermiculites discussed herein also may be used. The high expansion vermiculate useful in panels formed according to principles of the present disclosure can also include other vermiculites, vermiculite mixes and/or vermiculite containing compositions (and other particle sizes and size distributions), as well as other particulate materials with comparable expansion properties that provide the panel shrinkage and expansion characteristics typical of the panels disclosed herein. Other suitable high expansion vermiculites and other particulates also may differ from those disclosed herein in respects that are not material to providing the reduced weight and density, fire resistant gypsum panels disclosed herein.

In some embodiments, high expansion vermiculite used in the reduced weight and density, fire resistant gypsum panels formed according to principles of the present disclosure can include commercial U.S. grade 4 vermiculite commercially-available through a variety of sources. Each of the commercial producers can provide specifications for physical properties of the high expansion vermiculite, such as Mohs hardness, total moisture, free moisture, bulk density, specific ratio, aspect ratio, cation exchange capacity, solubility, pH (in distilled water), expansion ratio, expansion temperature, and melting point, for example. It is contemplated that in different embodiments using different sources of high expansion vermiculites, these physical properties will vary.

In some embodiments, the high expansion vermiculate particles are generally distributed throughout the core portion of the gypsum panels. In other embodiments, the high expansion vermiculite particles are generally evenly distributed throughout the core portion of the gypsum panels.

The high expansion vermiculite can be generally randomly distributed throughout the reduced density portions of the panel core. In some embodiments, it may be desirable to have a different vermiculite distribution in the denser portions of a panel, such as in the above mentioned increased density gypsum layer adjacent the panel face(s) or in portions of the core with greater density along the panel edges. In other embodiments, the high expansion vermiculite may be substantially excluded from those denser portions of the panels, such as hardened edges and faces of the panels. Such variations in vermiculite particle contents and distribution in the denser portions of the panels may be as a result of drawing core slurry from the core slurry mixer for use in those portions of the panel, by introduction of the vermiculite through other appropriate means into the slurry for the reduced density core portions of the panel, by using edge mixers, or other means known to those skilled in the art.

There further may be considerable variation in the amount of high expansion particles distributed throughout the core, and in the specific distribution of the particles in some embodiments of panels formed according to principles of the present disclosure relative to the distribution of particles in other panels so formed. Such variations in amount and distribution of the high expansion particles will depend on the amount and type of the vermiculite or other particles incorporated in the slurry, the high expansion particle size and size distribution, the core slurry composition, and the core slurry mixing and distribution procedures, among other factors. Similarly, the distribution of the specific particles, particle properties and particle sizes within the core may vary and can depend on similar factors during the mixing and distribution of the core slurry during the panel forming process.

In some embodiments, the high expansion particle distribution avoids instances of large concentrations of the high expansion particles in portions of the panel core that significantly reduce the structural strength and integrity of the core during normal use of the panels or during high temperature and/or fire conditions. This would not include minor variations encountered in typical commercial production. The high expansion particle distribution also can be modified in terms of the concentration of the particles in one or more portions of the core for specific desired applications of the panels.

In some embodiments, the above mentioned distribution of the high expansion particles in the reduced density core of the panels occurs during the mixing of the core slurry, passage of the slurry to the first coversheet and/or the distribution of the slurry across the cover sheet. In some embodiments, the high expansion particles can be added to the core slurry mixer with other dry or semi-dry materials during the mixing and preparation of the core slurry. Alternatively, in other embodiments, high expansion particles can be added in other procedures, steps or stages which generally distribute the high expansion particles within the desired portions of the panel gypsum core.

As reflected in FIGS. 1-6, further discussed below, the vermiculite particles frequently are distributed near or adjacent the voids formed in the reduced density portions of the gypsum core, as well as in crystalline portions of the core that one of ordinary skill would expect to contribute to the structural strength of the core. Such a distribution in a reduced density crystalline core structure (which itself is considered relatively fragile), would lead one of ordinary skill to believe that significant expansion of the vermiculite particles would disrupt the core and cause the spalling, core fractures and core failures known to those of ordinary skill and discussed in the references discussed above. This would be particularly true in embodiments of a gypsum panel formed according to principles of the present disclosure where the panel core has a relatively low density, and thus a relatively high void volume, and significantly reduced crystalline gypsum content. The reduction of the core crystalline gypsum content would be expected to reduce the structural strength and heat sink capability of gypsum panels. As further discussed below, this surprisingly was not the case for panels formed according to principles of the present disclosure.

Starches—As will be appreciated by one skilled in the art, embodiments of the core slurry formulation for use in preparing panels formed in accordance with principles of the present disclosure can comprise a starch. In some embodiments of panels formed according to principles of the present disclosure, and the methods for preparing such panels, the core slurry formulation, such as mentioned in Table I in FIG. 19, includes a pregelatinized starch or a functionally-equivalent starch. Raw starch can be pregelatinized by cooking the starch in water at temperatures of at least 185° F. or by other well known methods for causing gel formation in the starch utilized in the panel core. The starch may be incorporated in the core slurry in a dry form, a predispersed liquid form, or combinations of both. In a dry form, a starch may be added to the core slurry mixer with other dry ingredients or in a separate addition procedure, step or stage. In the predispersed form, it may be added with other liquid ingredients, such as gauging water, for example, or in a separate addition procedure, step or stage.

Some examples of readily available pregelatinized starches that may be used in the practice of the present disclosure are commercially available pre-gelled yellow corn flour starch from Cargill, Inc. or from Archer Daniels Midland Co. In some embodiments, the starch component includes at least pregelatinized corn starch, such as pregelatinized corn flour available from Bunge Milling, St. Louis, Mo. Such pregelatinized starches have the following typical characteristics: moisture about 7.5%, protein about 8.0%, oil about 0.5%, crude fiber about 0.5%, ash about 0.3%; having a green strength of about 0.48 psi; and having a bulk density of about 35 lb/ft$^3$. In yet other embodiments, the core slurry formulation can include one or more commercially available hydroxyethylated starches suitable for the purposes of the present disclosure.

In other embodiments, other useful starches can be used, including acid-modified starches, such as acid-modified corn flour available as HI-BOND from Bunge Milling, St. Louis, Mo. This starch has the following typical characteristics: moisture about 10.0%, oil about 1.4%, cold water solubles about 17.0%, alkaline fluidity about 98.0%, bulk density about 30 lb/ft$^3$, and about a 20% slurry producing a pH of about 4.3. Another useful starch is non-pregelatinized wheat starch, such as ECOSOL-45, available from ADM/Ogilvie, Montreal, Quebec, Canada.

Fibers—In some embodiments incorporating fibers such as mentioned in Table I in FIG. 19, and the methods for preparing such panels, the fibers may include mineral fibers, carbon and/or glass fibers and mixtures of such fibers, as well as other comparable fibers providing comparable benefits to the panel. In some embodiments, glass fibers are incorporated in the gypsum core slurry and resulting crystalline core structure. The glass fibers in some of such embodiments can have an average length of about 0.5 to about 0.75 inches and a diameter of about 11 to about 17 microns. In other embodiments, such glass fibers may have an average length of about 0.5 to about 0.675 inches and a diameter of about 13 to about 16 microns. In yet other embodiments, E-glass fibers are utilized having a softening point above about 800° C. and one such fiber type is Advantex® glass fibers (available from Owens Corning) having a softening point above at least about 900° C. Mineral wool or carbon fibers such as those know to those of ordinary skill may be used in place of or in combination with glass fibers, such as those mentioned above.

Phosphates—In some embodiments of panels formed according to principles of the present disclosure and the methods for preparing such panels, a phosphate salt or other source of phosphate ions such as mentioned in Table I in FIG. 19 is added to the gypsum slurry used to produce the panel gypsum core. The use of such phosphates can contribute to providing a gypsum core with increased strength, resistance to permanent deformation (e.g., sag resistance), and dimensional stability, compared with set gypsum formed from a mixture containing no phosphate. In some of such embodiments, the phosphate source is added in amounts to provide dimensional stability, or wet strength, to the panel and panel core while the gypsum hemihydrate in the core hydrates and forms the gypsum dihydrate crystalline core structure (for example during the time between the forming plate and the kiln section of the formation process). Additionally, it is noted that to the extent that the added phosphate acts as a retarder, an appropriate accelerator can be added at the required level to overcome any adverse retarding effects of the phosphate. The phosphates usually are added in a dry form and/or a liquid form, with the dry ingredients typically added to the core slurry mixer and the liquid ingredients added to the mixer or in other stages or procedures.

Phosphate-containing components useful in the present disclosure include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates, such as described, for example, in U.S. Pat. Nos. 6,342,284; 6,632,550; and 6,815,049, the disclosures of all of which are incorporated herein by reference. Suitable examples of such classes of phosphates will be apparent to those skilled in the art. For example, any suitable monobasic orthophosphate-containing compound can be utilized in the practice of principles of the present disclosure, including, but not limited to, monoammonium phosphate, monosodium phosphate, monopotassium phosphate, and combinations thereof. A preferred monobasic phosphate salt is monopotassium phosphate.

Similarly, any suitable water-soluble polyphosphate salt can be used in accordance with the present disclosure. The polyphosphate can be cyclic or acyclic. Exemplary cyclic polyphosphates include, for example, trimetaphosphate salts and tetrametaphosphate salts. The trimetaphosphate salt can be selected, for example, from sodium trimetaphosphate (also referred to herein as STMP), potassium trimetaphosphate, lithium trimetaphosphate, ammonium trimetaphosphate, and the like, or combinations thereof.

Also, any suitable water-soluble acyclic polyphosphate salt can be utilized in accordance with the present disclosure. The acyclic polyphosphate salt has at least two phosphate units. By way of example, suitable acyclic polyphosphate salts in accordance with the present disclosure include, but are not limited to, pyrophosphates, tripolyphosphates, sodium hexametaphosphate having from about six to about 27 repeating phosphate units, potassium hexametaphosphate having from about six to about 27 repeating phosphate units, ammonium hexametaphosphate having from about six to about 27 repeating phosphate units, and combinations thereof. A preferred acyclic polyphosphate salt pursuant to the present disclosure is commercially available as CALGON® from ICL Performance Products LP, St. Louis, Mo., which is a sodium hexametaphosphate having from about six to about 27 repeating phosphate units.

Preferably, the phosphate-containing compound is selected from the group consisting of sodium trimetaphosphate having the molecular formula $(NaPO_3)_3$, sodium hexametaphosphate having from about six to about 27 repeating phosphate units and having the molecular formula $Na_{n+2}PnO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{n+2}P_nO_{3n+1}$ wherein n=1000-3000, or polyphosphoric acid having two or more repeating phosphoric acid units and having the molecular formula $H_{n+2}P_nO_{3n+1}$ wherein n is two or more. Sodium trimetaphosphate is most preferred and is commercially available from ICL Performance Products LP, St. Louis, Mo.

Dispersants—In other embodiments of reduced weight and density, fire resistant panels formed according to principles of the present disclosure, and the methods for preparing such panels, dispersants such as those mentioned in Table I in FIG. 19, can be included in the gypsum core slurry. The dispersants may be added in a dry form with other dry ingredients and/or a liquid form with other liquid ingredients in the core slurry mixer or in other steps or procedures.

In some embodiments, such dispersants can include naphthalenesulfonates, such as polynaphthalenesulfonic acid and its salts (polynaphthalenesulfonates) and derivatives, which are condensation products of naphthalenesulfonic acids and formaldehyde. Such desirable polynaphthalenesulfonates include sodium and calcium naphthalenesulfonate. The average molecular weight of the naphthalenesulfonates can range from about 3,000 to 27,000, although it is preferred that the molecular weight be about 8,000 to 10,000. At a given solids percentage aqueous solution, a higher molecular weight dispersant has a higher viscosity, and generates a higher water demand in the formulation, than a lower molecular weight dispersant.

Useful naphthalenesulfonates include DILOFLO, available from GEO Specialty Chemicals, Cleveland, Ohio; DAXAD, available from Hampshire Chemical Corp., Lexington, Mass.; and LOMAR D, available from GEO Specialty Chemicals, Lafayette, Ind. The naphthalenesulfonates are preferably used as aqueous solutions in the range of about 35% to about 55% by weight solids content, for example. It is most preferred to use the naphthalenesulfonates in the form of an aqueous solution, for example, in the range of about 40% to about 45% by weight solids content. Alternatively, where appropriate, the naphthalenesulfonates can be used in dry solid or powder form, such as LOMAR D, for example.

Alternatively, in other embodiments, dispersants known to those skilled in the art useful for improving fluidity in gypsum slurries may be used employed, such as polycarboxylate dispersants. A number of polycarboxylate dispersants, particularly polycarboxylic ethers, are preferred types of dispersants. One preferred class of dispersants used in the slurry includes two repeating units and is described further in U.S. Pat. No. 7,767,019, which is entitled, "Gypsum Products Utilizing a Two-Repeating Unit System and Process for Making Them," and is incorporated herein by reference. Examples of these dispersants are products of BASF Construction Polymers, GmbH (Trostberg, Germany) and supplied by BASF Construction Polymers, Inc. (Kennesaw, Ga.) (hereafter "BASF") and are hereafter referenced as the "PCE211-Type Dispersants." A particularly useful dispersant of the PCE211-Type Dispersants is designated PCE211 (hereafter "211"). Other polymers in this series useful in the present disclosure include PCE111. PCE211-Type dispersants are described more fully in U.S. Ser. No. 11/827,722 (Pub. No. US 2007/0255032A1), filed Jul. 13, 2007 and entitled, "Polyether-Containing Copolymer," which is incorporated herein by reference.

The molecular weight of one type of such PCE211 Type dispersants may be from about 20,000 to about 60,000 Daltons. It has been found that the lower molecular weight dispersants cause less retardation of set time than dispersants having a molecular weight greater than 60,000 Daltons. Generally longer side chain length, which results in an increase in overall molecular weight, provides better dispensability. However, tests with gypsum indicate that efficacy of the dispersant is reduced at molecular weights above 50,000 Daltons.

Another class of polycarboxylate compounds that are useful as dispersants in this disclosure is disclosed in U.S. Pat. No. 6,777,517, which is incorporated herein by reference and hereafter referenced as the "2641-Type Dispersant." Examples of PCE211-Type and 2641-Type dispersants are manufactured by BASF Construction Polymers, GmbH (Trostberg, Germany) and marketed in the United States by BASF Construction Polymers, Inc. (Kennesaw, Ga.). Preferred 2641-Type Dispersants are sold by BASF as MELFLUX 2641F, MELFLUX 2651F and MELFLUX 2500L dispersants.

Yet another preferred dispersant family is sold by BASF and referenced as "1641-Type Dispersants." The 1641-Type dispersant is more fully described in U.S. Pat. No. 5,798,425, which is incorporated herein by reference. One of such 1641-Type Dispersants is marketed as MELFLUX 1641F dispersant by BASF. Other dispersants that can be used include other polycarboxylate ethers such as COATEX Ethacryl M, available from Coatex, Inc. of Chester, S.C., and lignosulfonates, or sulfonated lignin. Lignosulfonates are water-soluble anionic polyelectrolyte polymers, byproducts from the production of wood pulp using sulfite pulping. One example of a lignin useful in the practice of principles of the present disclosure is Marasperse C-21 available from Reed Lignin Inc., Greenwich, Conn.

High Efficiency Heat Sink Additives ("HEHS Additives")—In some embodiments of panels formed according to principles of the present disclosure and the methods for preparing such panels, the panel core may include one or more additives referred to herein as high efficiency heat sink additives ("HEHS additives"). Such additives have a heat sink capacity that exceeds the heat sink capacity of comparable amounts of gypsum dihydrate in the temperature range causing the dehydration and release of water vapor from the gypsum dihydrate component of the panel core. Such additives typically are selected from compositions, such as aluminum trihydrate or other metal hydroxides, that decompose, releasing water vapor in the same or similar temperature ranges as does gypsum dihydrate. While other HEHS additives (or combinations of HEHS additives) with increased heat sink efficiency relative to comparable amounts of gypsum dihydrate can be used, preferred HEHS additives provide a sufficiently-increased heat sink efficiency relative to gypsum dihydrate to offset any increase in weight or other undesired properties of the HEHS additives when used in a gypsum panel intended for fire rated or other high temperature applications.

For example, in preferred embodiments, one or more HEHS additives undergo an endothermic reaction to absorb heat when exposed to significant temperature increases. In some such embodiments, the heat of decomposition (which may be a dehydration reaction) per unit mass of the HEHS additive(s) consumes at least about 685 Joules/gram, in other embodiments at least about 1000 Joules/gram, and in still other embodiments consumes from about 1100 to about 1400 Joules/gram. In such embodiments, the HEHS additive(s) can have a heat of decomposition per unit mass in the relevant temperature range that is significantly higher than that of the gypsum dehydrate in the gypsum panel. Accordingly, the HEHS additive consumes more energy (Joules/gram) during heating than consumed by the dehydration of the gypsum dihydrate.

In some embodiments, the lowest decomposition temperature of the HEHS additive(s) is about 40° C. or more. In other embodiments, the decomposition temperatures of the HEHS additive(s) range from about 40° C. to about 1000° C.; in other embodiments, from about 150° C. to about 450° C.; and in other embodiments, from about 150° C. to about 300° C. In yet another embodiment, the HEHS additive(s) begin endothermic thermal decomposition at about 150° C. and are substantially, or entirely, decomposed at a temperature of about 980° C., which is the typical 1-hour endpoint temperature in the above mentioned ASTM-E119 temperature curve used in the above mentioned fire tests.

As mentioned above, one preferred HEHS additive comprises aluminum trihydrate (ATH) containing crystallized or otherwise bound or complexed water. ATH typically is very stable at room temperature. Above temperatures between about 180° C. and 205° C., ATH typically undergoes an endothermic decomposition releasing water vapor. The heat of decomposition for such ATH additives is greater than about 1000 Joule/gram, and in one preferred embodiment is about 1170 Joule/gram. Without being bound by theory, it is believed that the ATH additive decomposes to release approximately 35% of the water of crystallization as water vapor when heated above 205° C. as follows: $AL(OH)_3 \rightarrow Al_2O_3 \cdot 3H_2O$. In embodiments using ATH as an HEHS additive, any suitable ATH can be used. In embodiments, ATH from commercial suppliers, such as, Akrochem Corp. of Akron, Ohio, can be used. Any suitable grade of ATH can be used. One example is ATH Grade No. SB-36. ATH Grade No. SB-36 can have a median particle size of about 25 microns and a surface area of about 1 $m^2/g$. In other embodiments, other suitable grade of ATH having any suitable median particle size and surface area can be used.

In other embodiments, the HEHS additive(s) may comprise magnesium hydroxide. In these embodiments, the magnesium hydroxide HEHS additive preferably has a heat of decomposition greater than about 1000 Joules/gram, such as about 1350 Joules/gram, at or above 180° C. to 205° C. In such embodiments, any suitable magnesium hydroxide can be used, such as that commercially available from commercial suppliers, including Akrochem Corp. of Akron, Ohio.

The increased heat sink capacity of the preferred HEHS additives may be utilized to increase thermal insulation properties of the gypsum panels disclosed herein relative to the panels formed without the HEHS additive. The amount and composition of the HEHS additives incorporated in the gypsum panels disclosed herein may vary depending on the desired weight and density of the panels, the purity of the stucco used to form the panels, the panel core formulation, the presence of other additives and other similar considerations. Examples of preferred core formulations for gypsum panels incorporating preferred HEHS additives are summarized in Table I in FIG. 19. The HEHS additive can be added in a dry form and/or a liquid form, with the dry ingredients typically added to the core slurry mixer and the liquid ingredients added to the mixer or in other stages or procedures.

In one such preferred embodiment, the panel core incorporates an HEHS additive such as aluminum trihydrate in an amount from about 2% to about 5% by weight of the stucco in some embodiments, from about 2% to about 7% by weight of the stucco in other embodiments, and in amounts up to about 10% by weight of the stucco in still other preferred embodiments. In some of such preferred embodiments, the incorporation of the HEHS additive in the core formulation allows for the reduction of the stucco content of the formulation to reduce the weight and density of the panel core. In one example of the use of the HEHS additive, the ratio of HEHS additive to removed stucco on a weight basis is about 1 to about 2. In one such example, in other words, about 40-50 lbs/msf of the HEHS additive may be incorporated in the core formulation and about 80-100 lbs/msf of stucco may be removed from the formulation. Accordingly, a weight savings of about 40-50 lbs/msf may be achieved in this example without a substantial change in the thermal insulation properties of the panel.

The ratio of HEHS additive to stucco removed from a core formulation can be varied depending on the HEHS additive used, its heat sink properties, the heat sink properties of the specific stucco, the formulation of the gypsum core, the desired thermal insulation properties of the panel, the desired weight reduction and physical properties of the panel and related concerns. In some preferred embodiments using aluminum trihydrate, the ratio of HEHS additive to removed stucco may be about 2:1 in some embodiments, in other embodiments about 3:1, and in still other embodiments about 4:1. The ratio of HEHS additive(s) to removed stucco may be different for different HEHS additive compositions and applications.

Retarders/Accelerators—Set retarders (up to about 2 lb/MSF (approx. 9.8 $g/m^2$) in ⅝ inch thick panels) or dry accelerators (up to about 35 lb/MSF (approx. 170 $g/m^2$) in ⅝ inch thick panels) may be added to some embodiments of the core slurry to modify the rate at which the stucco hydration reactions take place. "CSA" is an example of a preferred set accelerator including about 95% calcium sulfate dihydrate co-ground with about 5% sugar and heated to 250° F. (1-21° C.) to caramelize the sugar. CSA is available from USG Corporation, Southard, Okla. plant, and can be made according to U.S. Pat. No. 3,573,947, which is incorporated herein by reference. Potassium sulfate is another example of a preferred accelerator. "HRA," which is another exemplary preferred accelerator, is calcium sulfate dihydrate freshly ground with sugar at a ratio of about 5 to about 25 pounds of sugar per 100 pounds of calcium sulfate dihydrate. HRA is further described in U.S. Pat. No. 2,078,199, which is incorporated herein by reference.

Another accelerator known as wet gypsum accelerator, or "WGA," is also a preferred accelerator. A description of the use of, and a method for making, wet gypsum accelerator is disclosed in U.S. Pat. No. 6,409,825, which is incorporated herein by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator can be used in amounts ranging from about 5 to about 80 pounds per thousand square feet (approx. 24.3 to 390 g/m$^2$) of ⅝ inch thick wallboard product.

Foams—Foam can be introduced into the core slurry in amounts that provide the above-mentioned reduced core density and panel weight. The introduction of foam in the core slurry in the proper amounts, formulations and processes can produce a desired network and distribution of air voids, and walls between the air voids, within the core of the final dried panels. In some embodiments, the air void sizes, distributions and/or wall thickness between air voids provided by the foam composition and foam introduction system are in accordance with those discussed below, as well as those that provide comparable density, strength and related properties to the panels. This air void structure permits the reduction of the gypsum and other core constituents and the core density and weight, while substantially maintaining (or in some instances improving) the panel strength properties, such as core compressive strength, and the panel rigidity, flexural strength, nail pull resistance, among others.

In some embodiments, at a nominal panel thickness of about ⅝-inch, a gypsum panel formed according to principles of the present disclosure, and the methods for making same, provide a panel that has a nail pull resistance, determined according to ASTM standard C473-09, of at least about 70 lb. In other embodiments, the panel can have a nail pull resistance, determined according to ASTM standard C473-09, of at least about 85 lb.

In some such embodiments, the mean equivalent sphere diameter of the air voids can be at least about 75 μm, and in other embodiments at least about 100 μm. In other embodiments, the mean equivalent sphere diameter of the air voids can be from about 75 μm to about 400 μm. In yet other embodiments, the mean equivalent sphere diameter of the air voids can be from about 100 μm to about 350 μm with a standard deviation from about 100 to about 225. In other embodiments, the mean equivalent sphere diameter of the air voids may be from about 125 μm to about 325 μm with a standard deviation from about 100 to about 200.

In some embodiments, from about 15% to about 70% of the air voids have an equivalent sphere diameter of about 150 μm or less. In other embodiments, from about 45% to about 95% of the air voids have an equivalent sphere diameter of about 300 μm or less, and from about 5% to about 55% of the air voids have an equivalent sphere diameter of about 300 μm or more. In other embodiments, from about 45% to about 95% of the air voids have an equivalent sphere diameter of about 300 μm or less, and from about 5% to about 55% of the air voids have an equivalent sphere diameter from about 300 μm to about 600 μm. In the discussion of average air void sizes herein, voids in the gypsum core that are about 5 μm or less are not considered when calculating the number of air voids or the average air void size.

In those and other embodiments, the thickness, distribution and arrangement of the walls between the voids in such embodiments, alone and/or in combination with a desired air void size distribution and arrangement, also permit a reduction in the panel core density and weight, while substantially maintaining (or in some instances improving) the panel strength properties. In some such embodiments, the average thickness of the walls separating the air voids may be at least about 25 μm. In some embodiments, the walls defining and separating air voids within the gypsum core may have an average thickness from about 25 μm to about 200 μm, from about 25 μm to about 75 μm in other embodiments, and from about 25 μm to about 50 μm in still other embodiments. In yet other embodiments, the walls defining and separating air voids within the gypsum core may have an average thickness from about 25 μm to about 75 μm with a standard deviation from about 5 to about 40. In yet other embodiments, the walls defining and separating air voids within the gypsum core may have an average thickness from about 25 μm to about 50 μm with a standard deviation from about 10 to about 25.

Without being bound by theory, it is believed that embodiments with the above discussed air void size distributions and arrangements, and wall thicknesses and distributions, assist in improving the panel's high temperature properties when used with the high expansion vermiculite disclosed herein. It is believed that the foam void and wall thickness assist in reducing or substantially resist the creation of substantial faults in the gypsum core structure when the high expansion vermiculite expands at high temperature conditions.

Examples of the use of foaming agents to produce desired void and wall structures include those discussed in U.S. Pat. No. 5,643,510, the disclosure of which is incorporated by reference herein. In some embodiments, a combination of a first more stable foaming agent and a second less stable foaming agent can be used in the core slurry mixture. In other embodiments, only one type of foaming agent is used, so long as the desired density and panel strength requirements are satisfied. The approaches for adding foam to a core slurry are known in the art and examples of such an approach is discussed in U.S. Pat. Nos. 5,643,510 and 5,683,635, the disclosures of which are incorporated by reference herein.

Cover Sheets—In some embodiments of a panel formed according to principles of the present disclosure, the first cover sheet comprises low porosity manila paper upon which the gypsum slurry is dispensed (which typically is exposed face of the board when used in a construction application). Newsline paper may be used as the second cover sheet placed on the gypsum core slurry during the forming process (which typically is the concealed back surface of the panels when used in construction applications). In other applications, unwoven fiberglass mats, sheet materials of other fibrous or non-fibrous materials, or combinations of paper and other fibrous materials may be used as one or both of the cover sheets. As will be appreciated by one skilled in the art, in other embodiments, other cover sheets can be used which are suitable for the intended purpose of the panel.

In embodiments using paper or similar cover sheets, the first cover sheet can be a higher density and basis weight than the second coversheet. For example, in some embodiments, the first cover sheet may have a basis weight of about 55 to about 65 lb/msf, and the second coversheet may have a basis weight of about 35 to about 45 lb/msf. In yet other embodiments, different kinds of paper cover sheets, having different weights, and comprising different materials for example, can be used. Similarly, in some embodiments, the cover sheets may incorporate and may have added to their exposed surfaces, coatings of materials providing surfaces suitable for specific construction applications such as exterior sheathing, roofing, tile backing, etc.

Siloxanes—In some embodiments, the water resistance of gypsum panels formed according to principles of the present disclosure can be improved by adding a polymerizable siloxane to the slurry used to make the panels. Preferably, the siloxane is added in the form of an emulsion. The slurry is then shaped and dried under conditions which promote the polymerization of the siloxane to form a highly cross-linked silicone resin. A catalyst which promotes the polymerization of the siloxane to form a highly cross-linked silicone resin can be added to the gypsum slurry.

Preferably, the siloxane is generally a fluid linear hydrogen-modified siloxane, but can also be a cyclic hydrogen-modified siloxane. Such siloxanes are capable of forming highly cross-linked silicone resins. Such fluids are well known to those of ordinary skill in the art and are commercially available and are described in the patent literature. Typically, the linear hydrogen modified siloxanes useful in the practice of principles of the present disclosure comprise those having a repeating unit of the general formula:

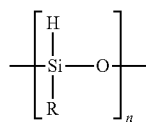

wherein R represents a saturated or unsaturated mono-valent hydrocarbon radical. In preferred embodiments, R represents an alkyl group, and most preferably R is a methyl group. During polymerization, the terminal groups can be removed by condensation and siloxane groups are linked together to form the silicone resin. Cross-linking of the chains can also occur. The resulting silicone resin imparts water resistance to the gypsum matrix as it forms.

Preferably, a solventless methyl hydrogen siloxane fluid sold under the name SILRES BS 94 by Wacker-Chemie GmbH (Munich, Germany) will be used as the siloxane. The manufacturer indicates this product is a siloxane fluid containing no water or solvents. It is contemplated that about 0.3 to about 1.0% of the BS 94 siloxane may be used, based on the weight of the dry ingredients. It is preferred to use from about 0.4% to about 0.8% of the siloxane based on the dry stucco weight.

The siloxane can be formed into an emulsion or a stable suspension with water. A number of siloxane emulsions are contemplated for use in this slurry. Emulsions of siloxane in water are also available for purchase, but they may include emulsifying agents that tend to modify properties of the gypsum articles, such as the paper bond in gypsum panel products. Emulsions or stable suspensions prepared without the use of emulsifiers are therefore preferred. Preferably, the suspension will be formed in situ by mixing the siloxane fluid with water. The siloxane suspension is maintained in a stable condition until used and remains well dispersed under the conditions of the slurry. The siloxane suspension or emulsion is maintained in a well dispersed condition in the presence of the optional additives, such as set accelerators, that may be present in the slurry. The siloxane suspension or emulsion is maintained so that it remains stable through the steps in which the gypsum panels are formed as well. Preferably, the suspension remains stable for more than 40 minutes. More preferably, it remains stable for at least one hour. In the discussion and claims that follow, the term "emulsion" is intended to include true emulsions and suspensions that are stable at least until the stucco is about 50% set.

The siloxane polymerization reaction proceeds slowly on its own, requiring that the panels be stored for a time sufficient to develop water-resistance prior to shipping. Catalysts are known to accelerate the polymerization reaction, reducing or eliminating the time needed to store gypsum panels as the water-resistance develops. Use of dead-burned magnesium oxide for siloxane polymerization is described in U.S. Pat. No. 7,892,472, entitled "Method of Making Water-Resistant Gypsum-Based Article," which is incorporated herein by reference. Dead-burned magnesium oxide is water-insoluble and interacts less with other components of the slurry. It accelerates curing of the siloxane and, in some cases, causes the siloxane to cure more completely. It is commercially available with a consistent composition. A particularly preferred source of dead-burned magnesium oxide is BAYMAG 96. It has a BET surface area of at least 0.3 m²/g. The loss on ignition is less than about 0.1% by weight. The magnesium oxide is preferably used in amounts of about 0.1% to about 0.5% based on the dry stucco weight.

There are at least three grades of magnesium oxide on the market, depending on the calcination temperature. "Dead-burned" magnesium oxide is calcined between 1500° C. and 2000° C., eliminating most, if not all, of the reactivity. MagChem P98-PV (Martin Marietta Magnesia Specialties, Bethesda, Md.) is an example of a "dead-burned" magnesium oxide. BayMag 96 (Baymag, Inc. of Calgary, Alberta, Canada) and MagChem 10 (Martin Marietta Magnesia Specialties, Bethesda, Md.) are examples of "hard-burned" magnesia. "Hard-burned" magnesium oxide is calcined at temperatures from 1000° C. to about 1500° C. It has a narrow range of reactivity, a high density, and is normally used in application where slow degradation or chemical reactivity is required, such as in animal feed and fertilizer. The third grade is "light-burn" or "caustic" magnesia, produced by calcining at temperatures of about 700° C. to about 1000° C. This type of magnesia is used in a wide range of applications, including plastics, rubber, paper and pulp processing, steel boiler additives, adhesives and acid neutralization. Examples of light burned magnesia include BayMag 30, BayMag 40, and BayMag 30 (−325 Mesh) (BayMag, Inc. of Calgary, Alberta, Canada).

As mentioned in U.S. Pat. No. 7,803,226, which is incorporated herein by reference, preferred catalysts are made of a mixture of magnesium oxide and Class C fly ash. When combined in this manner, any of the grades of magnesium oxide are useful. However, dead-burned and hard-burned magnesium oxides are preferred due to their reduced reactivity. The relatively high reactivity of magnesium oxides, can lead to cracking reactions which can produce hydrogen. As the hydrogen is generated, the product expands, causing cracks where the stucco has set. Expansion also causes breakdown of molds into which the stucco is poured, resulting in loss of detail and deformation of the product in one or more dimensions. Preferably, BayMag 96, MagChem P98-PV and MagChem 10 are the preferred sources of magnesium oxide. Preferably, the magnesium oxide and fly ash are added to the stucco prior to their addition to the gauging water. Dry components such as these are often added to the stucco as it moves along a conveyer to the mixer.

A preferred fly ash is a Class C fly ash. Class C hydraulic fly ash, or its equivalent, is the most preferred fly ash component. A typical composition of a Class C fly ash is shown in Table I of U.S. Pat. No. 7,803,226. High lime content fly ash, greater than about 20% lime by weight, which is obtained from the processing of certain coals. ASTM designation C-618, herein incorporated by reference, describes the characteristics of Class C fly ash. A preferred Class C fly ash is supplied by Bayou Ash Inc., Big Cajun, II, La. Preferably, fly ash is used in amounts of about 0.1% to about 5% based on the dry stucco weight. More preferably, the fly ash is used in amounts of about 0.2% to about 1.5% based on the dry stucco weight.

Catalysis of the siloxane results in faster and more complete polymerization and cross-linking of siloxane to form the silicone resin. Hydration of the stucco forms an interlocking matrix of calcium sulfate dihydrate crystals. While the gypsum matrix is forming, the siloxane molecules are also forming a silicone resin matrix. Since these are formed simultaneously, at least in part, the two matrices become intertwined in each other. Excess water and additives to the slurry, including the fly ash, magnesium oxide and additives described below, which were dispersed throughout the slurry, become dispersed throughout the matrices in the interstitial spaces to achieve water resistance throughout the panel core. In some embodiments, suitable amounts of a pregelatinized starch, or functionally-equivalent starch, can work in conjunction with the siloxane to retard water entry along the more vulnerable edges of the panel.

In some embodiments, embodiments of the core slurry formulation for use in preparing panels formed in accordance with principles of the present disclosure can comprise a combination of pregelatinized starch (or functionally-equivalent starch) in an amount greater than about 2% by weight based on the weight of stucco and siloxane in an amount of at least about 0.4%, and preferably at least about 0.7% by weight based on the weight of stucco, which can produce gypsum panels with less than about 5% water absorption. This water resistance property can be particularly helpful since a reduced-density panel has far more of its total volume comprising air and/or water voids than a conventional panel. The increased void volume would be expected to make the light weight panels far more water absorbent. While not wishing to be bound by theory, it is believed that water resistance develops when the siloxane cures within the formed panels and that the at least about 2.0% by weight pregelatinized starch works in conjunction with the siloxane to slow water entry through micropores on the panel edges first by blocking water entry and then, upon take-up of water by the starch by forming a highly viscous starch/water combination. In other embodiments, a hydroxyethylated starch or a starch that is functionally equivalent to a pregelatinized starch can be used in combination with the siloxane.

Figure 7:
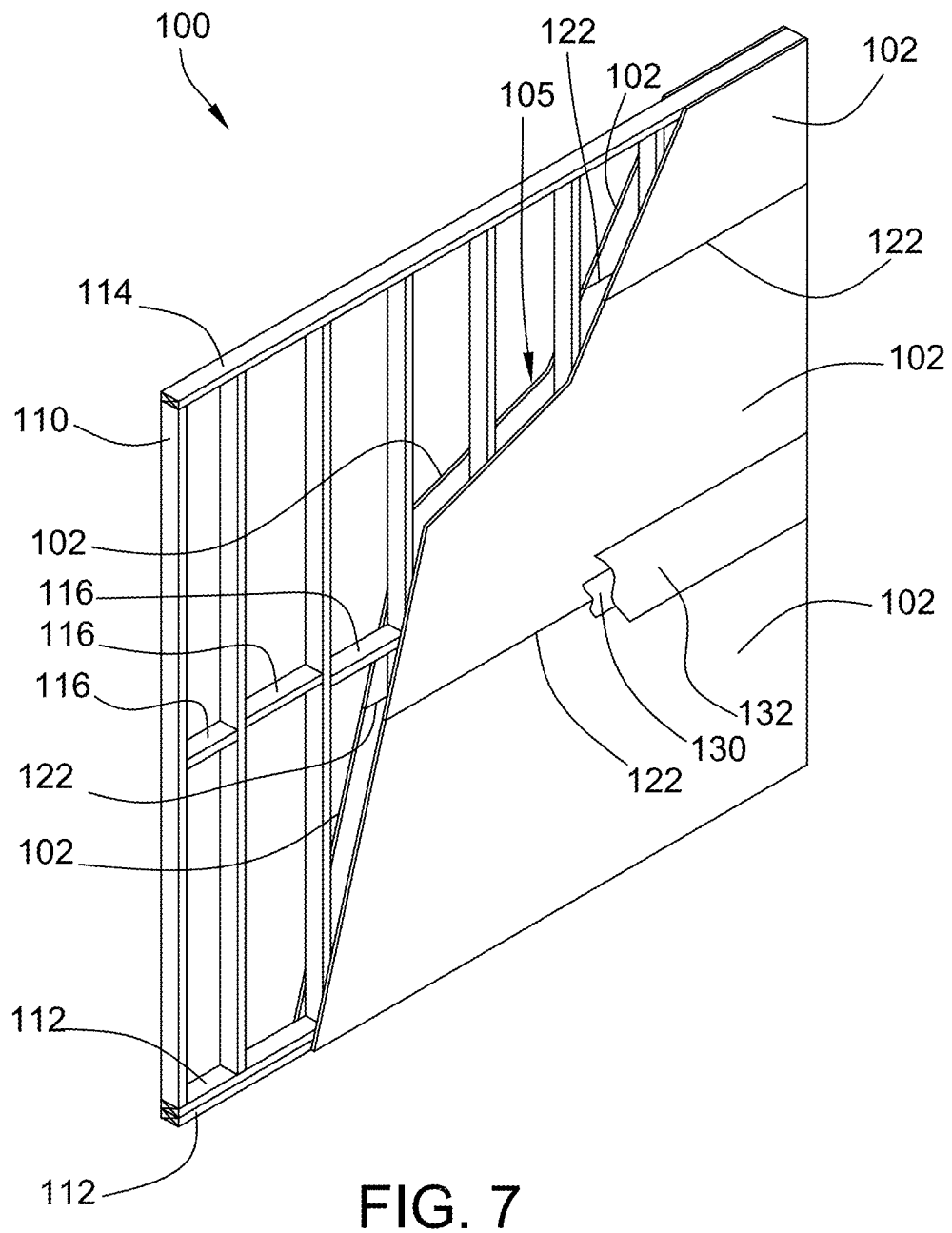
FIG. 7 is a perspective view of an embodiment of a representative assembly constructed in accordance with UL U305, UL U419, UL U423, and/or equivalent fire test and including gypsum panels formed according to principles of the present disclosure, the gypsum panels being shown in fragmentary form and joint tape and compound removed for illustrative purposes.
Figure 8:
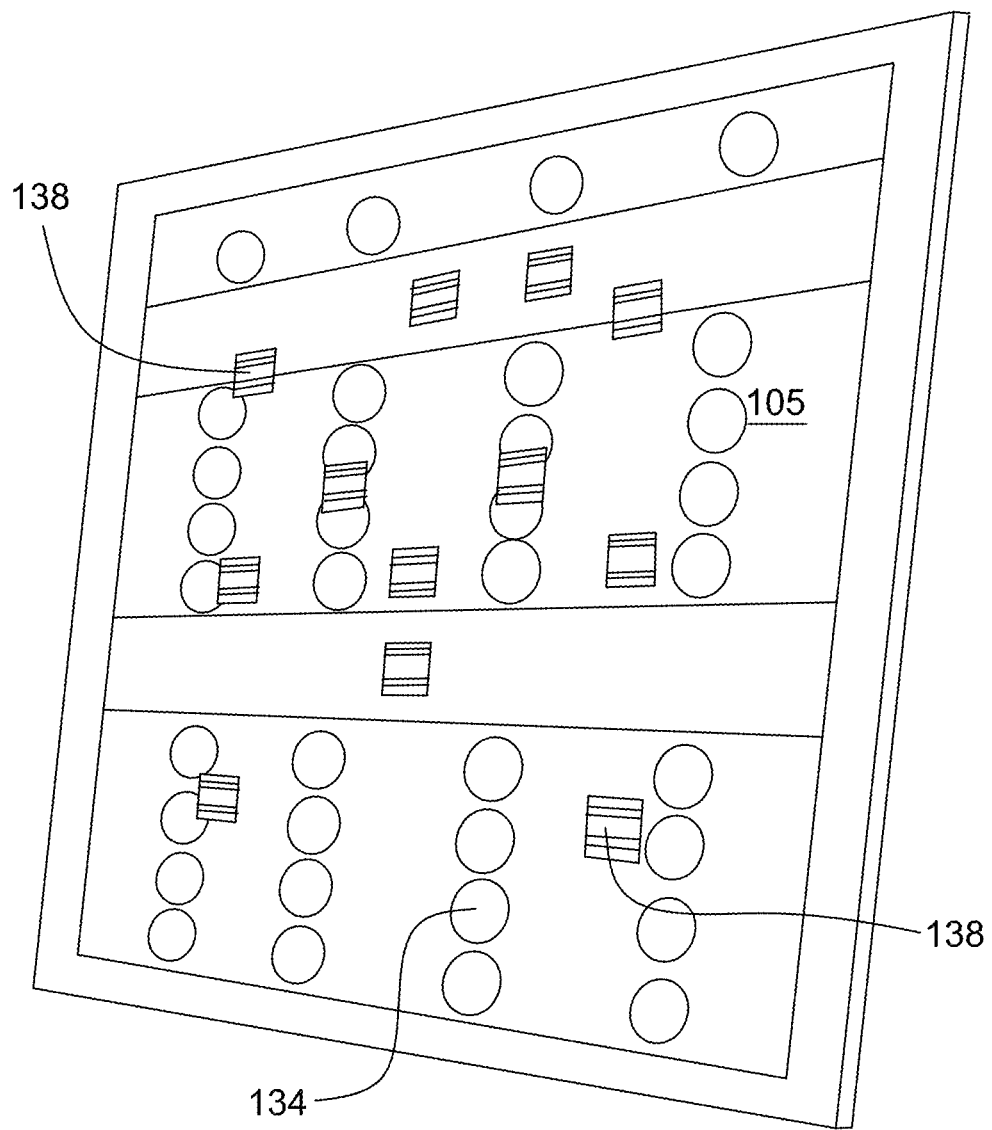
FIG. 8 is an elevational view of the assembly of FIG. 7 from the unexposed surface that includes a plurality of temperature sensors in accordance with UL U305, UL U419, UL U423, and/or equivalent fire test.

Referring to FIGS. 7 and 8, there is shown an exemplary embodiment of an assembly 100 that includes gypsum panels 102 formed according to principles of the present disclosure. The gypsum panels 102 are applied to both opposing surfaces 104, 105 of the assembly 100. The assembly 100 is representative of an assembly constructed according to Underwriters Laboratories UL U305, U419, and U423 specifications and any other fire test procedure that is equivalent to any one of those fire test procedures. It should be understood that reference made herein to a particular fire test procedure of Underwriters Laboratories, such as, UL U305, U419, and U423, for example, also includes a fire test procedure, such as one promulgated by any other entity, that is equivalent to the particular UL standard in question.

The assembly 100 includes wood studs 110 that are nominally 2 in. thick by 4 in. wide and spaced 16 in. on-center apart from each other. The assembly also includes a pair of sill plates 112 and a top plate 114 made from nominal 2 in. by 4 in. wood. In some embodiments, the wood studs 110 and plates 112, 114 can be number two grade, kiln-dried wood studs. The assembly 100 is effectively fire stopped with appropriate blocking 116 disposed between the studs 110. It should be understood that, although the exemplary assembly 100 includes wood studs 110, the assembly can include metal studs and loading parameters to conform to the particular specification according to which it is constructed.

The gypsum panels 102 in the assembly 100 are ⅝ in. thick and include paper cover sheets with tapered edges and square ends. The gypsum panels 102 are applied horizontally to the studs 110 with the horizontal joints 122 between adjacent gypsum panels 102 aligned on the opposing surfaces 104, 105 of the assembly 100.

In other embodiments, the gypsum panels 102 can be applied vertically to the studs 110. Horizontal joints of vertically-applied panels need not be backed by the studs 110.

The horizontal joints 122 between adjacent gypsum panels 102 are covered with paper tape 130 and joint compound 132. Joint compound and paper tape may be omitted when square edge boards are used. In other embodiments, a nominal 3/32 in. thick gypsum veneer plaster may be applied to the entire surface of gypsum panels classified as veneer baseboard with the joints reinforced with paper tape.

The gypsum panels 102 can be secured to the studs 110 using an appropriate nail or screw schedule. For example, the gypsum panels can be attached to the wooden studs with 6d cement coated nails (1⅞ in. long, 0.0915 in. shank diameter, and 15/64 in. diameter head) nailed 7 in. on center. The nail heads are covered with joint compound 134 (see FIG. 8). In other embodiments, the nail heads can be left exposed. In other embodiments, the nail schedule can be different and screws can be used with an appropriate screw schedule.

In the illustrated embodiment, the space between adjacent studs 110 is left empty. In other embodiments, glass fiber or mineral wool insulation batts can be placed to completely or partially fill the stud cavities. In yet other embodiments, as an alternate to insulation batts, spray-applied cellulose insulation material can be used. The sprayed insulation material can be applied with water to fill the enclosed stud cavity in accordance with the application procedures particular to the product used.

The gypsum panels 102 formed according to the present disclosure are effective to inhibit the transmission of heat through the assembly 100 panels prepared pursuant to UL U305 procedures wherein the first surface 104 is exposed to a heat source and the opposing surface 105 is unheated. The assembly 100 is subjected to load forces in accordance with UL U305 while being subjected to heating. The heat source follows a time-temperature curve in accordance with ASTM standard E119-09a. Referring to FIG. 8, the unheated surface 105 includes temperature sensors 138 applied thereto. The sensors 138 are arrayed in a pattern in accordance with UL U305 procedures. The gypsum panels 102 are effective to inhibit the transmission of heat such from the heated surface 104 to the unheated surface 105 that the maximum single temperature of the sensors 138 on the unheated surface 105 is less than about 415° F. and the average temperature of the sensors 138 on the unheated surface 105 is less than about 340° F. at about 50 minutes elapsed time when measured pursuant to UL U305. The gypsum panels 102 are effective to inhibit the transmission of heat such from the heated surface 104 to the unheated surface 105 to qualify for a one-hour fire rating for the assembly 100.

Gypsum panels 102 formed according to the present disclosure are effective to withstand the hose stream test also conducted as part of the UL U305 procedures. In accordance with UL U 305, an assembly constructed in similar fashion to that of FIG. 7 is subjected to fire endurance testing according to U305 for 30 minutes, at which time it is pulled from the heating environment and moved to another location for the hose stream test according to U305. The assembly is subjected to a stream of water from a fire hose equipped to send the water out at about 30 psi water pressure for a sixty second duration.

By extension, gypsum panels formed according to principles of the present disclosure can be used in assemblies that are effective to inhibit the transmission of heat therethrough to meet the one-hour fire-resistance rating to be classified as Type X board under ASTM 1396/C 1396M-06. In other embodiments, assemblies can be constructed using gypsum panels formed according to principles of the present disclosure that conform to the specification of other UL assemblies, such as UL U419 and U423, for example. In yet other embodiments, gypsum panels formed according to principles of the present disclosure can be used in other assemblies that are substantially equivalent to at least one of U305, U419, and U423. Such assemblies can pass the one-hour fire rating and applicable hose stream testing for U305, U419, U423, and other equivalent fire test procedures.

EXAMPLES

The following examples further illustrate aspects of the invention but, of course, should not be construed as in any way limiting its scope.

Example 1

The expansion characteristics of relatively low expansion vermiculite often used in conventional fire rated gypsum panels, such as Grade No. 5 vermiculite, relative to high expansion vermiculite used in panels and methods following principles of the present disclosure were evaluated under substantially identical heating conditions. In this study, 50 gram samples of exemplary unexpanded Grade 5 (relatively low expansion) vermiculite and exemplary high expansion vermiculite (here Grade 4 vermiculite) were put in three crucibles and heated in an oven for one hour under constant set temperatures of about 212° F. (100° C.), about 390° F. (200° C.), about 750° F. (400° C.), about 1,110° F. (600° C.) and about 1470° F. (800° C.). After one hour of heating, the samples were weighed and their respective densities were measured. Comparisons of the resulting average weight loss and density for each test sample are listed in Tables II and III, in FIGS. 20 and 21, respectively.

The bulk density of the unexpanded Grade No. 5 and unexpanded high expansion vermiculites in this study were nearly the same (66.1 vs. 66.9 lb/ft$^3$). The vermiculite volume did not show appreciable changes below about 390° F. (200° C.) but started to expand above about 390° F. (200° C.) and bulk density decreased with increasing temperature. The high expansion vermiculite expanded significantly more than Grade No. 5 relatively low expansion vermiculite under the same temperatures, producing corresponding differences in bulk densities. It also should be noted that while heating the No. 5 vermiculite from room temperature to about 1470° F. (800° C.), which approximates temperatures experienced in fire and fire test conditions, produced a volume expansion of about 290% relative to the of the original unheated volume. Heating high expansion vermiculite from room temperature to 1470° F. (800° C.) produced a significantly greater volume expansion of about 390% relative to the original unheated volume.

This study confirmed, among other observations, that for a given vermiculite weight and density, the amount of additional expansion volume produced by the high expansion vermiculite far exceeded that of the vermiculite used in conventional fire rated board. These results also confirmed that one of ordinary skill would not find it obvious to use such high expansion vermiculite in any significant amount in gypsum panels with the reduced weights and densities of panels formed according to principles of the present disclosure. The expansion properties of such high expansion vermiculite would be expected to seriously damage and reduce the structural integrity and stability of such gypsum panels when exposed to high temperature conditions such as those experienced in fire conditions and in fire testing conditions.

Example 2

As previously mentioned, reduced weight and density, fire resistant gypsum panels with paper cover sheets were made in accordance with principles of the present disclosure and subjected to X-ray micro computed tomography (CT) scanning analysis. The panels were specimens from Sample Run 2, and from one of Sample Runs 3, 4 or 5, discussed below in Example 4. Each of specimens from Sample Runs 2, 3, 4 and 5 were made with about 1280 lb/msf stucco; about 75-100 lb/msf Grade #4 vermiculite; about 20 lb/msf pregelatinized starch; about 32 lb/msf HRA accelerator, about 7.5 lb/msf glass fiber, about 2 lb/msf dispersant; about 1.5 lb/msf phosphates, and foam in an amount and composition sufficient to provide the desired panel weights and densities. The first panel cover sheet was approximately 61 lb/msf heavy manila paper and the second cover sheet was about 41 lb/msf newsline paper. The finished board had an approximate ⅝ inch thickness. Samples of the completed panels were made on different dates with a nominal weight of about 1860 lb/msf (Sample Runs 3, 4 and 5) and about 1880 lb/msf (Sample Run 2). The core densities were about 37 pcf and 36.5 pcf, respectively.

Figure 2:
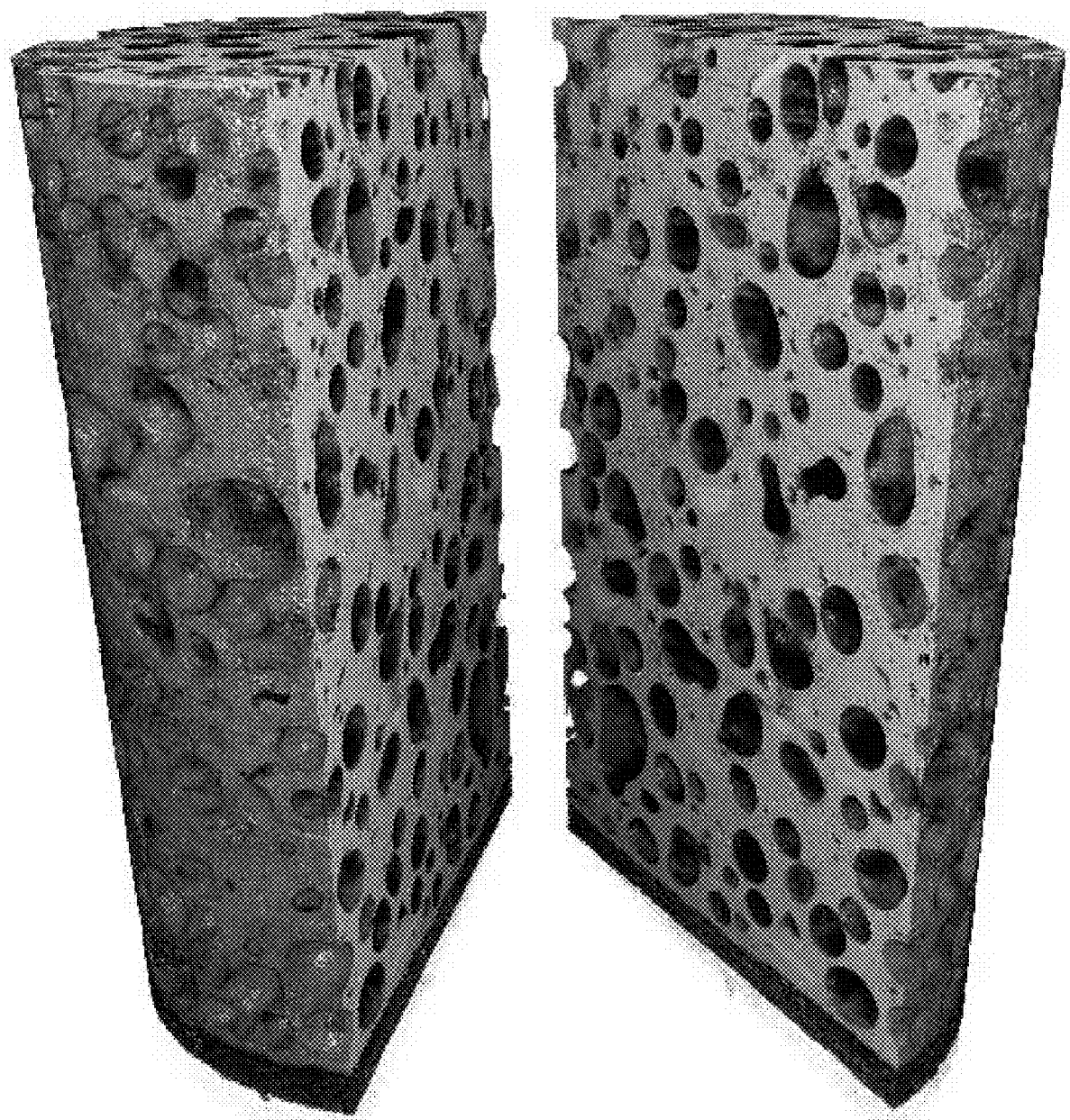
FIG. 2 is a three dimensional image developed from a micro CT-X-ray scan, as further discussed below, of a core section of the specimen shown in FIG. 1.
Figure 3:
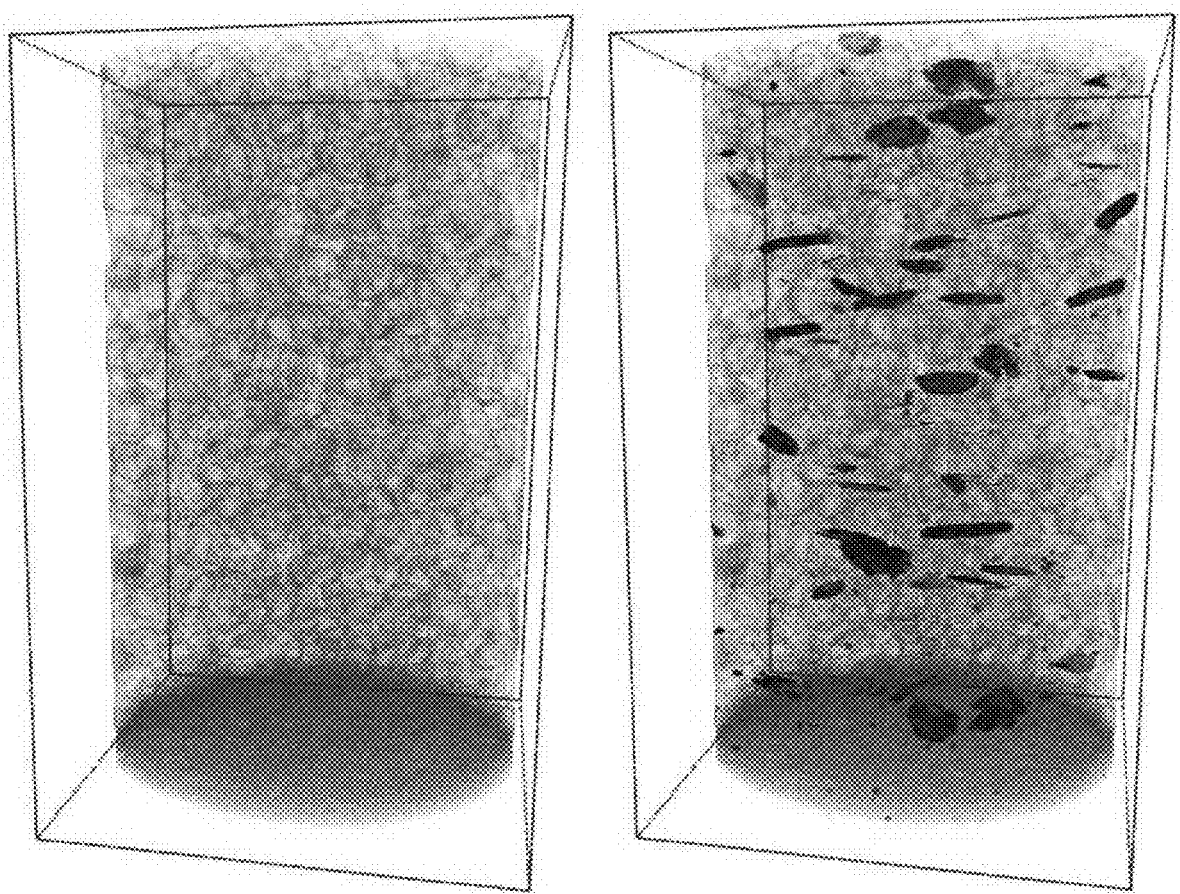
FIG. 3 is a three dimensional volume rendered image developed from a micro CT-X-ray scan, as further discussed below, of a core section of the specimen shown in FIG. 1.
Figure 4:
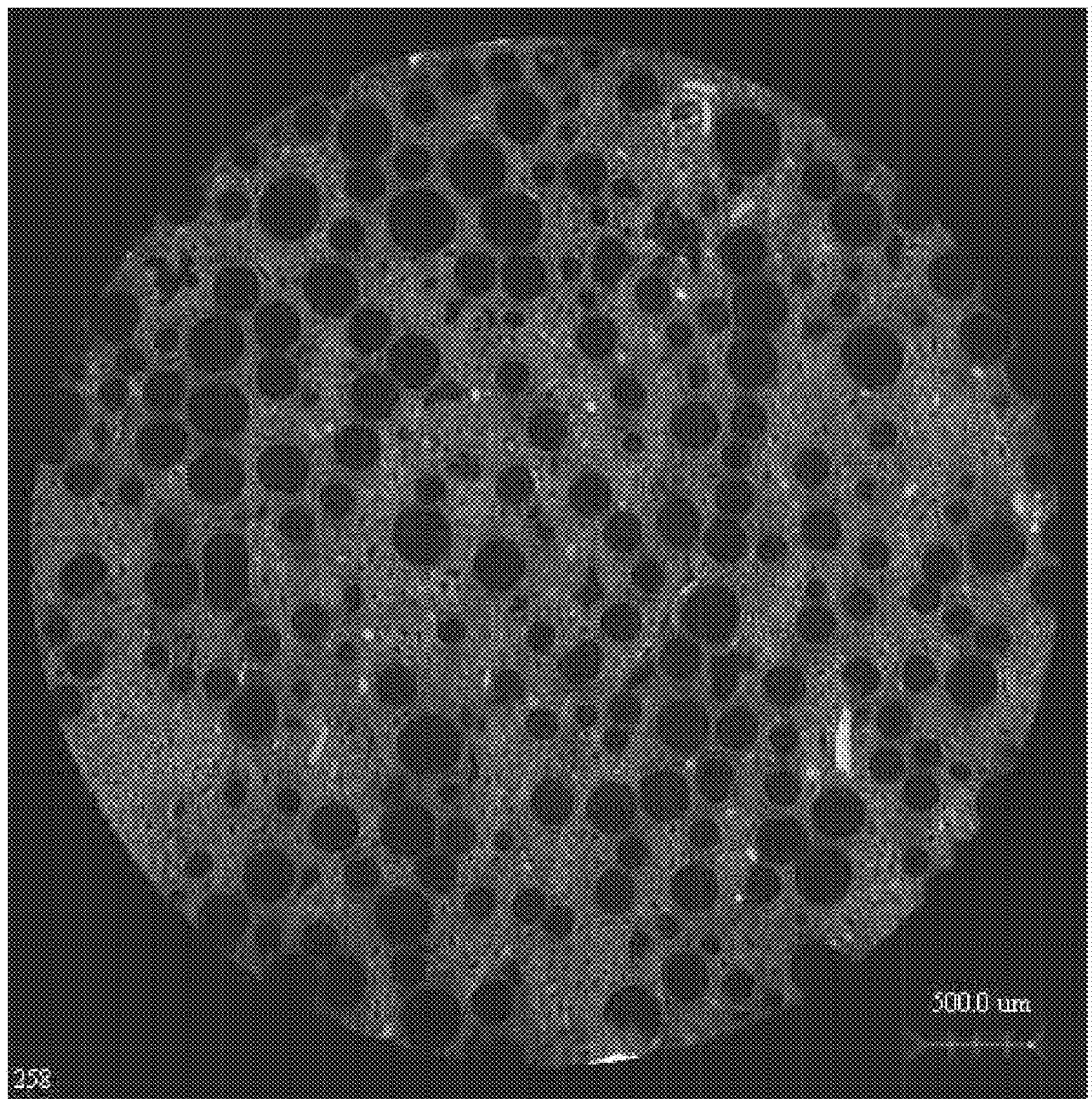
FIG. 4 is a two dimensional image developed from a micro CT-X-ray scan, as further discussed below, of a core section of a specimen from a nominal ⅝ inch thick, about 1860 lb/msf exemplary panel formed according to principles of the present disclosure.
Figure 5:
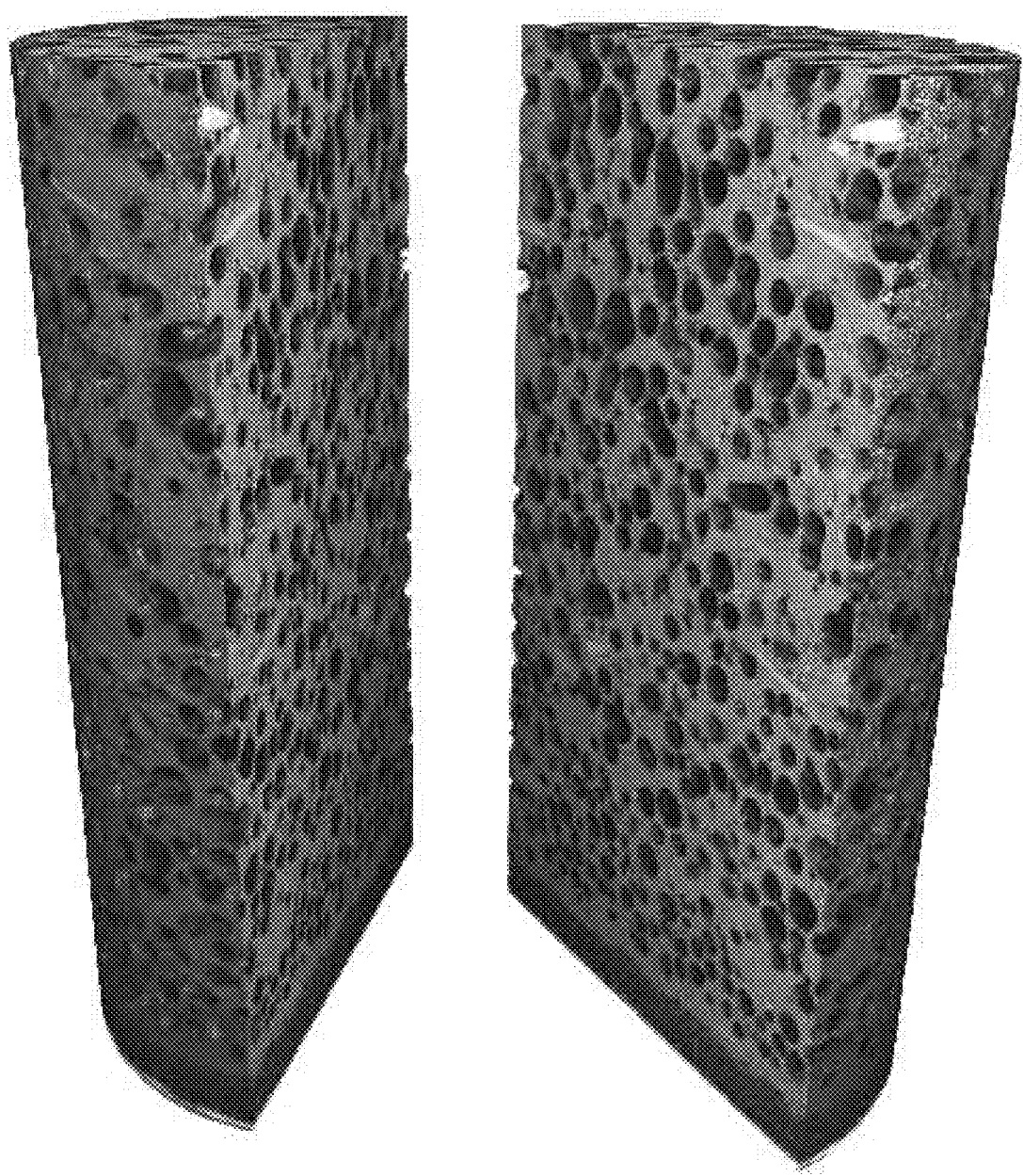
FIG. 5 is a three dimensional image developed from a micro CT-X-ray scan, as further discussed below, of a core section of the specimen shown in FIG. 4.
Figure 6:
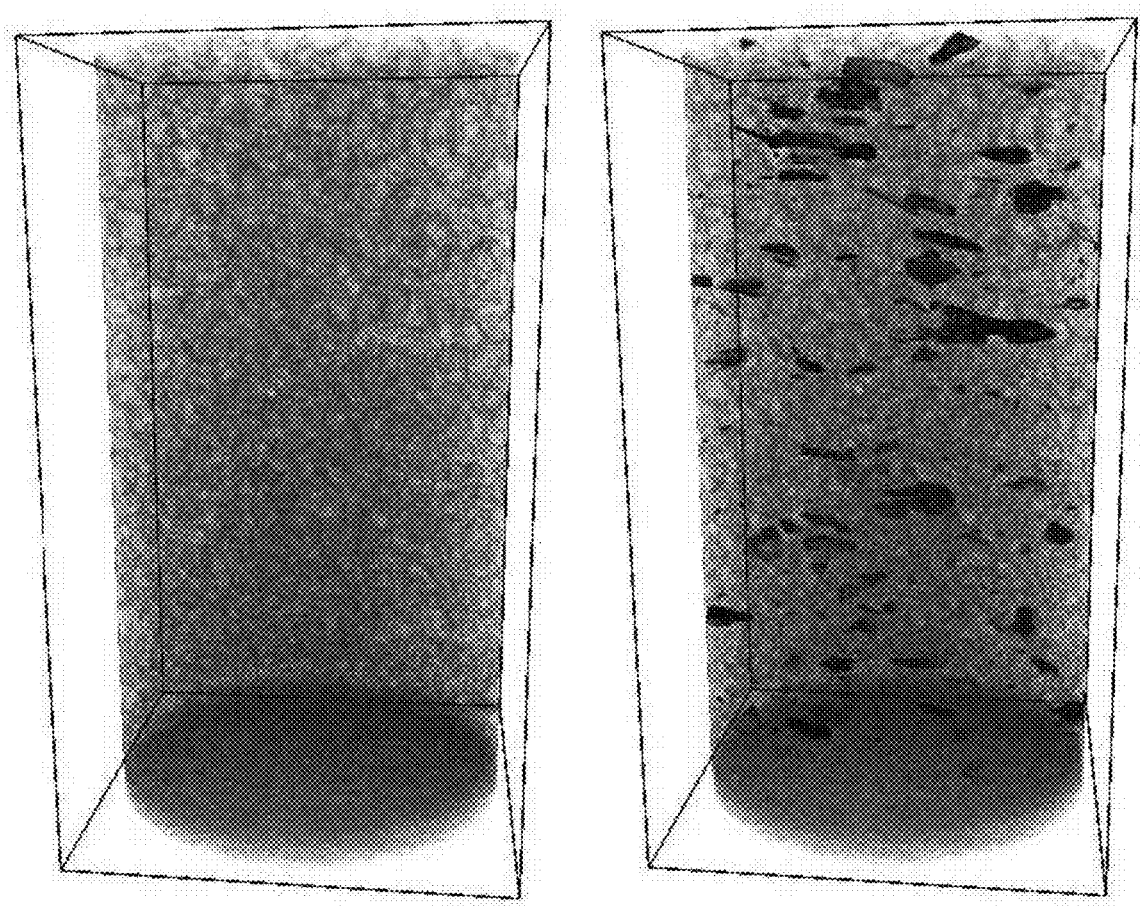
FIG. 6 is a three dimensional volume rendered image developed from a micro CT-X-ray scan, as further discussed below, of a core section of the specimen shown in FIG. 4.

Core specimens from each of the two sets of samples were analyzed using a cone beam x-ray micro CT scan technique with micron resolution, as generally discussed in Lin, Videla, Yu and Miller, "Characterization and Analysis of Porous, Brittle Solid Structures by X-Ray Micro CT," JOM, Vol. 62, No. 12, pp. 91-94 (Mineral, Metals and Materials Society, December 2010) ("the Lin X-Ray Micro CT article"), which is incorporated herein by reference. The data from the scans was analyzed and used to produce the images shown in FIGS. 1-6. FIGS. 1 and 4 are two dimensional slices of core specimens from the 1880 lb/msf and 1860 lb/msf samples, respectively. FIGS. 2 and 5 are three dimensional images of the same specimens, respectively, consisting of 1020×1024×1626 voxels, where the size of each voxel is 5.07×5.07×5.07 μm. FIGS. 3 and 6 present three dimensional volume rendered images of the 1880 lb/msf and 1860 lb/msf samples, respectively showing the distribution of voids and high expansion vermiculite (and other particulates).

The sample ⅝ inch-thick fire resistant gypsum panels formed according to principles of the present disclosure shown in FIGS. 1-6 include a set gypsum core comprising a gypsum crystal matrix having walls defining air voids within the gypsum core. The three-dimensional air void size distribution was determined using high resolution X-ray micro tomography (HRXMT) based on a 3-D watershed algorithm discussed in the Lin X-Ray Micro CT article (see also, A. Videla, C. L. Lin, and J. D. Miller, Part. Part. Syst. Charact., 23 (2006), pp. 237-245). The three-dimensional HRXMT image analysis with 5.07 µm voxel resolution was used with the three-dimensional watershed algorithm to calculate an equivalent sphere diameter for the counted air voids. Table IV in FIG. 22 presents the results for the measured three-dimensional air void size distribution by number and by volume for Sample Runs 2 and 3, Specimens 1 and 2, respectively, and two additional specimens of gypsum panels formed according to principles of the present disclosure using the same analytical procedures.

Referring to FIG. 22, in different embodiments, gypsum panels formed according to principles of the present disclosure can include a variety of different air void sizes, size distributions, and arrangements within the gypsum crystal matrix of the set gypsum core. For example, the total air voids per given sample size can vary from less than about one thousand to about 7000 and the average equivalent sphere diameter of the air voids can vary between about 100 µm to about 350 µm with a standard deviation from about 100 to about 225. As mentioned above, such air void structures and arrangements permit the reduction of the core density and weight, while maintaining desired board structural and strength properties.

The wall thickness distribution of the gypsum core of the specimens shown in FIGS. 1-6 was determined using HRXMT based on erosion, dilation, and skeletonization operations discussed in the Lin X-Ray Micro CT article (see also, W. B. Lindquist et al., J. Geophys. Res., 101B (1996), pp. 8297-8310). The three-dimensional HRXMT image analysis used the three-dimensional skeletonization procedure to calculate a gypsum core wall thicknesses between air voids. Wall thickness between adjacent air voids was obtained by a medial axis operation and is equal to the diameter of an equivalent sphere which touches both sides of the wall. Table V in FIG. 23 presents the results for the measured wall thickness for Sample Runs 2 and 3, Specimens 1 and 2, respectively, and two additional specimens of gypsum panels formed according to principles of the present disclosure using the same analytical procedure.

Referring to FIG. 23, in different embodiments, gypsum panels formed according to principles of the present disclosure can include a variety of different wall configurations within the gypsum crystal matrix of the set gypsum core. For example, the total number of walls per given sample size can vary from between about 20 million and about 35 million in some embodiments, and the average wall thickness within the gypsum core can be at least about 25 µm. In the specimens, the walls defining and separating air voids within the gypsum core can have an average thickness from about 25 µm to about 50 µm with a standard deviation from about 10 to about 25. As mentioned above, such wall structures and their arrangement, permit the reduction of the core density and weight, while maintaining desired board structural and strength properties. In some embodiments, a panel's gypsum core can employ the combined benefits of the above mentioned air void size distribution and arrangement, and the wall thickness distribution and arrangement to obtain substantial density and weight reduction, while provide acceptable strength and related properties.

As indicated in FIGS. 1 and 2, and 4 and 5, high expansion vermiculite particles are shown in their unexpanded form as white or gray particles generally distributed throughout the core material. Many of the vermiculite particles are located near or adjacent to voids structures in the core specimen, as well as interspersed throughout the structural elements of the panel cores. In FIGS. 3 and 6, the vermiculite particles are shown as large colored particles in various orientations suspended in the core structure, again dispersed throughout the core crystalline matrix, often close to or adjacent to the core voids. FIGS. 1-6 also reflect the variations in the vermiculite particles sizes and distributions that may occur in the core structure of gypsum panels formed according to principles of the present disclosure.

As mentioned herein above, FIGS. 1-6 are indicative of the relatively high void content, complex distribution of voids, and reduced density typical of the gypsum core of panels formed according to principles of the present disclosure. This structure is further complicated by the variation in crystalline structures in the void walls and adjacent intermediate core structure between voids. This crystalline structure may include needle-like crystallites, plate-like crystallites, and/or combinations of the same, and other crystalline and amorphous elements. Such embodiments of panels formed according to principles of the present disclosure rely on the integrity of such relatively brittle core structures to provide fire resistance, and/or other panel structure and strength properties, such as nail pull strength, sag resistance and bending resistance.

Accordingly, as illustrated in the FIGS. 1-6, incorporating high expansion vermiculite particles in such structures would be expected to lead to spalling, fracturing and disruption of the void walls and intermediate core areas when the panel is exposed to high temperatures due to the resulting very significant expansion of the vermiculite particle volumes (e.g. resulting in volumes from about 290% to greater than about 390% of the original unheated vermiculite volumes). This would be expected to severely weaken the core structure causing failures, premature cracking, or collapse of the panels. Moreover, because the high degree of vermiculite expansion occurs at temperatures where the gypsum core is losing volume, and potentially integrity, due to water loss and other crystalline morphology losses and/or changes, the high degree of vermiculite expansion in the void wall and intermediate core structures would be expected to accelerate the loss of panel integrity. Thus, it would be expected that substantial amounts of added gypsum or other shrinkage resistant additives would be required to provide structural strength necessary for fire resistance and board strength properties. As discussed above, and further illustrated in the examples herein, reduced weight and density panels formed according to principles of the present disclosure, to the contrary, provide fire resistance capabilities comparable to much higher density and, greater gypsum content panels.

Example 3

The x-y (width and length, respectively) panel shrink resistance test as discussed in the above mentioned reference U.S. Pat. No. 3,616,173 (the "'173 patent") was investigated as one way to characterize the fire resistance properties of gypsum panels formed according to principles of the present disclosure. As explained in the '173 patent, the extent to which the x-y dimensions of a section selected from a gypsum panel shrink when the section is subjected to heating is one indication of panel's resistance to shrinking, cracking and pulling away from the studs and supports of structural assemblies using the panels.

A set of ⅝ inch thick, approximately 3 inches by 9 inches samples of gypsum board were used in this study were tested generally following the procedures described in the '173 patent. The samples were cut from a full sheet of formed gypsum wallboard from Sample Run 13 mentioned below. (In the '173 patent, the samples were molded to a thickness of about ½ inch from a laboratory mixture using water instead of foam to control density). The samples were positioned in a muffle furnace by placing them upright on their long (and in this case ⅝ inch thickness) edge on a piece of insulating material, with insulating blocks positioned between the samples to prevent the core samples from toppling over. The initial x-y surface area of one or both sides of each sample was measured.

The oven and sample were at room temperature when the samples were placed in the muffle furnace. The muffle furnace was heated to 1800° F. and then held for one hour after which the heat was cut off and the furnace left to cool with its door slightly open. After the furnace and sample cooled to ambient temperature, the samples were removed and the x-y surface area of the samples was measured. The sample surface area remaining after the heating was divided by the initial pre-heating sample surface area, and multiplied by 100 to give the percent surface area remaining after heating. This number, the percent surface area remaining, is referred to herein as the "shrink resistance" value as that term is used herein.

Specimens from three different gypsum panel samples were tested in a first run. In that first run, three specimens from a sample were cut from a ⅝ inch thick gypsum panel prepared in accordance with the present disclosure from Sample Run 13 discussed in Example 4 below. These specimens were tested simultaneously with three specimens from each of two commercial board samples cut from a commercial ⅝ inch Type X board sold under the designation "Sheetrock Brand Firecode® ⅝" Type-X Core Board" commercially available from United States Gypsum Company. The Type X samples had a core density of about 43.5 pcf and board weight of about 2250 lb/msf.

The first sample panel, from Sample Run 13 discussed in Example 4, was prepared in accordance with the present disclosure and was about ⅝ inches thick and weighed about 1850 lb/msf, with a core density of 35.5 pcf. The panel was made from about 1311 lb/msf stucco, about 27 lb/msf HRA, about 30 lb/msf pregelatinized starch, about 100 lb/msf high expansion vermiculite, about 7.5 lb/msf glass fiber, about 1.5 lb/msf sodium trimetaphosphate, and about 2.5 lb/msf napthalenesulfonate dispersant, as well as foam in an amount and formulation necessary to produce the desired core density. Physical testing of the panel established that it demonstrated a nail pull strength of about 103 lb using ASTM test procedures.

In a second run, three specimens from each of a second commercial ⅝ inch Type X board sold under the designation "Sheetrock Brand Firecode ⅝" Type-X Board" commercially available from United States Gypsum Company. The Type X samples had a core density of averaging about 41.73 pcf and board weight of about 2250 lb/msf. Three specimens also were cut from each of a commercial ½ inch and a commercial ⅝ inch Firecode® C core board sold under the designation "Sheetrock Brand Firecode" C core. ½" and ⅝", respectively. These boards also were commercially available from United States Gypsum Company. The Firecode® C boards incorporated low expansion vermiculite. The ½ and ⅝ inch samples core density of averaging about 48.12 pcf and about 46.86, respectively, and board weight of about 2025 lb/msf and about 2550 lb/msf, respectively.

The average values from the shrink resistance test results are found in Table VI in FIG. 24. The data above demonstrates that fire rated board formed according to principles of the present disclosure had a significantly superior shrink resistance, at a much lower density and weight, using this test. The average shrink resistance was about 88% as compared to the shrink resistance of the much heavier and denser commercial Type X board samples of about 77% and about 61%. Similar results were observed relative to the significantly denser and heavier commercial Firecode® C panels, which demonstrated a shrink resistance using this test of about 74%. There was no appreciable difference in the shrink resistance using this test between the ½ inch and the ⅝ inch Firecode® C samples.

For comparison purposes, the '173 patent reported that that each of the tested ½ inch samples in its examples (unless otherwise stated) had a core density of about 43 pcf. The '173 patent further reported that at that density, the 63 tested samples evidenced a reported shrink resistance of from 54% (gypsum panels without small particle size inorganic material or vermiculite added) to about 85% (gypsum panels with clay and glass fibers at 0.45 weight percent of all dry core ingredients).

The '173 patents samples with only glass fibers only added (0.45 weight percent of all dry core ingredients) had reported shrink resistance of less than about 60% (e.g. 53.7%, to 61.5%). With vermiculite and glass fiber added, and without added small particle size inorganic material, the samples had reported shrink resistance values of about 60.8% (vermiculite at 1.0 weight percent of all dry core ingredients) and about 64.1% (vermiculite and glass fiber at 1.0 and 0.45 weight percent, respectively of all dry core ingredients). The samples with reported shrink resistance values of about 80% or more had a substantial clay content of 5.0, by weight of all dry core ingredients, including those samples with added glass fiber and vermiculite. In most, if not all, of the examples, little if any benefit was evidenced from the added vermiculite used there when the amount of added clay was held constant.

Therefore, it is surprising that in embodiments of gypsum panels formed according to principles of the present disclosure which did not incorporate significant amounts of small particle size inorganic material of either clay, colloidal silica, or colloidal alumina in its gypsum core to resist shrinkage under high temperature conditions, those embodiments nonetheless exhibited shrink resistance at least comparable to, if not better than, conventional Type X gypsum panels and commercial panels using low expansion vermiculite, such as Firecode® C panels.

Thus, formulations and methods for making fire resistant gypsum panels following principles of the present disclosure can provide gypsum panels with shrink resistance properties under this test that exceed much heavier and denser gypsum panels, and meet or exceed such panels with significant added ingredients, such as clay, which were necessary to provide desired shrink resistance.

Example 4

Several test runs on different days were made to produce nominal ⅝ inch thick examples of reduced weight and density gypsum panels formed according to principles of the present disclosure made using the formulation approach discussed herein, and examples of which are shown in Table I in FIG. 19. The test run samples are further described, in part, in Table VII in FIGS. 25a-b, which also provides component amounts, board weights and board densities (approximate amounts). The exemplary panels formed according to principles of the present disclosure were subjected to the testing discussed in Examples 4A to 4E below. Samples of commercially available Type X fire rated gypsum panels and glass-mat gypsum panels also were obtained for comparison purposes. The commercial samples referred to as Type X panels were from ⅝ inch thick SHEETROCK® brand FIRECODE® Type X gypsum panels commercially available from United States Gypsum Company (one hour fire rated) (Sample Run 21). The commercial samples referred to as glass-mat panels were taken from commercial ⅝ inch thick commercial SECUROCK® brand Glass-Mat sheathing gypsum panels commercially available from United States Gypsum Company (one hour fire rated).

The specimens for the densities, shrink resistance, z-direction High Temperature Thickness Expansion and insulation testing that were taken from the gypsum panels discussed in these Examples, both from the examples of principles of the present disclosure and those of commercial gypsum panels, were taken at least six inches from the edges of the panel in one or more locations in the "field" of the panels unless otherwise stated.

Example 4A

Specimens from Sample Runs 1 to 20 of reduced weight and density, fire resistant gypsum panels formed according to principles of the present disclosure were subject to high temperature core cohesion testing pursuant to EN 520 *Gypsum Plasterboards—Definitions, Requirements and Test Method*, which is commonly used in Europe as a standard for certain fire rated gypsum panels. The procedures for this test also are discussed in the report ASTM WK25392— Revision of C473-09 Standard Test Methods for Physical Testing of Gypsum Panel Products (hereinafter "ASTM Pub. WK25392") available at the web address www.astm.org/ DATABASE.CART/WORKITEMS/WK25392.htm or from ASTM International in other forms or formats.

This test evaluates the ability of the gypsum panels to withstand deflection and mechanical strains encountered when assemblies using the panels are exposed to high temperatures, such as those encountered in fires. Under high temperature conditions, for example, the structural elements of the assemblies, such as wall studs, may be deformed or compromised by their exposure to the high temperatures. As a result, the assemblies may be caused to deflect towards or away from the heat source imposing compression and/or expansion forces on the panels.

In these tests, an about 1.75 inch by about 12 inch (24 mm by 100 mm) test specimen is mounted horizontally with a cantilever length of about 10 inches (254 mm). A shear stress and bending moment are imposed by a weight hung from the free end of the specimen. The weight is suspended about 0.39 inches (10 mm) above a platform. The mass of the weight is based on the thickness of the test specimen, ranging from about 10.6 ounces (300 g) to about 25.9 ounces (450 g) for gypsum board thicknesses from about ½ inches (12.7 mm) to about ¾ inches (19.1 mm). The test specimen is exposed to flames by two horizontally opposed Meker burners located about 3.9 inches (100 mm) from the fixed end of the specimen.

The mouth of each burner is positioned about 1.0 inches (25.4 mm) from the adjacent face of the test specimen and adjusted so that a thermocouple inserted about 0.2 inches (5 mm) from the specimen reads about 1830° F. (1000° C.). If the specimen weakens and/or deflects, but remains intact without breaking into separate pieces when the weight contacts the platform, then it is deemed to have passed the test. At least six of seven replicates must pass for the gypsum panel sample to pass. The test results are expressed in terms of as a "pass" or "fail."

The tests for the specimens from all Sample Runs used a 25.9 ounce (450 g) weight. The specimens from each of the Sample Runs passed the high temperature core cohesion test, notwithstanding the reduced weight and density of the gypsum panels.

Example 4B

As mentioned above, in addition to core cohesion issues, shrinkage of the gypsum core due to exposure to high temperatures also contributes to the loss of physical integrity of an assembled panel structure, such as a wall unit and/or the fire barrier. A test for measuring "High Temperature Shrinkage" was developed and reported in ASTM Pub. WK25392 to provide a quantitative measure of the shrinkage characteristics of gypsum panels under high temperature conditions. This test procedure reflects the fact that the High Temperature Shrinkage that gypsum panels may experience under fire conditions is influenced by factors in addition to calcining reactions that may occur in the panel gypsum cores under high temperature conditions. The test protocol, accordingly, uses an unvented furnace so that there is no airflow from outside of the furnace that might cool the test specimens. The furnace temperature also is about 1560° F. (850° C.) to account for the shrinkage that may occur in the anhydrite phases of the gypsum core structures, as well as calcining and other high temperature effects, when exposed to the high temperatures fire conditions. "High Temperature Shrinkage" as used herein refers to a measure of the shrinkage characteristics of gypsum panels under high temperature testing and sample conditions consistent with those described herein.

Specimens of panels from Samples Runs 1 to 20 formed according to principles of the present disclosure were tested for the amount of x-y High Temperature Shrinkage they experienced under the high temperature conditions specified in ASTM Pub. WK25392. The specimens also were evaluated for their thickness loss or gain in these tests. The test specimens were about 4 inches (100 mm) diameter disks cut from gypsum board samples using a drill press with a hole saw blade. Six specimens were required for each test, and placed in the furnace side-by-side without touching each other. Test specimens also were placed on small pedestals to allow them to heat and vent uniformly on both faces so that they remained relatively flat, cylindrical disks.

In order to prevent thermal shock to the test specimens, which might produce invalid test results due to spalling and breakage, the test protocol was modified to place the test specimens in the furnace before it was heated to about 1560° F. (850° C.). The specimens were held at that temperature for a minimum of about 20 minutes before the furnace was shut off. The furnace door remained closed while the furnace cooled. The specimens were not removed for measurement until after the temperature had dropped to near room temperature.

As gypsum board is anisotropic, the amount of shrinkage will vary slightly in the length and width directions. Therefore, two orthogonal measurements were taken and averaged to compute the mean diameter of the disk. In these tests, two measurements at 90 degrees to each other were taken as it has been found that this approach provides a consistent mean diameter measurement from specimen to specimen. It has been found that the orientation of the specimens in terms of "machine direction" and "cross machine direction" is not a significant concern for the purposes of this test. Typically, if the two measurements for a disk differed by more than 0.01 inches (0.25 mm), then the disk was rejected and the measurements excluded from the reported results. High Temperature Shrinkage was calculated as the percent change in mean diameter after heat exposure, and denoted "5," typically to the nearest 0.1% for the group of six test specimens.

The data from this testing is reported in Table VIII in FIGS. 26a-b and demonstrates that the core structure of the exemplary panels formed according to principles of the present disclosure are significantly more resistant to High Temperature Shrinkage, (S from approx. 2% to approx. 4%), than would be expected given the reduced core density and the lack of gypsum content that is normally considered necessary to reduce gypsum panel shrinkage.

Moreover, the samples evidence a thickness expansion, or "High Temperature Thickness Expansion TE," in the z-direction of about 11% to over about 30% from their initial thickness prior to heating to their final thickness after heating. "High Temperature Thickness Expansion" as used herein refers to a measure of the thickness expansion characteristics of gypsum panels in the z-direction under high temperature testing and sample conditions consistent with those described herein. The ratio of High Temperature Thickness Expansion (z-direction) to High Temperature Shrinkage (i.e. TE/S) provides one measure of the overall benefit of following principles of the present disclosure, and was from about 3 to over 17 in Sample Runs 1 to 20.

For comparison purposes, the High Temperature Shrinkage, High Temperature Thickness Expansion, and ratio of expansion to shrinkage typical of commercial fire rated ⅝ inch thick gypsum panels also are included in Table VIII in FIG. 26b. That data, and the typical weight and density data, are from testing of commercial SHEETROCK® brand FIRECODE® Type X gypsum panels, SHEETROCK® brand FIRECODE® Type C gypsum panels, and SECUROCK® brand Glass-Mat sheathing gypsum panels, all commercially available from United States Gypsum Company. As can be seen, the relatively low High Temperature Shrinkage in the exemplary panels formed according to principles of the present disclosure is comparable to, if not better than, commercial fire rated panels. Moreover, the amount of High Temperature Thickness Expansion in the exemplary panels formed according to principles of the present disclosure is unexpectedly substantially greater than heavier, denser conventional fire rated gypsum board, without other adverse effects.

The unexpected benefit of panels formed according to principles of the present disclosure also is reflected in their substantially greater High Temperature Thickness Expansion (z-direction) to High Temperature Shrinkage ratio (TE/S) relative to the commercial fire rated panels. The relative small High Temperature Shrinkage and substantially great High Temperature Thickness Expansion of the exemplary panels formed according to principles of the present disclosure indicate that they provide unexpected fire resistance for their weight and density at temperatures reflective of those encountered in structural fire conditions. Similar results are also obtained with panels produced from other combinations of constituent materials within the scope of the invention.

Example 4C

One useful indicator of the fire performance of gypsum panels in assemblies, for example those utilizing loaded, wood stud frames as called for in the ASTM E119 fire tests, is discussed in the article Shipp, P. H., and Yu, Q., "Thermophysical Characterization of Type X Special Fire Resistant Gypsum Board," *Proceedings of the Fire and Materials 2011 Conference*, San Francisco, 31 Jan.-2 Feb. 2011, Interscience Communications Ltd., London, UK, pp. 417-426. That article discusses an extensive series of E119 fire tests of load bearing wood framed wall assemblies, and a correlation between the High Temperature Shrinkage and thermal insulation characteristics of commercial Type X gypsum panels and their expected performance under the E119 fire test procedures.

A linear multivariate regression analysis was conducted on the data from the tests with fire resistance FR (in minutes) as the dependent variable. The independent variables were percent shrinkage SH (as measured by the above mentioned High Temperature Shrinkage test in Example 4B), Thermal Insulation Index TI (as measured by the test discussed below in Example 4D), wood moisture content MC (as a percent by weight), and the laboratory facility of the testing LAB={0, 1}. The resulting linear regression analysis established the following relationship (with a standard of error for the regression of 2.55 minutes):

$$FR=18.3-1.26SH+1.60TI+0.42MC+6.26LAB \quad (1)$$

Assuming testing conducted in a single lab (LAB=1) and a typical wood moisture content of 13.5%, the above relationship can be expressed as follows:

$$FR=30.23-1.26*SH+1.60*TI \quad (2)$$

Equation 2 may be rearranged to indicate a predicted minimum Thermal Insulation Index for a typical commercial Type X panel in a loaded, wood stud assembly necessary to provide fire test performance under E119 test procedures using High Temperature Shrinkage test data. The resulting relationship may be expressed as:

$$TI \geq (FR-30.23)/1.60+1.26/1.60*SH \quad (3)$$

For fire resistance at 50, 55 and 60 minutes. the desired TI would greater than or equal to the following:

$$TI \geq 12.36+0.78*SH \quad (4a)$$

$$TI \geq 15.48+0.78*SH \quad (4b)$$

$$TI \geq 18.60+0.78*SH \quad (4c)$$

As shown in Table IX in FIG. 27, the above relationships expressed in equations 4a to 4c indicate that the listed approximate minimum TI values would be required to provide acceptable fire resistance under the E119 conditions at about 50, 55 and 60 minutes. The High Temperature Shrinkage values SH for the Sample Run panels and commercial panels are provided in Table X in FIGS. 28a-b as discussed in Example 4B above.

For the exemplary panels from Sample Runs 1 to 20 formed according to principles of the present disclosure, the minimum TI values derived from the relationships (equations 4(a) to 4(c)) would be equal to or greater than from about 13.8 to about 15.8 at 50 minutes, from about 16.6 to about 19 at 55 minutes, and from about 20 to about 22 at 60 minutes. These calculated TI values comparable to, if not better than, the calculated TI values of commercial Type X, Type C (with grade 5 vermiculite) and glass faced gypsum panels also reported in Table IX in FIG. 27. The calculated TI values for the commercial panels, at much heavier weights and densities, would be equal to or greater than from about 13.9 to about 16.6 at 50 minutes, from about 17 to about 19.7 at 55 minutes, and from about 20.2 to about 23 at 60 minutes.

As discussed below in Example 4D, the measured TI values for specimens from the exemplary panels formed according to principles of the present disclosure, Sample Runs 1 to 20, equal or exceeded these predicted TI value minimums, not withstanding their significantly reduced weights and densities relative to Type X gypsum panels and were comparable to the measured TI values of the Type X gypsum panel sample. Moreover, under comparable testing using the U305 procedures discussed in Example 4E below, panels formed according to principles of the present disclosure actually provided greater than expected fire resistance when subject to fire testing. Without being bound by theory, it is believed that the surprising increased fire resistance of panels formed according to principles of the present disclosure demonstrated in actual fire tests is attributable, in part, to the degree of High Temperature Thickness Expansion achieved by panels and methods of the present disclosure. Also without being bound by theory, it is believed that the benefits of such significant High Temperature Thickness Expansion may not be reflected in the above relationships, as they are based on tests with Type X gypsum panels that typically exhibit a contraction during heating (see Table VIII in FIG. 26b, Type X tests).

Example 4D

High Temperature Thermal Insulation Index testing pursuant to the procedures discussed in ASTM Pub. WK25392 also was evaluated. This procedure provides a simple, representative test of the high temperature thermal insulating characteristics of gypsum panels. The heat transfer conditions reflected in this test can be described by the energy equation for one dimensional unsteady heat conduction through the board thickness:

$$\Delta/\Delta x(k(\Delta T/\Delta x))+q=\rho c_p(\Delta T/\Delta t) \quad (5)$$

where T is the temperature at a given time t and depth x in the board. The thermal conductivity (k), density (ρ), and specific heat ($c_p$) are nonlinear temperature dependent functions at elevated temperatures. The heat generation rate q represents a variety of endothermic and exothermic reactions, e.g., gypsum phase changes and face paper combustion, which occur at different temperatures and, correspondingly, at different times.

For the purpose of evaluating the total heat conduction through the gypsum board and, hence its thermal insulating performance, it typically is not necessary to separately measure and describe each variable mentioned above. It is sufficient to evaluate their net cumulative effect on heat transfer. For that purpose, the simple High Temperature Thermal Insulation Index test discussed in ASTM Pub. WK25392 was developed. "High Temperature Thermal Insulation Index" as used herein refers to a measure of the thermal insulation characteristics of gypsum panels under high temperature testing and sample conditions consistent with those described herein. Each test specimen consists of two 4 inch (100 mm) diameter disks clamped together by type G bugle head screws. A thermocouple is placed at the center of the specimen. The specimen then is mounted on edge in a rack designed to insure uniform heating over its surface and placed in a furnace pre-heated to about 930° F. (500° C.). The temperature rise at the center of the test specimen is recorded and a Thermal Insulation Index, TI, computed as the time, in minutes, required for the test specimen to heat from about 105° F. (40° C.) to about 390° F. (200° C.). The Thermal Insulation Index of the test specimen is calculated as:

$$TI = t_{200° C.} - t_{40° C.} \quad (6)$$

A temperature profile developed from data collected by this procedure often shows the transition from gypsum to hemihydrate at about 212° F. (100° C.) and the conversion of hemihydrate to the first anhydrite phase near about 285° F. (140° C.). Such data also often shows that once these phase transitions are completed, the temperature rises rapidly in a linear fashion as no further chemical or phase change reactions of significance typically occur below the oven temperature of about 930° F. (500° C.). By waiting until the specimen's core temperature has reached about 105° F. (40° C.) to begin timing, acceptable repeatability and reproducibility may be achieved.

The Thermal Insulation Index tests of the specimens from Sample Runs 1-20 are reported in Table X in FIGS. 28a-b. The Thermal Insulation Index (TI) data for the examples from the Sample Runs show that the core structure of reduced weight and density gypsum panels formed according to principles of the present disclosure provides surprisingly effective thermal insulation properties given their density and gypsum content. As indicated in Table X, the Thermal Insulation Index values varied from about 22 minutes to about 25 minutes for the specimens from Sample Runs 1-20. This indicates that a core composition formed according to principles of the present disclosure is a more effective heat insulator than expected in view of the core density for the purposes of resisting the high temperatures experienced under fire and fire test conditions. These examples also show that the ratio of Thermal Insulation Index to density ranged from about 0.60 to about 0.68 minutes/pcf for the specimens from Sample Runs 1-20. For comparison, the ratio of Thermal Insulation Index to density was from about 0.55 to about 0.59 minutes/pcf for the specimens from the heavier, denser commercial SHEETROCK® brand FIRECODE® Type X gypsum panels, SHEETROCK® brand FIRECODE® Type C gypsum panels, and SECUROCK® brand Glass-Mat sheathing gypsum panels Sample Runs 1-20.

As indicated by this data, exemplary panels formed according to principles of the present disclosure have somewhat lower Thermal Insulation Index values than the much heavier and denser commercial panels. This might be considered an indication that the exemplary panels formed according to principles of the present disclosure would have reduced fire resistance performance. However, when the density of the exemplary panels formed according to principles of the present disclosure is taken into account, their thermal insulation capacities (as reflected by TI to density ratios) are similar to or better than the heavier, denser commercial panels. Further, as indicated in Example 4E, the exemplary panels formed according to principles of the present disclosure demonstrated unexpected fire resistance as relative to heavier, denser commercial panels when they were used in assemblies subjected to full scale fire testing.

Example 4E

Specimens from Sample Runs 1 to 20 of reduced weight and density, fire resistant panels formed according to principles of the present disclosure were subject to full scale fire testing in accordance with the procedures set forth in UL procedures U419, U423 and U305. These test procedures call for the assembly of a test structure comprising a wall assembly frame of steel or wood studs (typically about 10 foot vertical studs, mounted between base plate and a cap plate of the same material). Assemblies using specimens of panels formed according to principles of the present disclosure from Sample Runs 1 to 17 were subjected to fire testing under the U419 procedures; an assembly using specimens of panels formed according to principles of the present disclosure from Sample Run 18 was subjected to U423 fire testing procedures; and assemblies using specimens of panels formed according to principles of the present disclosure from Sample Runs 19 and 20 were subjected to U305 fire testing procedures.

In addition, samples of commercial one hour fire rated ⅝ inch thick SHEETROCK® brand FIRECODE® Type X gypsum panels, (Sample Run 21), and commercial ⅝ inch thick commercial one hour fire rated SECUROCK® brand Glass-Mat sheathing gypsum panels (Sample Run 22), were subject to the procedures of U419 and U423, respectively, for comparison purposes. The Type X panels of Sample Run 21 weighed approximately 2250 lb/msf, with a core density of about 43.5 pcf. The Securock® panels of Sample Run 22 weighted about 2630 lb/msf, with a core density of about 51 pcf.

In the U419 and U423 tests, the studs were commercially available light gauge steel studs formed from steel having a thickness from about 0.015 inches to about 0.032 inches, and having the dimensions of about 3⅝" or 3½" inches wide by about 1¼" inches thick. The steel studs, Viper 25 steel studs (Marino/Ware, Div of Ware Industries Inc), were spaced about 24 inches apart in the assembly. The U305 test used #2 Douglas Fir wood 2×4 studs (approximately 3.5 inches wide by 1.5 inches thick), spaced about 16 inches apart.

The U419 test procedures are considered among the most rigorous of the types of UL tests as the light gauge steel studs often experience heat deformation (typically urging the exposed panels towards the gas jet flames) due to heat transfer through the panels and into the assembly cavity between the exposed and unexposed panels. This deformation often causes separation of the panel joints, or other failures, on the heated, exposed side of the assembly allowing penetration of the gas jet flame and/or high heat into the assembly cavity and into the unexposed, unheated side of the assembly. It is expected that the lighter the gauge of the steel studs, the greater the likelihood of heat deformation of the studs and assembly.

The gypsum panels were attached horizontally, i.e. perpendicular to the vertical studs, on each side of the assembly. Typically, two approximately 10 foot by 4 foot panels, and one approximately 10 foot by 2 foot panel were used on each side of the frame. The 10 foot by 2 foot panel was placed at the top of the assembly, which presents a more difficult test for the assembly than if the narrower panel was placed in the middle between the wider panels or at the bottom of the assembly. Horizontal edge joints and butt joints on opposite sides of the studs were not staggered. The panels were attached to the frame with one inch type-S hi/low screws on each side of the assembly, eight inches off center. The panels were positioned so that the seams between the panels on each side of the frame were aligned with each other. Then, the seams were sealed with paper joint tape and joint compound.

The test type, stud type and results expressed in time (minutes and seconds) until termination of the test are indicated in Table XI in FIGS. 29*a-c*. In the tests following the procedures of U419, the steel used to form the light gauge studs was either 0.015 inches or 0.018 inches thick. The tests following the procedures of U423 used commercially available steel studs made from steel about 0.032 inches thick. Under the U419 procedures, the assembly is not subject to external loading. In the U419 testing, the specimens failed by exceeding prescribed temperatures limits. Under the U423 and U305 procedures, a total external load of approximately 9,520 lb (U423) and 17,849 lb (U305) was applied to the top of the assembly. In the U 423 and U 305 testing, the specimens failed by breaking under the load rather than exceeding prescribed temperature limits.

Figure 9:
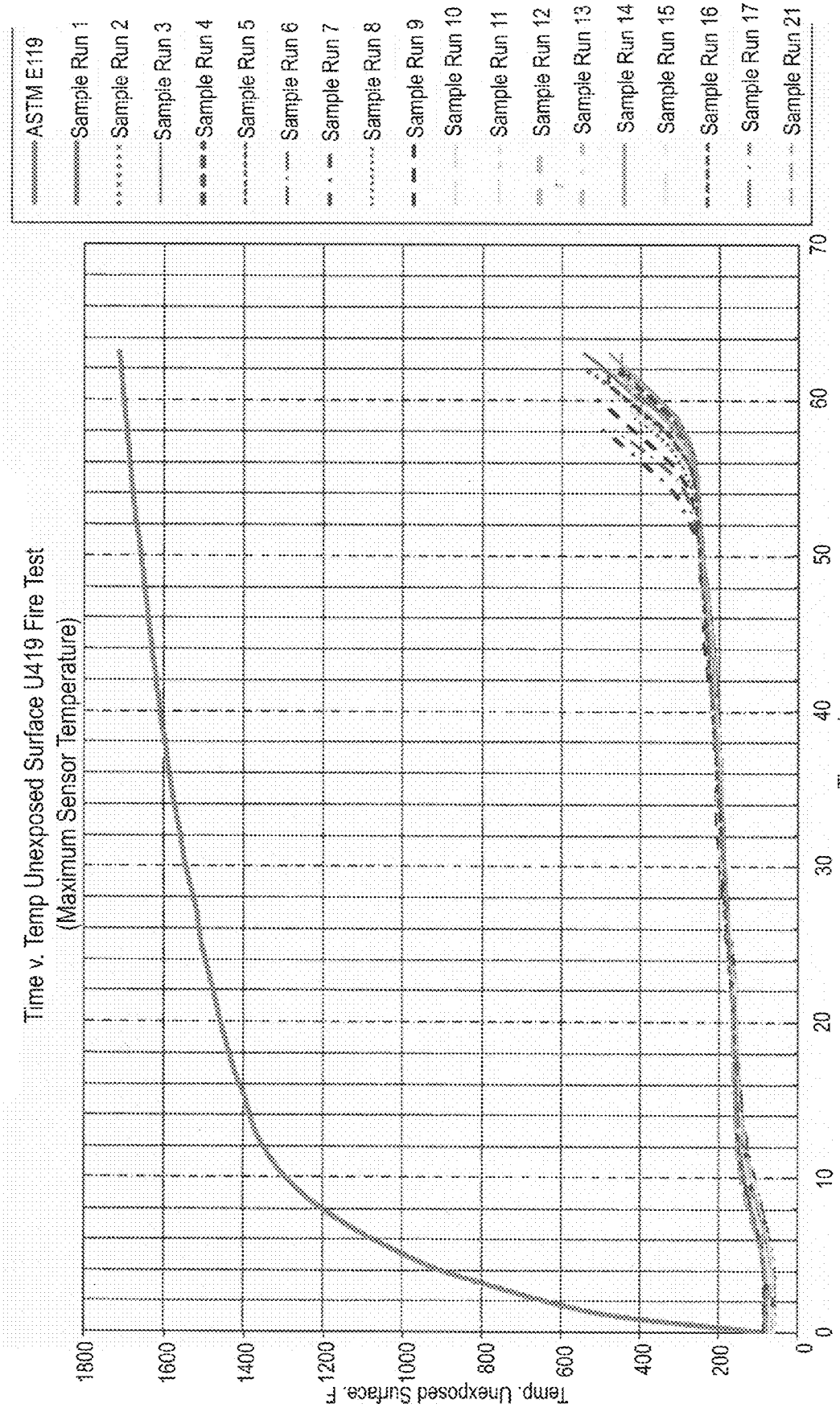
FIG. 9 is a plot of the maximum single sensor temperature at the unexposed surface of each of the assemblies made with panels from Sample Runs 1 to 17 and 22 described herein and subjected to fire testing under the condition of UL U419 (as discussed below), from 0 minutes elapsed to the termination of the tests, and a plot of the ASTM E119 temperature curve used for the furnace temperatures in the tests.
Figure 10:
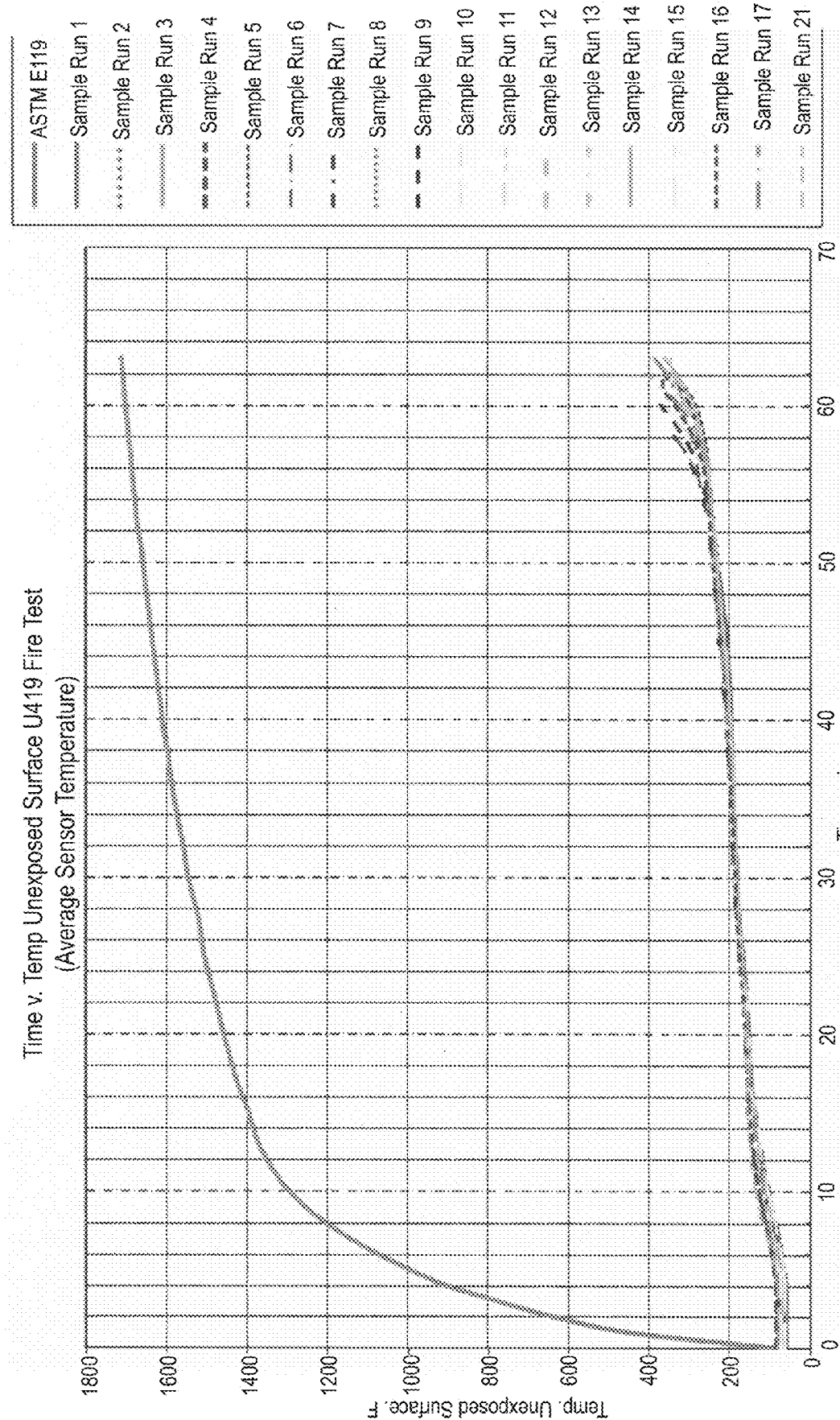
FIG. 10 shows a plot of the average sensor temperatures at the unexposed surface of each of the assemblies from the UL U419 fire tests that are the subject of FIG. 9, from 0 minutes to the termination of the tests, and the ASTM E119 temperature curve used for the furnace temperatures in such tests.

In each of the tests, the completed panel and frame assembly was positioned so that one side of the assembly, the exposed side, was subjected to an array of gas jet furnace flames that heated the exposed side of the assembly to temperatures and at a rate specified by the ASTM standard ASTM E119, pursuant to the U305, U419 and U423 procedures. Examples of the ASTM E119 heating curve are shown in FIGS. 9 and 10. Pursuant to those ASTM and UL procedures, a set of about 14 sensors were arrayed in spaced relation between the heated exposed side of the assembly and each of the gas jets to monitor the temperatures used to heated the exposed side of the assembly. Also pursuant to those ASTM and UL procedures, a set of sensors were arrayed in spaced relation on the opposite, unheated, unexposed side of the assembly. Typically, 12 sensors were applied to the, unexposed surface of the assembly in a pattern in accordance with the UL and/or ASTM specifications. Pursuant to those procedures, each sensor also was covered by an insulating pad.

During the fire test procedures, the furnace temperatures used followed the ASTM-E119 heating curve starting at ambient temperatures and increasing on the exposed side of the assembly to over 1600° F. in approximately one hour, with the most rapid change in temperature occurring early in the test and near the test's conclusion. The test was terminated when either there was a catastrophic structure failure of the assembly, the average of the temperatures from the sensors on the unexposed side of the assembly exceeded a preselected temperature, or when a single sensor on the unexposed side of the assembly exceeded a second preselected temperature.

The data from the fire tests are plotted in FIGS. 9-16. FIG. 9 shows a plot of the maximum single sensor temperature on the unexposed surface of each of the assemblies with panels from Sample Runs 1 to 17 and commercial samples 21, from the start of each test to the test termination. As mentioned above, FIG. 9 also shows a plot of the ASTM E 119 temperature curve used for the furnace temperatures on the exposed side of the assemblies. FIG. 10 shows a plot of the average temperatures on the unexposed surface of each of the assemblies with panels from Sample Runs 1 to 17 from the start of each test to the test termination, as well as the ASTM E 119 temperature curve used for the furnace temperatures on the exposed side of the assemblies. As indicated by the data plots, the unexposed side, maximum single sensor and the average sensor temperatures for all of the assemblies were closely aligned throughout the test, notwithstanding the very significant differences in density and gypsum content between the panels from Sample Runs 1-20 and the much heavier and denser commercial Type X and glass faced gypsum panels, Sample Runs 21 and 22.

As indicated in FIGS. 9 and 10, in addition, there is an inflection in the plots between about 50 to 55 minutes elapsed time and after the inflection point the unexposed, maximum single sensor and average sensor temperatures for each test show a sharp increase in slope. It is believed, without being bound by such a theory, that the inflection point indicates a point where the exposed, heated panels of the assembly are near or past the limits of their heat sink and heat insulation capacities and thus the heat transfer through the assembly rapidly increases through the termination of the test. Such transmittal may be through the panels themselves or through one or more openings in the joints between panels. Regardless of the specific reasons for the inflection points demonstrated by the data, it was unexpected that the temperatures transmitted through the panels and assembly cavities, and the rates of temperate transmittal, are comparable for reduced weight, reduced density panels formed according to principles of the present disclosure and much heavier panels with much greater core densities.

Figure 11:
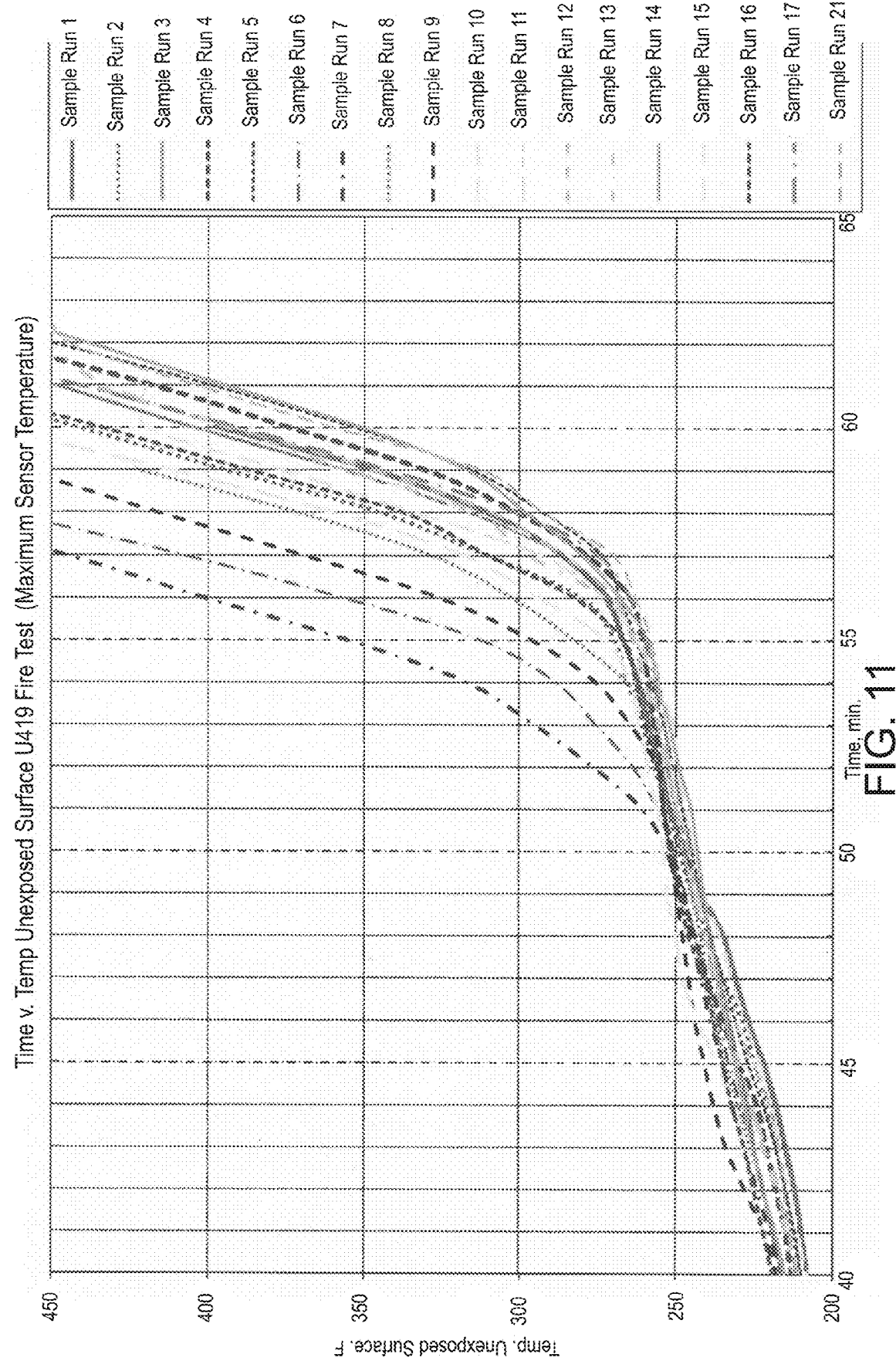
FIG. 11 is an expanded plot of the maximum single sensor temperatures from the U419 fire tests that are the subject of FIG. 9 for the assemblies using the panels of Sample Runs 1 to 17 and 21, from 40 minutes to 65 minutes elapsed time.
Figure 12:
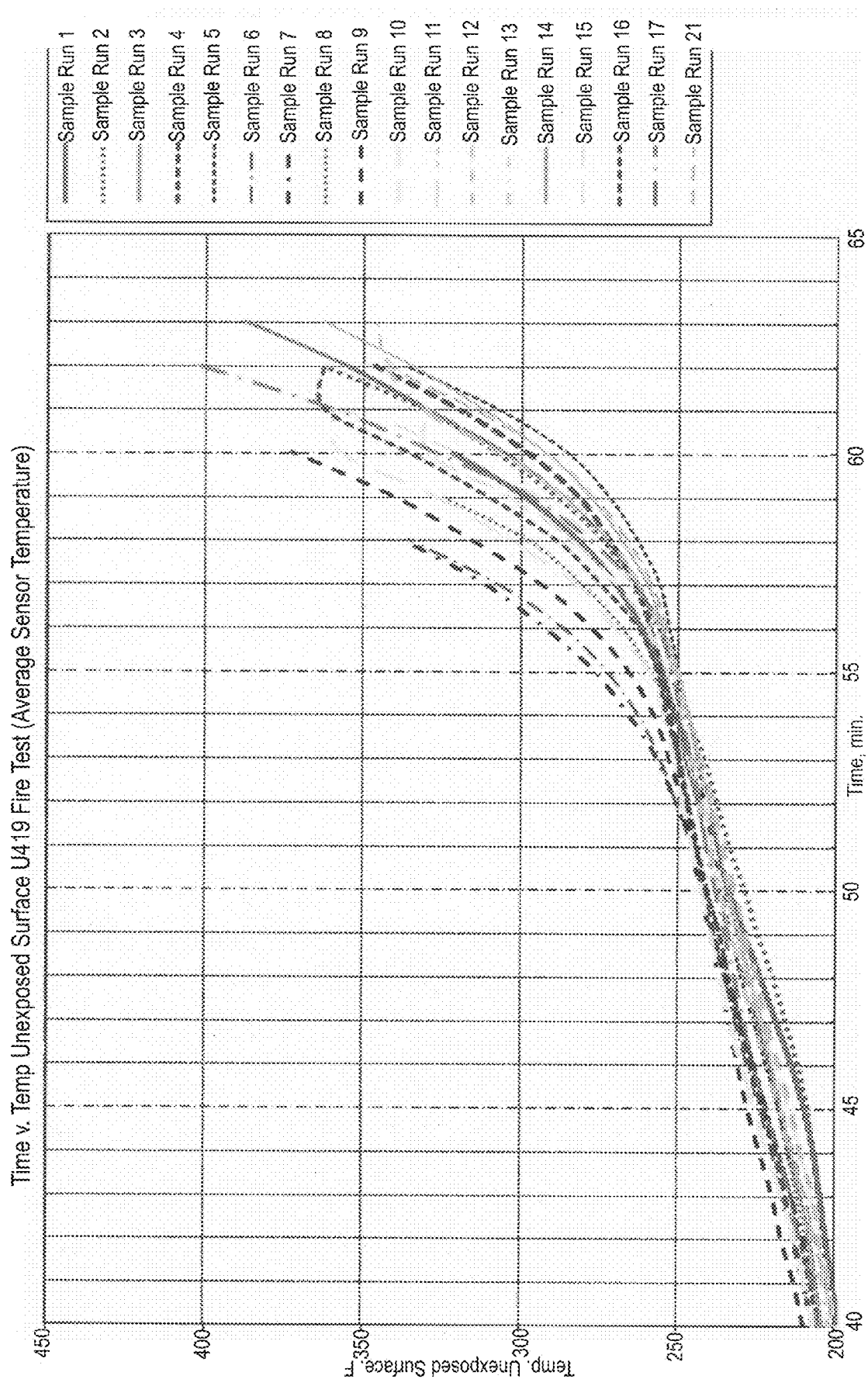
FIG. 12 is an expanded plot of the average of the sensor temperatures from the UL U419 fire tests that are the subject of FIG. 10 for the assemblies using the panels of Sample Runs 1 to 17 and 21, from 40 minutes to 65 minutes elapsed time.

FIGS. 11 and 12 are plots of the maximum single sensor and the average of the sensor temperatures, respectively, on the unexposed surface of each of the assemblies in the U419 fire tests of using panels from of Sample Runs 1 to 17 and commercial Type X Sample 21. FIGS. 11 and 12 show an expanded plot of the data from 40 minutes elapsed time to 65 minutes elapsed time (all tests terminated before 65 minutes). These data plots show in greater detail the close correspondence in fire resistance of panels formed according to principles of the present disclosure, and assemblies made using them, to the much heavier and denser Type X panels, and assemblies using the Type X panels up to between about 50 to 55 minutes.

Figure 13:
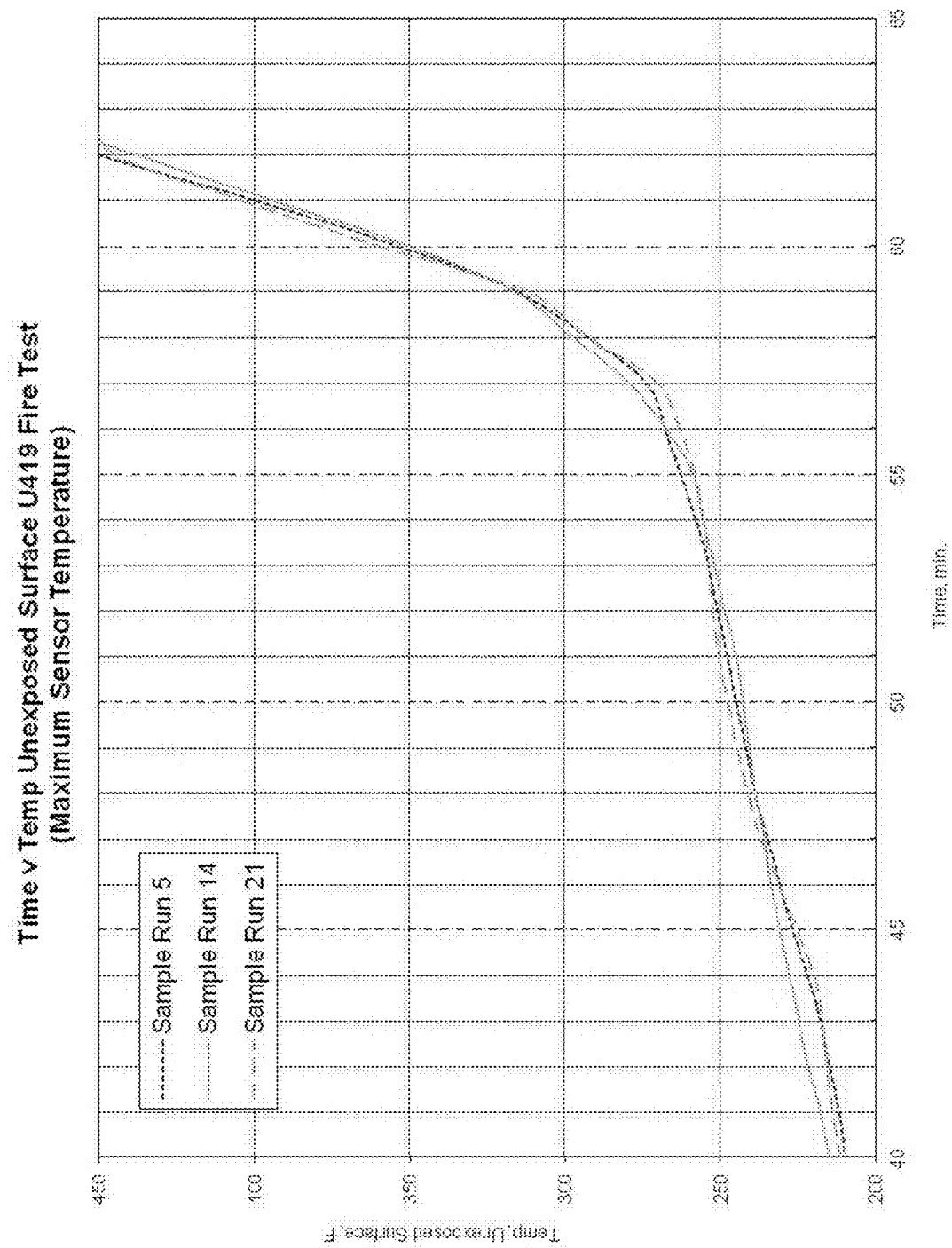
FIG. 13 is a plot of the data from FIG. 11 for the assemblies using the panels of Sample Runs 5, 14, and 21.
Figure 14:
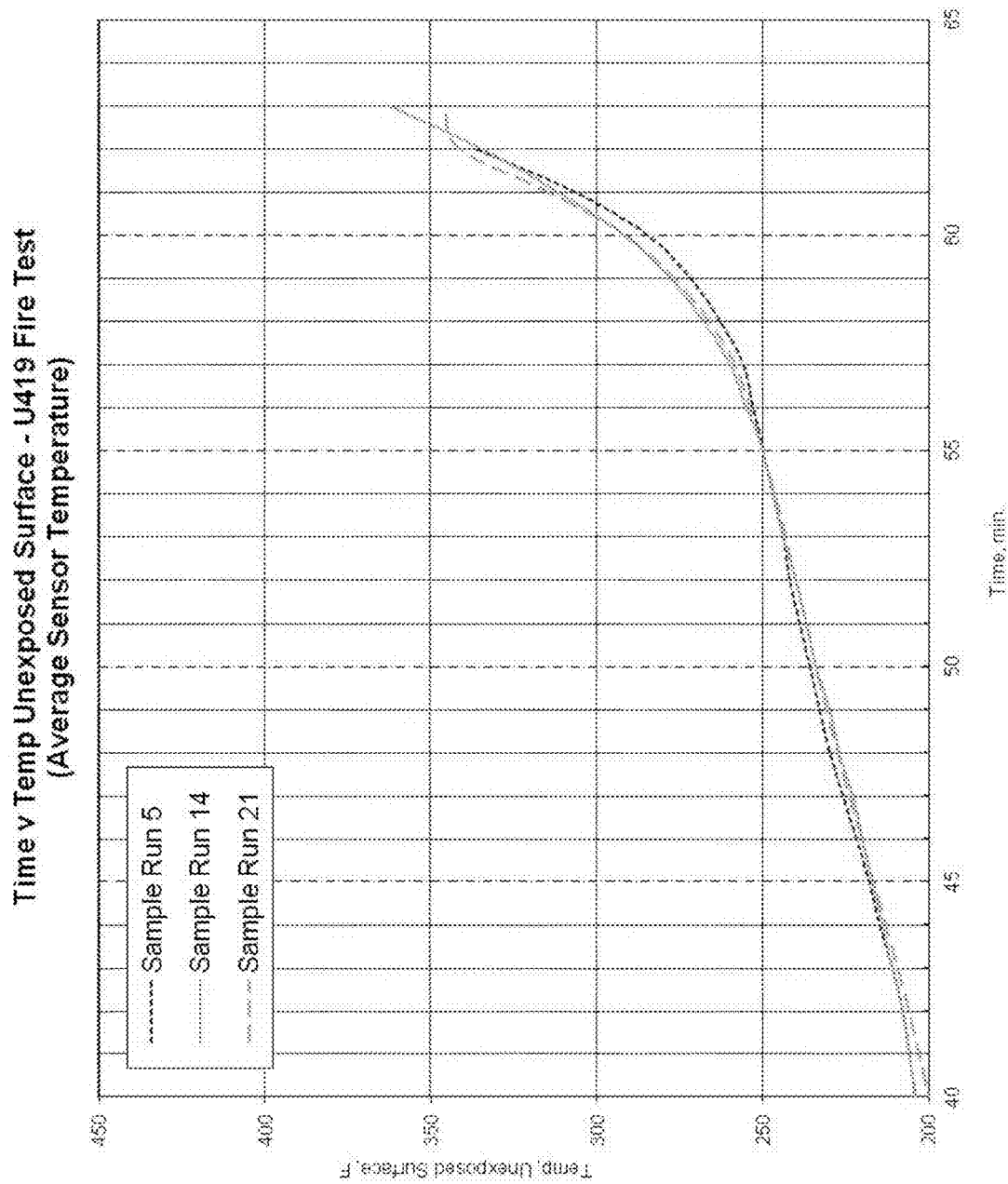
FIG. 14 is a plot of the data from FIG. 12 for the assemblies using the panels of Sample Runs 5, 14, and 21.

The temperatures measured for assemblies using panels from the sample runs of panels formed according to principles of the present disclosure continued to closely correspond to those of the commercial panels from about 55 minutes to over 60 minutes. FIGS. 13 and 14 show a plot of the data from FIGS. 9 and 10, respectively, for the assemblies using the exemplary panels formed according to principles of the present disclosure from Sample Runs 5, 14, and Sample 21 (the commercial Type X panel example). This data shows that panels formed according to principles of the present disclosure and assemblies made using them are capable of providing panels having a fire resistance comparable, if not better than, much heavier and denser commercial panels under the UL U419 fire test condition for at least about 60 minutes. Similar results are also obtained with panels produced from other combinations of constituent materials within the scope of the invention.

It also was noted that after about 50 minutes, the temperatures for the assemblies using panels from Sample Runs 6, 7 and 9 increased somewhat more rapidly than the assembles using panels from the other Sample Runs. As noted in Table VII in FIG. 25b, the panels from Sample Run 6 had the lowest weight and density, and the panels from Sample Runs 7 and 9 may have subject to over drying. Similarly, the temperatures for the assemblies using panels from Sample Runs 8 and 15 also increased somewhat more rapidly than the remaining assemblies. As also indicated in Table VII, the panels from Sample Runs 8 and 15 also may have been affected by over drying or impurities in the gypsum source. Without being bound by theory, it is believed that those manufacturing and materials conditions substantially contributed to the differences between temperature profiles from the assemblies using the panels and those from the assemblies using panels from the other Sample Runs.

Given those considerations, and the difficulty of the U419 test standards, the data from those tests show that panels formed according to principles of the present disclosure nevertheless provided surprisingly effective fire resistance given their weights and densities. Taken together, the data from the assemblies using panels formed according to principles of the present disclosure further show that methods and panels of the present disclosure can provide robust fire resistant assemblies that allow one of ordinary skill considerable flexibility to adjust the vermiculite and stucco content of the panels to compensate for significant variations manufacturing conditions and raw material quality.

Figure 15:
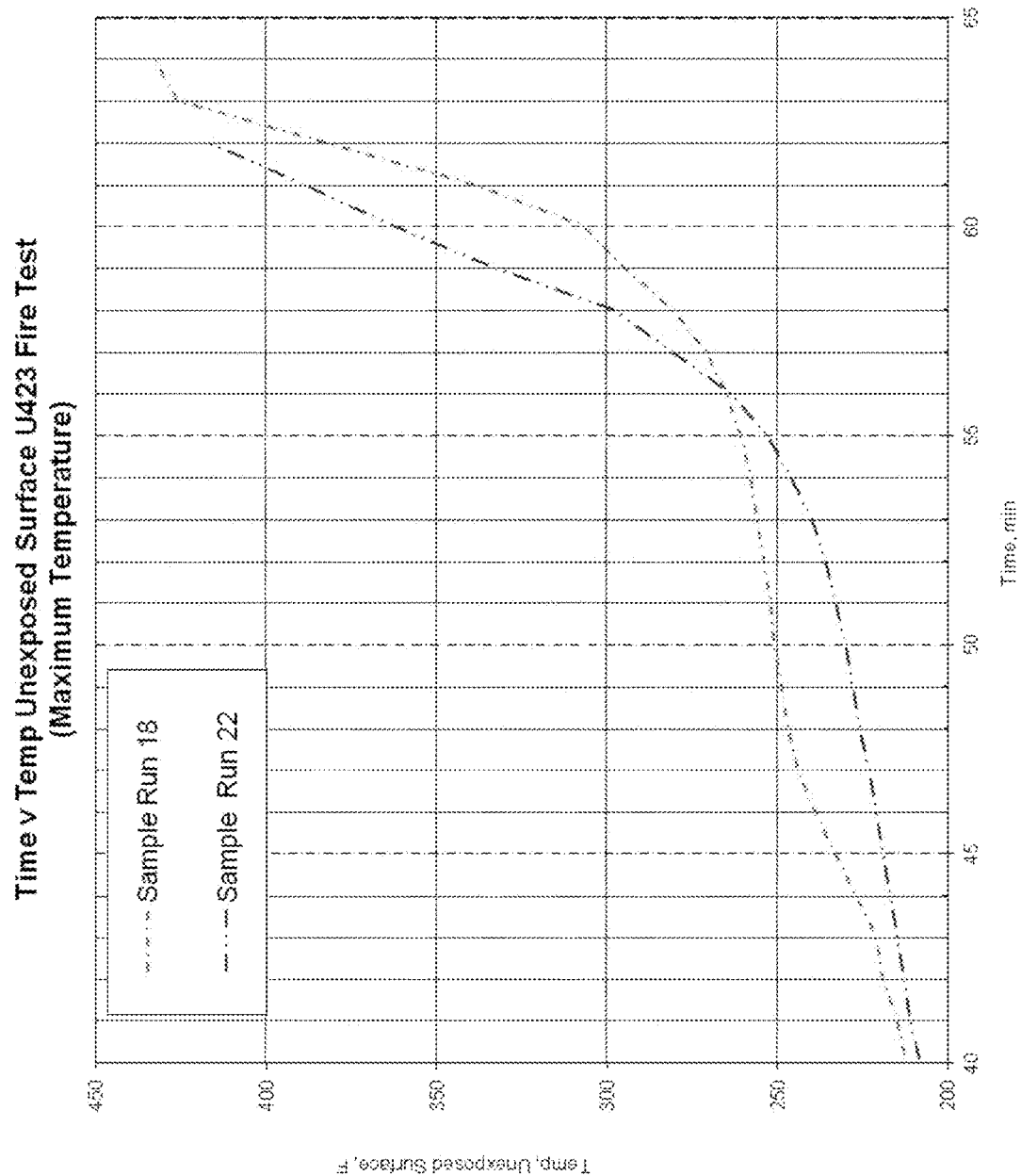
FIG. 15 is an expanded plot of the maximum single sensor temperatures at the unexposed surface of each of the assemblies using the panels of Sample Runs 18 and 22 that were subjected to fire testing under the conditions of UL U423 (as discussed below), from 40 minutes to 65 minutes elapsed time.
Figure 16:
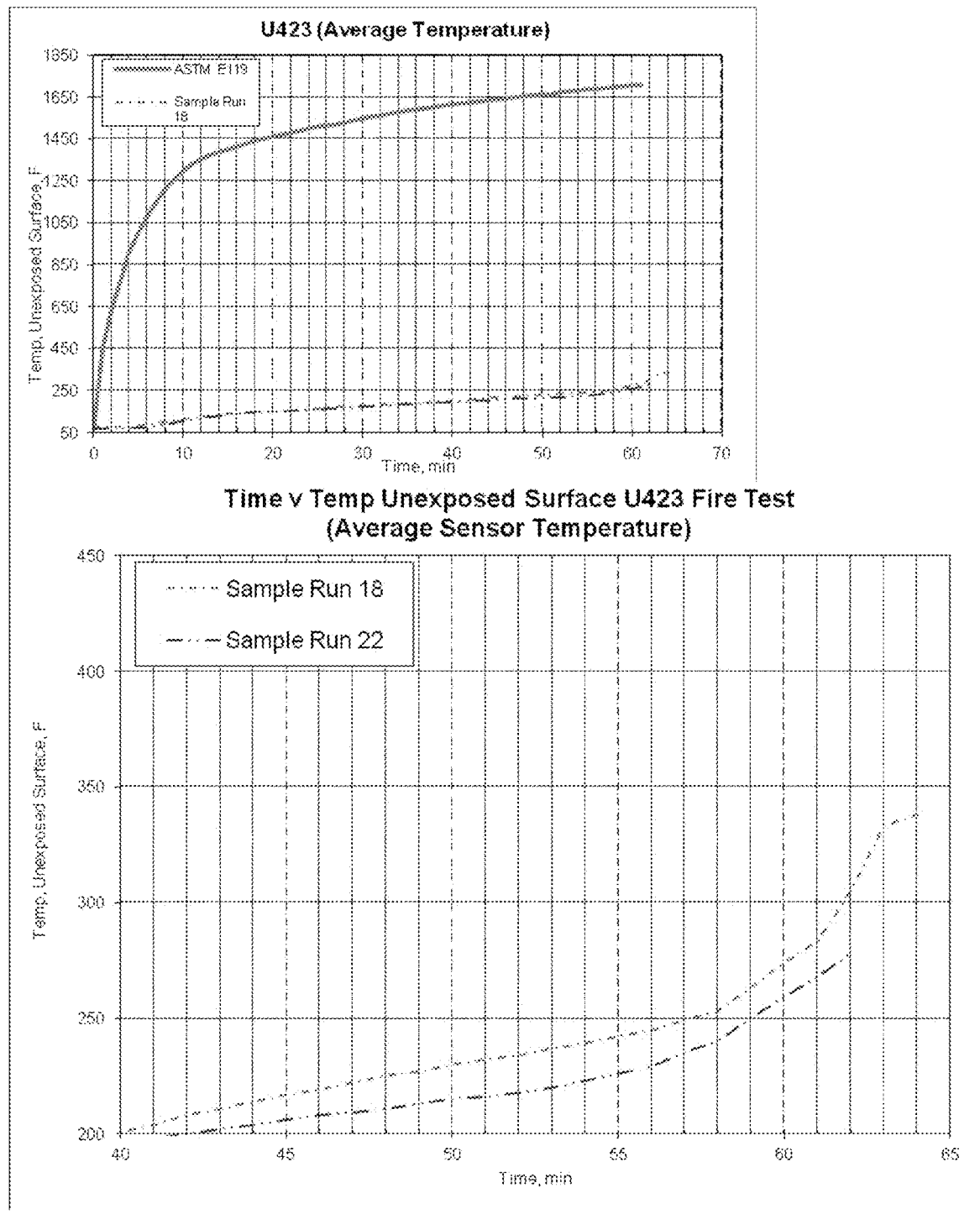
FIG. 16 is an expanded plot of the average sensor temperatures at the unexposed surface of each of the assemblies using the panels of Sample Runs 18 and 22 from the UL U423 fire tests that are to be subject of FIG. 15, from 40 minutes 65 minutes elapsed time.
Figure 17:
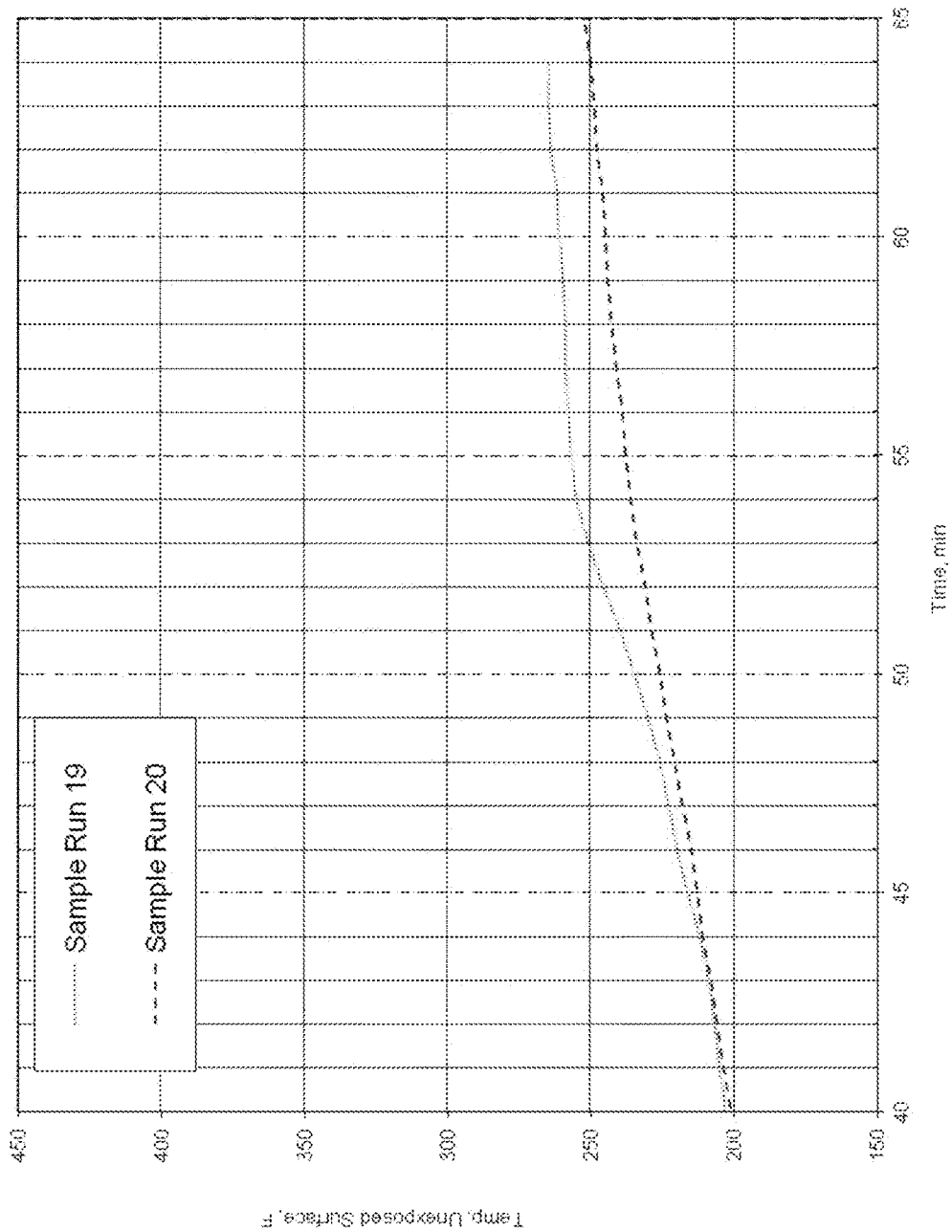
FIG. 17 is an expanded plot of the maximum single sensor temperatures at the unexposed surface of assemblies using panels from Sample Runs 19 and 20 that were subjected to fire testing under the conditions of UL U305 (as discussed below), tests from 40 minutes to 65 minutes elapsed time.
Figure 18:
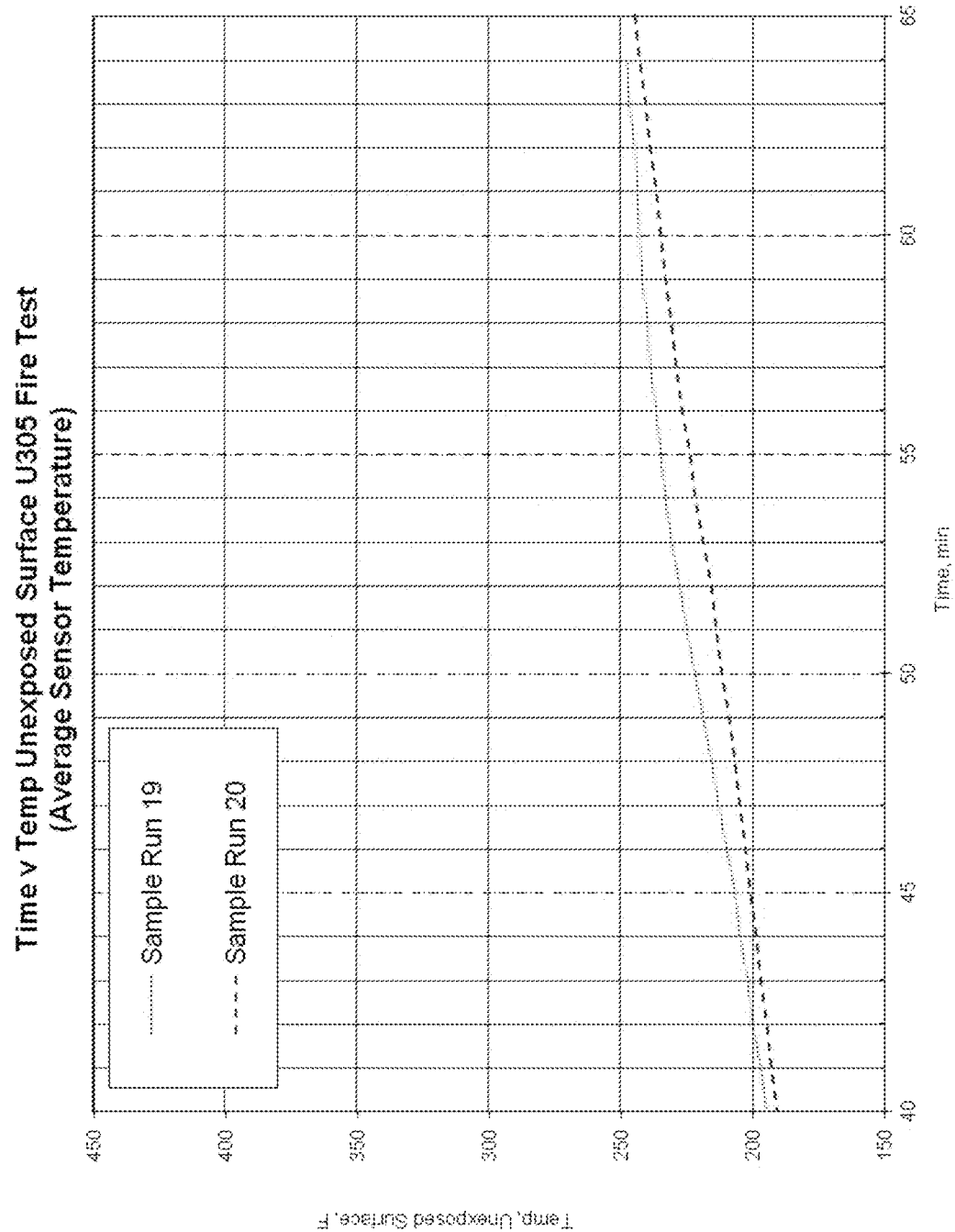
FIG. 18 is an expanded plot of the average sensor temperature at the unexposed surface of each of the assemblies using the panels of Sample Runs 19 and 20 from the UL U305 tests that are the subject of FIG. 17, from 40 minutes to 60 minutes elapsed time.

FIGS. 15 and 16 are plots of the maximum single sensor and the average of the sensor temperatures on the unexposed surface of each of the assemblies in the U423 fire tests of assemblies using panels from Sample Runs 18 and 22. FIGS. 15 and 16 show an expanded plot of the data from 40 minutes elapsed time to 65 minutes elapsed time (all tests terminated before 65 minutes). This data plot more shows in greater detail the comparable heat resistance of the assemblies using panels formed according to principles of the present disclosure and the much heavier and denser commercial glass-mat faced gypsum panels (Sample Run 22), even though the glass cover sheets of the panels would be expected to provide additional fire resistance in this test. This data, particularly the data after 50 minutes elapsed time, confirms that panels formed according to principles of the present disclosure, and assemblies using them, are capable of providing fire resistance comparable to (and in some instances potentially better than) much heavier and denser commercial panels under the U423 fire test conditions.

The data set forth in Table XI in FIGS. 29a-c provide the maximum temperatures reached by any one sensor and the average of all of the sensors on the unexposed surface of the assembly at the elapsed time of 50, 55 and 60 minutes. Table XI also reports the maximum temperature reached by any one sensor and the average of all of the sensors on the unexposed surface of the assembly at the termination of the test. In the tests of Sample Runs 6, 7 and 9, the test was terminated at 58 minutes (samples 6 and 7) or 59 minutes (Sample Run 9), and thus the maximum single sensor and average sensor temperatures, at termination are the same.

For the U419 tests, a maximum single sensor temperature of less than about 260° F. on the unexposed surface of the assembly and/or an average sensor temperature of less than about 250° F. at such unexposed surface at about 50 minutes elapsed time was considered one indication of a successful test and an indication that the tested gypsum panel core formulation and manufacturing process, and assemblies using panels formed according to principles of the present disclosure are capable of satisfying or exceeding the requirements for a "one hour" fire rating under the appropriate UL test procedures. Similarly, a maximum single sensor temperature of less than about 410° F. on the unexposed surface of the assembly at about 55 minutes and/or an average sensor temperature of less than about 320° F. at such unexposed surface at about 55 minutes in the U419 was a further indication of that panels and methods of the present disclosure could be used to provide a fire resistant assembly suitable for use in fire rated applications. This was confirmed by the results showing temperatures less than 300° F. on the unexposed surface of the assembly at about 55 minutes and/or an average sensor temperature of less than about 280° F. at such unexposed surface at about 55 minutes for many of the assemblies under the U419 test conditions.

The fact that the assemblies using panels formed according to principles of the present disclosure demonstrated a maximum single sensor temperature at about 60 minutes elapsed time of less than about 500° F. on the unexposed surface of the assembly and/or an average sensor temperature of less than about 380° F. at such unexposed surface also demonstrated the surprising fire resistance of panels formed according to principles of the present disclosure and assemblies using them under the standards of U419, given the panels reduced weight and density. That many of the assemblies experienced a maximum single sensor temperature at about 60 minutes elapsed time of less than about 415° F. on the unexposed surface of the assembly and/or an average sensor temperature of less than about 320° F. at such unexposed surface demonstrated that panels formed according to principles of the present disclosure and assemblies using them under the U419 test standards could qualify for a 60 minute fire rating under those standards.

Regardless of the specific maximum and average sensor temperatures at 50, 55 and 60 minutes, the results of assemblies using panels from Sample Runs 1 to 17 further were surprising when compared to the commercial Type X and glass faced gypsum panels of Sample Runs 21 and 22. Given the very significant differences in weight and density between Sample Runs 1 to 17 and the much heavier and denser commercial samples, it would have been expected to see much greater differences in the maximum sensor temperatures and average of the sensor temperatures at each of the 50, 55 and 60 minute periods of elapsed time. The average sensor temperatures for the unexposed surface of the panels from most of the Sample Runs 1 to 17 also do not reflect the considerably lower weight and density of those panels relative to the commercial panels of Sample Runs 21 and 22.

As also reflected in Table XI in FIGS. 29a-c, the maximum single sensor and average sensor temperatures on the unexposed side of the assemblies using panels from Sample Runs 18, 19 and 20 were very similar, and in some instances better than the commercial fire rated board in the assemblies tested under the procedures of U423 and U305, both of which use wood studs and impose weight loading on the assemblies. For example, the panels from Sample Run 18 proved an assembly with unexposed side temperatures that were very similar at 50, 55 and 60 minutes to those for the commercial fire rated panel Sample 22 in assemblies using 0.032 inch steel studs tested under the U423 procedures. For the assembly using panels formed according to principles of the present disclosure from Sample Run 18 in those tests, the maximum single sensor temperatures were less than about 255° F., 270° F. and 380° F., at about 50, 55 and 60 minutes elapsed times respectively. The average sensor temperatures were less than about 220° F., 235° F. and 250° F., at about 50, 55 and 60 minutes elapsed times respectively. The exemplary panels formed according to principles of the present disclosure from Sample Run 18, in fact, surprisingly evidenced a comparable single sensor temperature at 60 minutes to commercial Sample Run 22, a much heavier and denser gypsum panel with fiberglass cover sheets. This result is particularly notable as the fiberglass cover sheets on the panels of Sample Run 22 are believed to improve the fire resistance of the panels relative to the same panels with paper cover sheets.

Similarly, the panels from Sample Runs 19 and 20 tested in assemblies using wooden studs under the procedures of U305 demonstrated maximum single sensor temperatures less than about 250° F., 260° F. and 265° F., at about 50, 55 and 60 minutes elapsed times respectively. The average sensor temperatures in those assemblies were less than about 230° F., 240° F. and 245° F., at about 50, 55 and 60 minutes elapsed times respectively.

Moreover, under the commonly-accepted UL standards, the data in Table XI in FIGS. 29a-c indicates that reduced weight and reduced density gypsum panels formed according to principles of the present disclosure were capable of meeting or exceeding the standards required for approval as a commercial "one hour" fire rated gypsum panel under the U419 procedures. For example, the fire test of the assembly using panels formed according to principles of the present disclosure from Sample Run 17 reported in Table XI, among others of the assemblies using panels of the present disclosure, would qualify under the commercial "one hour" fire rated panel standards of U419 specifications. The assembly made pursuant to U419 using panels from Sample Run 17 evidenced a single sensor maximum temperature on the unexposed side of less than the ambient temperature at the start of the test plus 325° F. and an average sensor temperature of less than the ambient temperature plus 250° F. In that fire test, the single sensor maximum was below the required temperature until 60 minutes 18 seconds had elapsed, and the average sensor temperature was below its limit until 60 minutes 8 seconds had elapsed. Consequently, this test confirmed that the formulation and procedures used to make the panels of Sample Run 17 could qualify as one hour fire rated panels under the U419 standards.

Similar results were observed for the example panels from Sample Runs 18, 19 and 20, which were tested under the U423 and U305 test procedures. The temperature limits used for the sensors on the unexposed surfaces of those assemblies were calculated in the same manner (single sensor maximum of ambient temperature plus 325° F. and an average sensor temperature of less than the ambient temperature plus 250° F.). For Sample Run 18, the single sensor temperature limit and the average sensor limit was reached at about 62 minutes, 27 seconds and 62 minutes, 35 seconds respectively. For Samples Runs 19 and 20, the tests were terminated before either limit was reached at over 63 minutes, 40 seconds for Sample Run 19, and over 64 minutes, 35 seconds for Sample Run 20. This established that panels formed according to principles of the present disclosure would qualify as one hour fire rating under those tests.

The above data of Examples 4A to 4E thus demonstrate that reduced weight and density panels formed according to principles of the present disclosure, and assemblies using them, provide comparable structural integrity, heat sink and insulation properties (or the combination of the same) to much heavier and denser commercial panels, without the significantly greater gypsum content of those commercial panels. Furthermore, the fact that reduced weight and reduced density gypsum panels formed according to principles of the present disclosure demonstrated such structural integrity, heat sink and insulation properties in assemblies using light gauge steel studs (considered among those most likely to deform and be adversely affected by high temperatures) would not be foreseen by one of ordinary skill in the art. Similar results are also obtained with panels produced from other combinations of constituent materials within the scope of the invention.

One concern during the testing, in addition, was that the panels from Sample Runs 1, 6 to 10 and 15 were subject to issues during manufacturing that might affect their resistance to high temperatures in the assemblies subject to fire testing. Such issues were potential core stucco hydration problems (Sample Run 1), potential over drying (Sample Runs 7 to 10) and greater levels of impurities in the gypsum source (Sample Runs 8 and 15). The results of the fire tests indicate that such manufacturing issues may have affected some of the exemplary panels formed according to principles of the present disclosure (e.g., Sample Runs 6, 7, 9, and 15). The results also demonstrate that such issues may be overcome and/or compensated for by core formulation and methods for making panels following principles of the present disclosure. Furthermore, the tests results confirm that any necessary adjustments to the fire performance of reduced weight and density panels of the present disclosure can be made by adjusting the relative amounts of high expansion vermiculite and gypsum to achieve the desire fire performance.

Example 5

In this Example, the panel specimens from Sample Runs 1 to 20 were subjected to a nail pull resistance testing to determine the panels' strength properties under this commonly used criterion. The nail pull resistance test is a measure of a combination of the strengths of a gypsum panel's core, its cover sheets, and the bond between the cover sheets and the gypsum. The test measures the maximum force required to pull a nail with a head through the panel until major cracking of the board occurs. In the tests of this Example, the nail pull resistance tests were carried out in accordance with Method B of ASTM C473-95.

In brief summary, the tested specimens were conditioned at about 70° F. and about 50% relative humidity for 24 hours prior to testing. A 7/64th inch drill bit was used to drill pilot holes through the thickness of the specimens. The specimens then were placed on a specimen-support plate with a 3 inch diameter hole in the center, which was perpendicular to the travel of the test nail. The pilot hole was aligned with the nail shank tip. Load was applied at the strain-rate of 1 inch per minute until maximum load was achieved. At about 90% of the peak load after passing the peak load, the testing was stopped and the peak load is recorded as nail pull resistance.

The nail pull resistance results are summarized in Table XII in FIG. 30 for Sample Runs 1 to 20. As indicated in Table XII, four additional samples, Sample Runs 23 to 26, also were subject to nail pull resistance testing. Sample Runs 23 to 25 were examples of reduced weight, reduced density gypsum panels following principles of the present disclosure and made in accordance with the formulation of Table I in FIG. 19 and Sample Runs 1 to 20 of Table VII in FIGS. 25a-b, with the variations in weight and density as indicated in Table XII in FIG. 30. Sample Run 26 was a commercially available ⅝ inch thick commercial "one hour" rated SHEETROCK® brand FIRECODE® Type X gypsum panel with a weight of about 2250 lb/msf and density of about 43 pcf.

The average nail pull resistance values for the exemplary reduced weight, reduced density panels formed according to principles of the present disclosure ranged from about 73 lb-f to over about 107 lb-f. This indicates that, notwithstanding the reduced density and use of high expansion vermiculite in panels formed according to principles of the present disclosure, panels of the present disclosure can achieve minimum nail pull resistance value comparable to much heavier and denser fire rated gypsum panels. It also indicated that the panels formed according to principles of the present disclosure can achieve nail pull resistance values satisfactory for commercial purposes, which for ⅝ inch gypsum panels with paper cover sheets is approximately 96 lb-f. Similar results are also obtained with panels produced from other combinations of constituent materials within the scope of the invention.

Example 6

Exemplary panels formed according to principles of the present disclosure and made in accordance with Table I in FIG. 19 and the Sample Runs 17-19 of Table VII in FIGS. 25a-b were subjected to flexural strength testing to determine the panels' strength properties under this commonly used criterion. The flexural strength test generally can include a procedure for evaluating the ability of gypsum panel products to withstand flexural stresses during handling or use of the material. This test method evaluates the flexural properties of gypsum panel products by supporting the specimen near the ends and applying a transverse load midway between the supports. In particular, flexural strength testing was performed on specimen panels from Sample Runs 17, 18, and 19 in accordance with Method B of ASTM C473-95.

In brief summary, the tested specimens were conditioned at about 70° F. and about 50% relative humidity for 24 hours prior to testing. Four sample pieces, each 12 in. (305 mm) by approximately 16 in. (406 mm), are cut from each gypsum panel specimen, two having the 16-in. dimension parallel to the edge and two having the 16-in. dimension perpendicular to the edge. An apparatus with parallel specimen supports spaced 14 in. (357 mm) on centers, measured at the points of surface contact with the specimen, and attached to a plate that is rigidly attached to the test apparatus is used to support each specimen centrally on the fixed parallel supports. A load is applied on a similar bearing midway between the supports. For specimens with the long dimension parallel to the edge, test one specimen from each gypsum panel product face up and the other face down. For specimens with the long dimension perpendicular to the edge, test one specimen from each gypsum panel product face up and the other face down. Calculate and report the average breaking load in pounds-force (lb-f) or newtons (N) for each test condition. The test conditions are: (1) parallel, face up; (2) parallel, face down; (3) perpendicular, face up; and, (4) perpendicular, face down.

The flexural strength testing results are summarized in Table XIII in FIG. 31 for specimens from Sample Runs 17, 18, and 19. As indicated in Table XIII, gypsum panels formed in accordance with principles of the present disclosure meet or exceed the flexural strength standards set forth in ASTM C 1396/C 1396M-06 specification for ⅝" thick gypsum panels (i.e., 147 lb-f (654 N) with bearing edges perpendicular to the panel length, and 46 lb-f (205 N) with bearing edges parallel to the panel length).

Example 7

Exemplary panels formed according to principles of the present disclosure and made in accordance with Table I in FIG. 19 and the Sample Runs 17, 18, and 19 of Table VII in FIGS. 25a-b were subjected to core, end, and edge hardness testing to determine the panels' strength properties under these commonly used criteria. The hardness tests generally can include a procedure for evaluating the ability of the gypsum panel product core, ends, and edges to resist crushing during handling or use of the material. This test method evaluates the hardness of gypsum panel products by determining the force required to push a steel punch into the area of test. In particular, core, end, and edge hardness testing was performed on specimen panels from Sample Runs 17, 18, and 19 in accordance with Method B of ASTM C473-95.

In brief summary, the tested specimens were conditioned at about 70° F. and about 50% relative humidity for 24 hours prior to testing. A sample piece for core hardness testing not less than 12 in. by 3 in. (305 mm by 76 mm) was cut from the center of each gypsum panel specimen. A sample piece for end hardness testing not less than 12 in. by 3 in. (305 mm by 76 mm) was cut from one mill-cut end of each gypsum panel specimen. The 12-in. (305-mm) dimension for the core hardness and end hardness samples is perpendicular to the edges of the gypsum panel specimen. A sample piece for edge hardness testing not less than 12 in. by 3 in. (305 mm by 76 mm) was cut from both edges of each gypsum panel specimen. The 12-in. (305-mm) dimension of the edge hardness samples is parallel to the edges of the gypsum panel specimen.

A means of securing the sample to the base of the test apparatus is provided so that the face of the sample is perpendicular to the base of the test apparatus and parallel to the movement of the steel punch. The steel punch is positioned so that its center axis is parallel with the line of travel. The sample is secured in a fixed vertical position on its 12-in. (305-mm) dimension edge. Three tests, spaced approximately 4 in. (102 mm) apart, are conducted on each sample, with the first test area 2±½ in. (51±13 mm) from one edge of the sample. The steel punch is positioned over the test area and the load is applied. The core, end, or edge hardness measurement is reported as the load in pounds-force (lb-f) or newtons (N) required to push the steel punch a distance of ½ in. (13 mm) into the core of the sample. The core, end, and edge hardness of the specimen is reported as the average of the three sample measurements.

The core, end, and edge hardness testing results are summarized in Table XIV in FIGS. 32a-c for specimens from Sample Runs 17, 18, and 19. As indicated in Table XIV, gypsum panels formed following principles of the present disclosure meet or exceed the core, end, and edge hardness standards set forth in ASTM C 1396/C 1396M-06 specification for gypsum panels (i.e., 11 lb-f (49 N)).

Example 8

Exemplary panels formed according to principles of the present disclosure and made in accordance with Table I in FIG. 19 and the Sample Runs 17-19 of Table VII in FIGS. 25a-b were tested for sound transmission and a sound transmission class value ("STC"). Panels from Sample Runs 17, 18, and 19 were tested on two basic wall assemblies prepared in accordance with the UL test procedures U305 and U419. The U305 type assembly was made from approximately 2×4 inch wooden studs, spaced about 16 inches off center. The U419 type assemblies were made from approximately 3⅝ inch, 25-gauge (about 0.015 inch thick) steel studs, arranged 24 inches off center. Both types of studs were arranged in an 8'×8' frame.

All assemblies consisted of a single layer of wallboard on each face of the assembly. The assemblies, in addition, were tested with and without about 3½" of fiberglass insulation in the wall cavities. The exemplary reduced weight, reduced density gypsum panels formed according to principles of the present disclosure had an average weight of about 1900 lb/msf, and a core density of about 36 pcf.

The panel assemblies and the results of the sound transmission test, including STC values determined according to ASTM E90/Specification ASTM E413 are summarized in Table XV in FIG. 33. The assemblies made from steel studs and using panels formed according to principles of the present disclosure demonstrated STC values about 1-2 points lower than typically found with corresponding steel stud assemblies constructed with the commercial, greater density Type X panels. On wood frames, however, the assemblies using panels formed according to principles of the present disclosure obtained STC values very similar to typical values for comparable assemblies using the commercial, Type X panels. It is generally understood that any STC difference less than 3 points is not discernable by the untrained human ear, and thus the 1- to 2-point overall differences between the STC values of the examples of the panels formed according to principles of the present disclosure and commercial Type X panels should not be noticeable to most listeners. As demonstrated by these tests, the examples of the reduced weight, reduced density gypsum of the panels surprisingly have sound transmission characteristics very similar to much heavier and denser gypsum panels, in addition to their other benefits discussed herein. Similar results are also obtained with panels produced from other combinations of constituent materials within the scope of the invention.

Example 9

Test cubes were made from the gypsum panel formulations of Table XVI in FIGS. 34a-b to examine the effect of adding siloxane to the slurry used to make gypsum panels following principles of the present disclosure.

A high sheer mixer running at about 7500 RPM for 2.5 minutes was used to make the siloxane emulsion. The siloxane emulsion was mixed with stucco and additives to make a slurry with 10 seconds soaking plus 10 seconds mixing at high speed of a Waring blender. The slurry was cast into 2"×2"×2" cubes and dried at 115° F. overnight. Densities were adjusted by varying the water/stucco ratio. Water absorption test method ASTM C1396 was conducted placing dry cubes in 70° F. water for 2 hours and determining the weight gain percentage.

The test results are set forth in the final line of Table XVI. This data shows that water absorption below about 5% was achieved with siloxane usage of about 8 to about 12 lb/MSF and about 2.15% pregelatinized starch at cube densities as low as about 30 lb/ft$^3$. This example therefore establishes that the presence of greater than about 2% pregelatinized starch works in conjunction with the siloxane to achieve unexpected, enhanced water resistance.

Example 10

The effects that changes in the amount of vermiculite have on thermal properties including High Temperature Shrinkage, High Temperature Thickness Expansion, and thermal insulation characteristics of high expansion vermiculite used in panels and methods according to principles of the present disclosure were evaluated under substantially identical heating conditions. In this study, laboratory samples were prepared using 1000 grams of stucco, 11 grams of heat-resistant accelerator, 15 grams of pregelatinized starch, 6 grams of glass fiber, and 2000 ml of water at 70° F. These lab samples were prepared using varying amounts and types of high expansion vermiculite according to the formulations set forth in Table XVII in FIG. 35.

The lab samples differ only in the type and amount of high expansion vermiculite used in preparing the samples. Palabora micron and superfine (Grades 0 and 1, respectively) are commercially available from South Africa. As shown in FIG. 19, these South African grades of vermiculite are comparable to Grade 4 vermiculite using the U.S. grading system. Palabora Grade 0 has a particle size distribution that corresponds substantially to commercially-available grade 4 vermiculite in the U.S. grading system. Palabora Grade 1 has a particle size distribution which includes a greater portion of larger particles but that overlaps with grade 4 vermiculite samples using the U.S. grading system.

The lab samples were evaluated using the High Temperature Shrinkage testing protocol described in ASTM Pub. WK25392 and discussed in Example 4B. ASTM Pub. WK25392 and the prior discussion thereof are incorporated herein. The data from this testing is reported in Table XVII in FIG. 35. For each sample run, six test specimens were evaluated using the High Temperature Shrinkage and High Temperature Thickness Expansion (z-direction) testing described in ASTM Pub. WK25392. An average of the results of the six test specimens is found in Table XVII. The testing demonstrates that the ratio (TEIS) of High Temperature Thickness Expansion (z-direction) to High Temperature Shrinkage generally increases with increasing amounts of high expansion vermiculite. This performance change lessened or decreased once the vermiculite usage reached about 10% by weight of stucco. These results are consistent between the two different types of high expansion vermiculite used.

The lab samples were also evaluated using the High Temperature Thermal Insulation Index testing protocol described in ASTM Pub. WK25392 and discussed in Example 4D. ASTM Pub. WK25392 and the prior discussion thereof are incorporated herein. The data from this testing is reported in Table XVIII in FIG. 36. For each sample run, two test specimens were evaluated using the High Temperature Thermal Insulation Index testing described in ASTM Pub. WK25392. An average of the results of the two test specimens is found in Table XVIII. The testing demonstrates that the high temperature Thermal Insulation Index of the lab samples increases somewhat with increasing amounts of high expansion vermiculite. This performance change lessened or decreased once the vermiculite usage reached about 10% by weight of stucco. These results are consistent between the two different types of high expansion vermiculite used.

Example 11

Laboratory studies were conducted concerning the effectiveness of one preferred HEHS additive, aluminum trihydrate (ATH), used in gypsum core formulations following principles of the present disclosure. The properties of the sample panels made using those formulations were evaluated in terms of High Temperature Thermal Insulation Index ("TI"), and High Temperature Shrinkage ("SH %") and High Temperature Thickness Expansion ("TE %"). In Examples 11A, 11B and 11C discussed below, core formulations were prepared using varying amounts of stucco, high-expansion vermiculite, ATH, heat-resistant accelerator ("HRA"), pregelatinized starch, trimetaphosphate, glass fibers, naphthalenesulfonate dispersant, and water according to the formulations discussed in each Example for the core formulations Samples 1 to 20.

The amounts of each component are provided in "parts" by weight, which may be in pounds, grams or other units of measure. Where a value for a component in a core formulation is expressed as a percentage, this refers to the amount of the component relative to the stucco component as a percentage by weight. Where the amount of component is expressed in terms of pounds per thousand square feet (lb/msf), the reported value is an approximate, calculated equivalent to the amount by weight of the component in a thousand square feet of panel about ⅝ inch thick (approx. 0.625 inches, 15.9 mm), based on the amount by weight of the component in the formulation.

For each sample formulations, the dry ingredients were combined with the water in a Waring mixer to provide consistent, well-mixed gypsum slurry. Then, two approximately 12 inch by 12 inch (30.5 cm by 30.5 cm) panels, about ⅝ inch thick (approx. 0.625 inches, 15.9 mm), were formed with each sample formulations. To form the panels, the slurries from each sample formulation were hand cast between an upper paper of about 48 pound per msf and a lower layer paper of about 42 pound per msf.

Each of the cast panels was allowed to set until hydration of the stucco was substantially completed and then was dried at about 350° F. (about 177° C.) for about 20 minutes and about 110° F. (about 40° C.) for about 48 hours. The water content of the formulation was used to provide the indicated weight and density of the set, dried hand cast samples. Foam was not added to the sample formulations. The approximate values for the following are reported in FIGS. 38, 40, and 41, Tables XXa to XXIIb, for the panels formed from formulations Samples 1 to 20: panel density (pounds per cubic foot), high expansion vermiculite %, the approximate stucco weight in lb/msf, approximate ATH %, and the approximate weight of ATH in lb/msf.

From each panel, ten four-inch disks were cut. Two sets (four disks of the ten disks) were used for the High Temperature Thermal Insulation Index tests. The remaining six disks were used for the High Temperature Shrinkage and High Temperature Thickness Expansion tests. The High Temperature Thermal Insulation Index results are the average of two readings (i.e. the average of the readings from each of the two sets). The reported High Temperature Shrinkage and High Temperature Thickness Expansion percentages are an average of six readings (i.e. the average of the readings from six disks). The High Temperature Thermal Insulation Index testing (reported in minutes, as mentioned above) was conducted using the protocol described in ASTM Pub. WK25392 and discussed in Example 4D. High Temperature Shrinkage and High Temperature Thickness Expansion testing (reported in % change in dimensions, as mentioned above) was done using the protocols described in ASTM Pub. WK25392 and discussed in Example 4B. The data from this testing is reported in the tables in FIGS. 38, 40, and 41 in terms of the average of the results from each set of tested disks (i.e. the average of the two sets of disks tested for TI and of the averages from the six disks tested for shrinkage and expansion).

The High Temperature Thermal Insulation Index ("TI") testing discussed in Examples 11A to 11C demonstrates that a given amount of ATH by weight is more efficient in increasing the High Temperature Thermal Insulation Index than an equivalent amount of stucco by weight. With or without the presence of high-expansion vermiculite, these test results show that generally about 40 to 50 lbs/msf of ATH can provide a similar thermal insulation protection as about 100 lbs/msf of stucco or more (this stucco amount may vary by stucco source and purity). This testing also demonstrates that ATH may be used with high expansion vermiculite without any significant adverse effect on High Temperature Shrinkage and High Temperature Thickness Expansion properties of the panels. The panels of Examples 11A to 11C generally continued to exhibit High Temperature Shrinkage values of about 10% or less and a ratio (TEIS) of High Temperature Thickness Expansion (z-direction) to High Temperature Shrinkage of about 0.2 or more. In some formulations, the data also indicates that the ATH additive improves the High Temperature Shrinkage and High Temperature Thickness Expansion properties of the panels. While these tests were conducted on laboratory-created samples, it is expected that comparable results would be achieved using full production formulations and process that include the addition of foam in the core formulation to produce air voids in the set gypsum core of the dried panels.

Example 11A

In this example, a stucco (stucco A) prepared from a synthetic gypsum source was used to prepare the core formulations for Samples 1 through 9. Gypsum panels produced with this synthetic gypsum stucco typically evidence greater high temperature shrinkage relative to panels formed from high purity, natural gypsum. The base core formulation was made using the following approximate amounts by weight: 600 parts (Samples 1 to 8) or 579 parts (Sample 9) stucco A; 6 parts HRA; 4.2 parts pregelatinized starch; 0.84 parts trimetaphosphate; 0 parts (Sample 1) or 42 parts (Samples 2 to 9) high expansion vermiculite (0% or 7% by weight of the stucco, respectively); 3 parts glass fibers; 0.8 parts naphthalenesulfonate dispersant; 0 parts (Sample 1), 12 parts (Sample 4), 21.1 parts (Samples 2, 5 and 9), 30 parts (Sample 6), 42.2 parts (Sample 7), and 60 parts (Sample 8) ATH (2%, 4%, 5%, 7% and 10% by weight stucco, respectively); and 1290 parts water.

Each of the core formulations Samples 1 through 9 were cast into panels and tested for High Temperature Thermal Insulation Index, High Temperature Shrinkage, and High Temperature Thickness Expansion as mentioned above. The cast and dried panels from each of the sample formulations had the approximate values for density, high expansion vermiculite content, stucco, ATH, and TI reported in Tables XXa and XXb, FIGS. 38A and 38B, respectively. Table XXa also reports the difference between core formulations having no ATH (Sample 1), and having 4% ATH with a reduced stucco content (Sample 2), both without high expansion vermiculite. Table XXb similarly reports the difference between a core formulation having no ATH (Sample 3), and the TI values for the core formulations having increasing amounts of ATH with decreasing amounts of stucco (Samples 4 to 9), all of which contained 7% high expansion vermiculite. Table XXc, FIG. 38C, reports the approximate density, high expansion vermiculite %, ATH %, the High Temperature Shrinkage results, and the High Temperature Thickness Expansion results for the panels made from each of the core formulations Samples 1 to 9.

Table XXa shows that ATH can be added in an amount (here 4% by weight of stucco) that is effective to increase the TI of the panels by about one minute, notwithstanding a stucco reduction of about 20 pounds/msf. This benefit was achieved without the use of high expansion vermiculite. Table XXb shows the effect of core formulations, Samples 3 to 9, with increasing amounts of ATH relative to the stucco content, from 0% to as high as 10%, in conjunction with the use of high expansion vermiculite at 7% by weight of the stucco.

Figure 39:
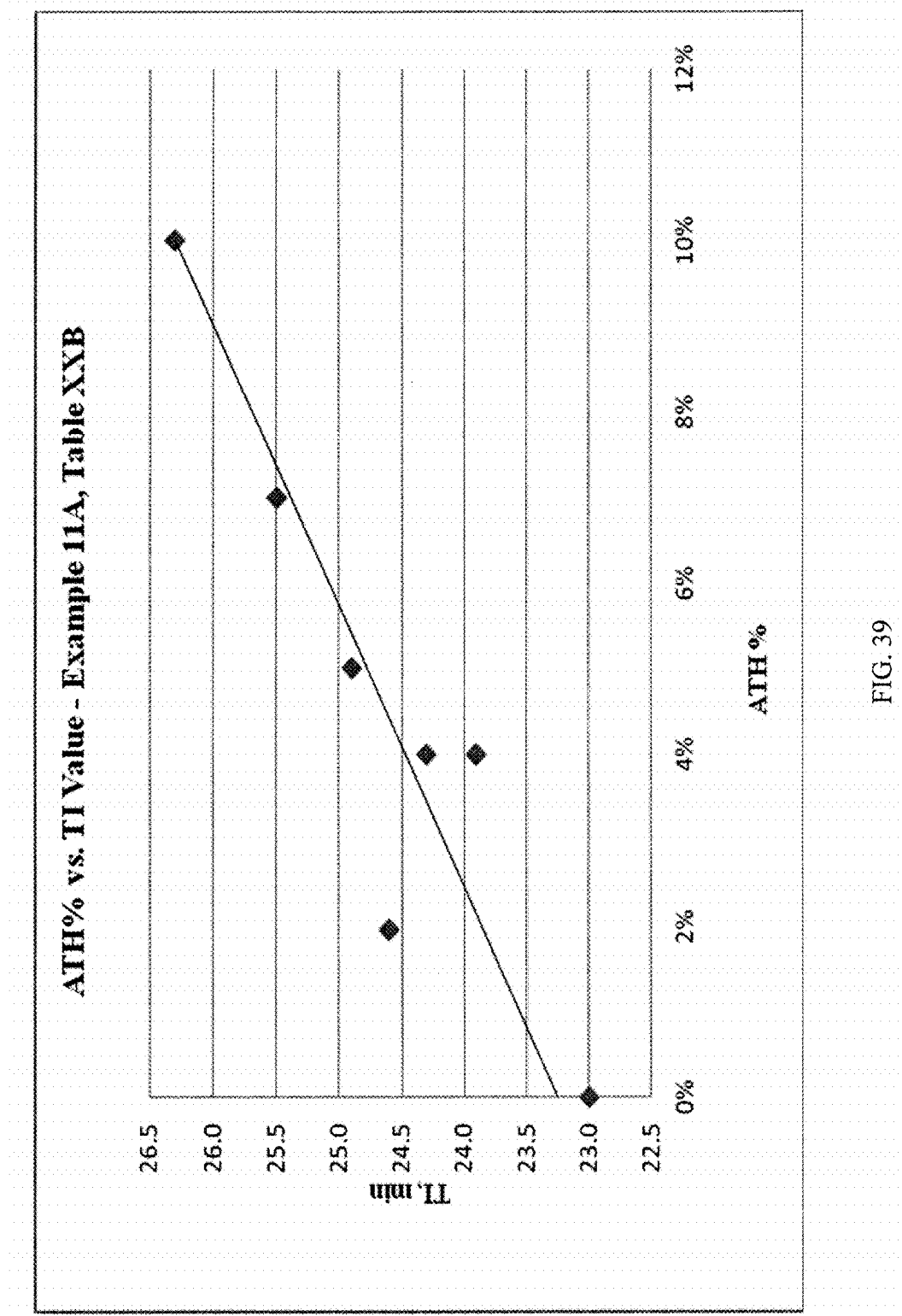
FIG. 39 is a plot of the amount of ATH as a percentage weight by weight of the stucco versus the High Temperature Insulation Index taken from testing data in Table XXb of FIG. 38a for Exhibit 11A, Samples 3-9.

The Sample formulations 3 to 9 provided an increase in TI from about 23 to about 26 minutes. The effect of the addition of ATH in these formulations is further summarized in FIG. 39, which plots ATH % versus the TI in minutes of the panels made with Sample formulations 3 to 9. As shown in FIG. 39 and Table XXb, with up to about 5% ATH, the TI of Sample formulations 3 to 6 increased by as much as about two minutes, notwithstanding a reduction of the amount of stucco in the core formulation of about 25 lb/msf in Samples 5 and 6. Similarly, the TI increased as much as about 3.3 minutes in Sample formulation 8, with 10% ATH and a reduction about 15 lbs/msf of stucco. The test results from each of the sets of Samples with the same approximate stucco content—Samples 5 and 6, and 7 and 8—also show that increasing the amount of ATH provides an increase in TI values.

The formulations Samples 3 to 9 with ATH also show improvements in High Temperature Shrinkage and High Temperature Thickness Expansion results. Formulation Sample 1 without ATH and without high expansion vermiculite had High Temperature Shrinkage of about 19% and a High Temperature Thickness Expansion of about −24%. With the addition of 4% ATH in Sample 2, the High Temperature Shrinkage improved to about 9%, and the High Temperature Thickness Expansion improved to about −11.5%. The addition of about 7% high expansion vermiculate to Samples 3 to 9 show a further improvement in High Temperature Shrinkage to about 5% and in High Temperature Thickness Expansion to about 18%, notwithstanding a significant stucco reduction (e.g. Sample 8).

Furthermore, the formulation of Sample 9 shows that it is possible to achieve a desired TI at or above 23 minutes, while reducing the formulation's stucco content by at least about 75 lb/msf, using about 4% ATH and about 7% high expansion vermiculite. The formulation Sample 9 also shows that a core formulation with such a reduced stucco content can improve High Temperature Shrinkage properties by reducing the shrinkage percentage at least about 12% and High Temperature Thickness Expansion properties by increasing the expansion percentage by about 30% or more. A comparison of the panels made with the formulation Samples 3 and 9, and Samples 4 and 5 shows that ATH may be substituted for stucco at a ratio of about 1 one part ATH to at least about 1.7 to about 2 parts stucco, while maintaining similar TI properties. The substitution ratios may vary considerably depending on the source of the stucco and the core formulations. Moreover, for a given stucco formulation, the substitution ratios may be increased if a reduction in TI is desired or decreased if greater TI properties are desired.

Example 11B

In this example, a stucco (stucco B) prepared from relative high purity natural gypsum source (at least about 90% gypsum) was used to prepare the core formulations for Samples 10 through 17. The base core formulation was made using the following approximate amounts by weight: 1000 parts stucco B; 10 parts HRA; 7 parts pregelatinized starch; 1.4 parts trimetaphosphate; 70 parts high expansion vermiculite (about 7% by weight of stucco); 5 parts glass fibers; 1.4 parts naphthalenesulfonate dispersant; 0 parts (Sample 10), 17.6 parts (Sample 11), 35.2 parts (Sample 12 and 17), and 70.4 parts (Samples 13 to 16) ATH (2%, 4%, and 7% by weight of the stucco, respectively); and 1800 parts (Samples 10 to 14), 1900 parts (Sample 15) and 2150 parts (Samples 16 and 17) water.

Each of the core formulations Samples 10 through 17 were cast into panels and tested for High Temperature Thermal Insulation Index, High Temperature Shrinkage, and High Temperature Thickness Expansion as mentioned above. The cast and dried panels from each of the Sample formulations had the approximate values for density, high expansion vermiculite content, stucco, ATH %, TI reported in FIGS. 40A and 40B, Tables XXIa and XXIb, respectively. Table XXIa reports the difference between a core formulation, made using stucco B, with no ATH (Sample 10), and the TI values for core formulations with increasing amounts of ATH and no change in the stucco content (Samples 11 to 14). Each of those formulations contained about 7% high expansion vermiculite. Table XXIb reports the differences in TI results between core formulations with about 7% (Samples 15 and 16) and about 4% (Sample 17) ATH. The equivalent of about 100 lb/msf stucco was removed from the formulations Samples 16 and 17, and all of those samples contained 7% high expansion vermiculite. Table XXIc, FIG. 40C, reports the density, high expansion vermiculite content, ATH % and the High Temperature Shrinkage and High Temperature Thickness Expansion results for the panels made from each of the core formulations Samples 10 to 17.

Table XXIa shows the benefit of adding an amount of ATH (here 2%, 4% and 7%) that is effective to result in a TI increase with a constant stucco content, here from about 0.1 to about 1.5 minutes. Table XXIb shows the effect of core formulation Samples 15 and 16 where the ATH % is held constant and 100 pounds of stucco is removed. This produced a TI reduction of 1.3 minutes, but with a TI in excess of about 24 minutes, both Samples 15 and 16 would be acceptable for fire rated applications. Sample 17 similarly shows that the ATH amount can be reduced to about 4%, and the stucco amount in the core formulation can be reduced the equivalent of about 100 lb/msf, while maintaining a TI of about 23 minutes. This also is considered acceptable for fire rated applications. The results in Table XXIb show that an effective amount of ATH can be used to maintain the TI at a predetermined level (e.g., about 23 minutes) while lowering the amount of stucco used in the formulation.

Table XXIc, FIG. 40C, shows the High Temperature Shrinkage and High Temperature Thickness Expansion results from the panels made with core formulations Samples 10 to 17. These results show that using stucco B and the formulations Samples 10 to 17, the High Temperature Shrinkage and High Temperature Thickness Expansion results are materially unchanged with the addition in ATH. This is true even of the formulae with a stucco reduction that is the equivalent of about 100 lb/msf (see Samples 16 and 17).

Example 11C

In this example, a stucco (stucco C) prepared from relative low purity natural gypsum source (approximately 80% gypsum, the remainder clays and other impurities) was used to prepare the core formulations for Samples 18 through 20. The base core formulation was made using the following approximate amounts by weight: 1000 parts (Samples 18 and 20) or 975 parts (Sample 19) stucco C; 10 parts HRA; 10 parts pregelatinized starch; 2 parts trimetaphosphate; 100 parts high expansion vermiculite (about 10% by weight of stucco); 5 parts glass fibers; 5 parts naphthalenesulfonate dispersant; 0 parts (Sample 18), and 25 parts (Samples 19 and 20) ATH (0% and 3% by weight of the stucco, respectively); and 1750 parts (Sample 18), 1725 parts (Sample 19), and 1700 parts (Sample 20) water.

Each of the core formulations Samples 18 through 20 were cast into panels and tested for High Temperature Thermal Insulation Index, High Temperature Shrinkage, and High Temperature Thickness Expansion as mentioned above. The cast and dried panels from each of the Sample formulations had the approximate values for density, high expansion vermiculite content, stucco, ATH, and TI reported in XXIIa and XXIIb, FIGS. 41A and 41B, respectively. Table XXIIa reports the difference between a core formulation, made using stucco C, with no ATH (Sample 18), and the TI values for the core formulations with about 3% ATH by weight of stucco, where the stucco C amount increased from the equivalent of about 1450 lb/msf (Sample 19) by to about 30 pounds to about 1480 lb/msf (Sample 20). Each of the formulations contained about 10% high expansion vermiculite by weight of stucco. Table XXIIb reports the density, high expansion vermiculite content, ATH % and the High Temperature Shrinkage and High Temperature Thickness Expansion results for the panels made from each of the core formulations Samples 18 to 20.

Table XXIIa shows the benefit of adding an amount of ATH (here about 3% by weight of the stucco) which is effective to increase the TI in panels made with those formulations by about one minute (compare Sample 18 to Samples 19 and 20). Table XXIIa also shows that the TI of the panels was not improved with addition of about 30 lb/msf of stucco C to the formulation (Sample 20), adding a significant amount of filler material (impurities) to the core. Table XXIIb shows that, in some formulations, the addition of about 3% ATH by weight of stucco preserve acceptable values for High Temperature Shrinkage (S), such as about 10% or less, and High Temperature Thickness Expansion, such as a positive expansion. In some instances, the addition of about 25 parts ATH by weigh to of stucco can improve the High Temperature Shrinkage (compare Sample 18 to Sample 19).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred aspects and embodiments of this invention are described herein, including the best mode known to the inventors for carrying out the invention. It should be understood that the illustrated embodiments are exemplary only, and should not be taken as limiting the scope of the invention.

What is claimed is:

1. A gypsum core disposed between cover sheets comprising:
   a crystalline matrix of set gypsum and high expansion particles, at least 50% of the high expansion particles having an average diameter greater than about 300 micrometers;
   the high expansion particles in an amount and distribution in the core effective to provide a High Temperature Shrinkage (S) in the X-Y direction of about 10% or less; and
   the gypsum core, when disposed between cover sheets in a panel, effective to provide the panel with a density (D) of about 40 pounds per cubic foot (640 kg/m$^3$) or less and a core hardness of at least about 11 pounds (50 N).

2. The gypsum core according to claim 1, wherein at least about 50% of the high expansion particles are greater than about 500 micrometers.

3. The gypsum core of claim 1, the high expansion particles in an amount and distribution in the core effective to provide a Thermal Insulation Index (TI) of about 20 minutes or greater.

4. A gypsum core disposed between cover sheets comprising:
- a crystalline matrix of set gypsum and high expansion particles, at least 50% of the high expansion particles having an average diameter greater than about 300 micrometers;
- the high expansion particles in an amount and distribution in the core effective to provide a ratio of High Temperature Thickness Expansion (TE) to S (TE/S) of about 0.2 or more; and
- the gypsum core, when disposed between cover sheets in a panel, effective to provide the panel with a density (D) of about 40 pounds per cubic foot (640 kg/m$^3$) or less and a core hardness of at least about 11 pounds (50 N).

5. The gypsum core according to claim 4, wherein at least about 50% of the high expansion particles are greater than about 500 micrometers.

6. The gypsum core according to claim 5, wherein the ratio of High Temperature Thickness Expansion to Shrinkage (TE/S) is at least about −0.85.

7. The gypsum core according to claim 5, wherein between about 55% and about 95% of the high expansion particles are greater than about 500 micrometers.

8. The gypsum core according to claim 5, wherein between about 55% and about 75% of the high expansion particles are greater than about 500 micrometers.

9. The gypsum core according to claim 5, wherein at least 80% to about 95% of the high expansion particles are greater than about 500 micrometers.

10. The gypsum core according to claim 5, wherein between about 35% and 60% of the high expansion particles are between about 500 micrometers and about 1000 micrometers.

11. The gypsum core according to claim 5, wherein between about 40% and 60% of the high expansion particles are between about 500 micrometers and about 1000 micrometers.

12. The gypsum core according to claim 5, wherein between about 20% and about 40% of the high expansion particles are between about 1000 micrometers and about 1500 micrometers.

13. The gypsum core according to claim 5, wherein the high expansion particles are high expansion vermiculite particles.

* * * * *